United States Patent
Ang et al.

(10) Patent No.: US 12,529,829 B2
(45) Date of Patent: Jan. 20, 2026

(54) FLAT TOP DIFFUSER FOR LASER APPLICATIONS AND OTHER APPLICATIONS

(71) Applicant: Luminit LLC, Torrance, CA (US)

(72) Inventors: Anthony Ang, Long Beach, CA (US); Mitch Jansen, Palo Alto, CA (US); Balvinder Gogia, Torrance, CA (US)

(73) Assignee: Luminit Inc., Torrance, CA (US)

( * ) Notice: Subject to any disclaimer, the term of this patent is extended or adjusted under 35 U.S.C. 154(b) by 432 days.

(21) Appl. No.: 17/958,131

(22) Filed: Sep. 30, 2022

(65) Prior Publication Data

US 2024/0061158 A1    Feb. 22, 2024

Related U.S. Application Data

(63) Continuation-in-part of application No. 16/856,453, filed on Apr. 23, 2020, now Pat. No. 11,592,599.

(51) Int. Cl.
*G02B 3/00* (2006.01)
*G02B 5/02* (2006.01)

(52) U.S. Cl.
CPC ......... *G02B 5/0252* (2013.01); *G02B 5/0221* (2013.01); *G02B 5/0278* (2013.01); *G02B 5/0284* (2013.01)

(58) Field of Classification Search
CPC ....... G02B 3/0043; G02B 3/00; G02B 5/0221
See application file for complete search history.

(56) References Cited

U.S. PATENT DOCUMENTS

| | | |
|---|---|---|
| 2009/0153974 A1 | 6/2009 | Sales |
| 2014/0268879 A1 | 9/2014 | Mizuyama |
| 2020/0249587 A1 | 8/2020 | Martin |
| 2020/0386919 A1 | 12/2020 | Arima et al. |
| 2021/0333442 A1 | 10/2021 | Ang |

FOREIGN PATENT DOCUMENTS

| | | |
|---|---|---|
| CN | 1688907 A | 10/2005 |
| CN | 103913890 A | 7/2014 |
| CN | 109154682 A | 1/2019 |
| CN | 110114698 A | 8/2019 |
| DE | 102018120725 A1 | 2/2020 |
| EP | 1360529 A1 | 11/2003 |

OTHER PUBLICATIONS

International Search Report and Written Opinion issued for PCT/US23/74834 from the International Searching Authority, mailed on May 20, 2024.

(Continued)

*Primary Examiner* — Ryan D Howard
(74) *Attorney, Agent, or Firm* — PATENT LAW WORKS LLP

(57) ABSTRACT

Optical diffusers are disclosed with improved optical properties and improve aesthetic designs. A micro lens array may be overwritten with randomly placed lenses. A light shaping diffuser may be included. The light shaping diffuser may have a microstructure that includes features that aid in camouflaging the micro lenses from consumers, improving the aesthetic appearance while retaining other desirable optical properties.

18 Claims, 70 Drawing Sheets
(39 of 70 Drawing Sheet(s) Filed in Color)

(56) References Cited

OTHER PUBLICATIONS

International Preliminary Report on Patentability issued for PCT/US2023/074834 from the International Bureau, mailed on Apr. 10, 2025, 8 pgs.
Notification of the First Office Action issued for CN Application No. 202110423532.6, from China National Intellectual Property Administration, dated Mar. 18, 2025.
Notification of the First Office Action issued for CN Application No. 202110423532.6, from China National Intellectual Property Administration, dated Mar. 18, 2025 (English translation).

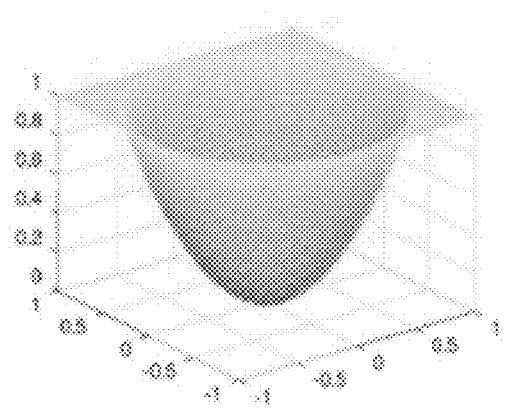 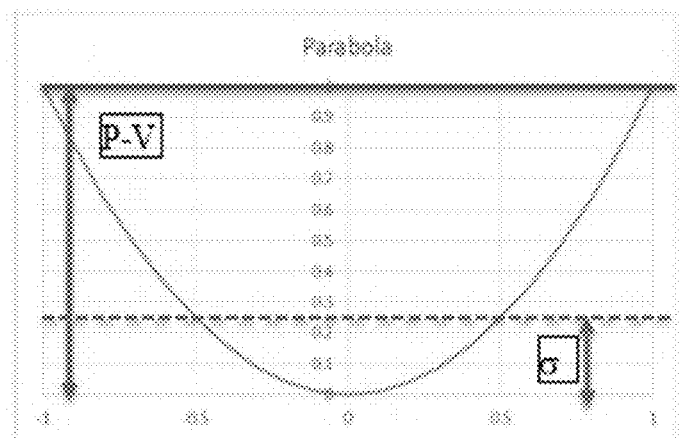
Fig. 19A                    Fig. 19B

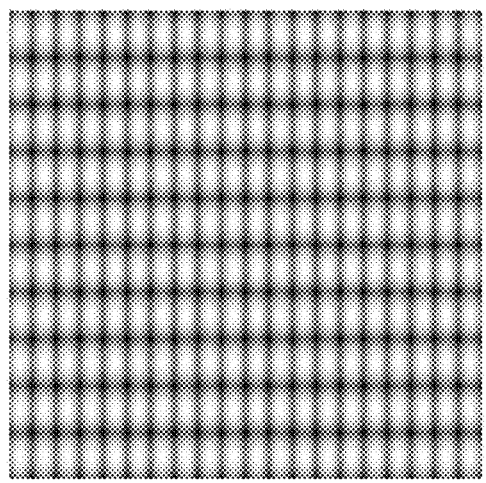 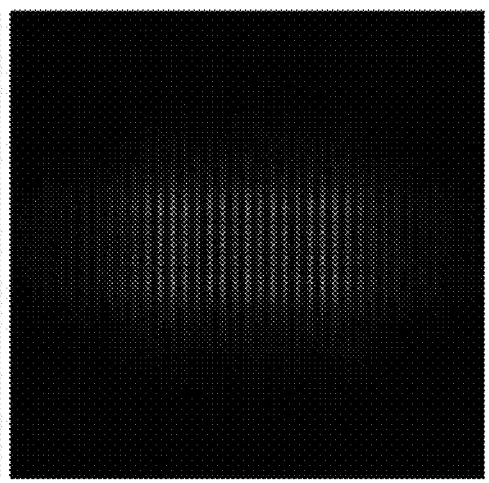
Fig. 21A  Fig. 21B
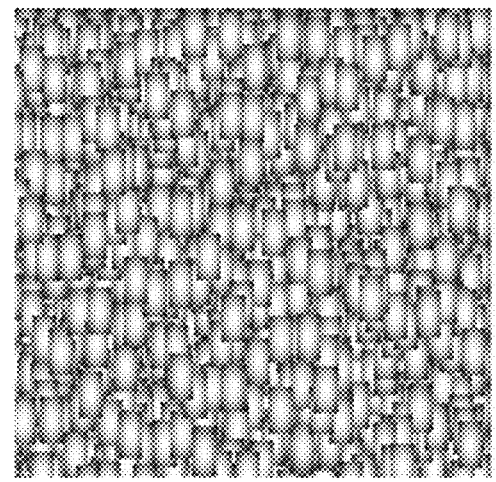 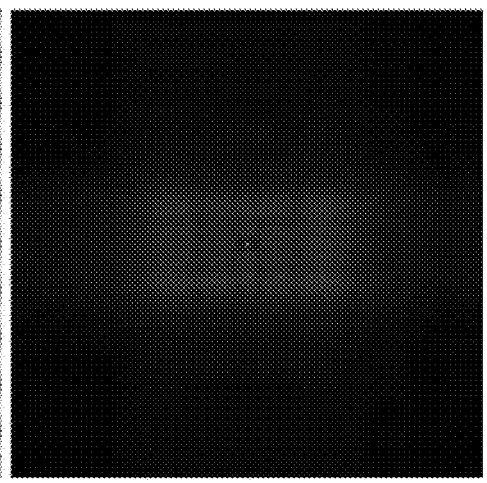
Fig. 21C  Fig. 21D
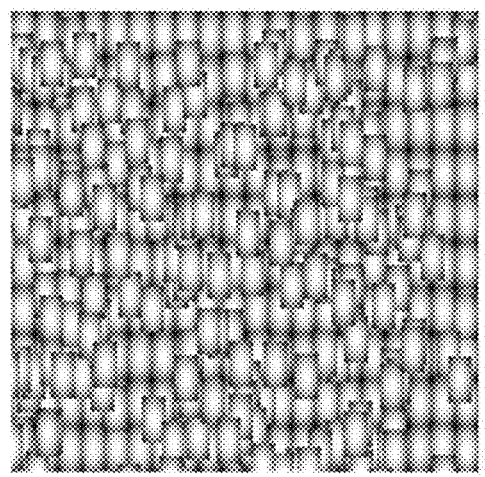 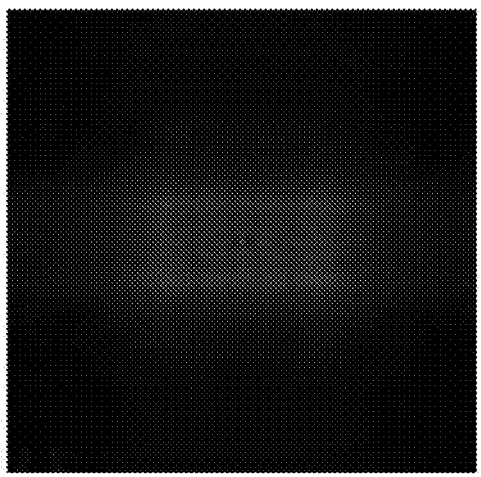
Fig. 21E  Fig. 21F

5°

10°

20°

40°

50°

60°

70°

80°

$$\langle I(x,y)I(x+\Delta x, y+\Delta y)\rangle$$
$$= \iiint\iiint\iint [P(u,v)]^{1/2}[P(u',v')]^{1/2}[P(u-p\lambda b, v-q\lambda b)]^{1/2}$$
$$\times [P(u'-p'\lambda b, v'-q'\lambda b)]^{1/2}\exp[i\Psi(u,v;p,q)]\exp[-i\Psi'(u',v';p',q')]$$
$$\times \exp[-i2\pi x(p-p')]\exp[-i2\pi y(q-q')]\exp[i2\pi p'\Delta x]\exp[i2\pi q'\Delta y]$$
$$\times du\,dv\,dp\,dq\,du'\,dv'\,dp'\,dq'.$$

Fig. 28

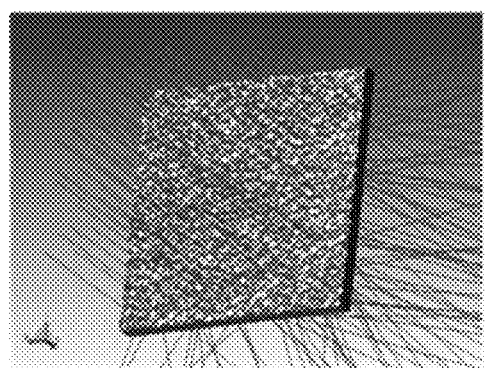
Fig. 29A
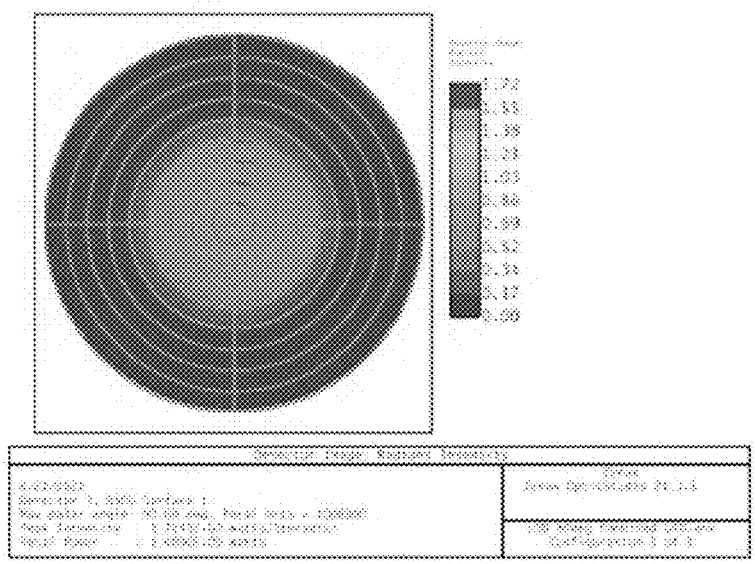
Fig. 29B
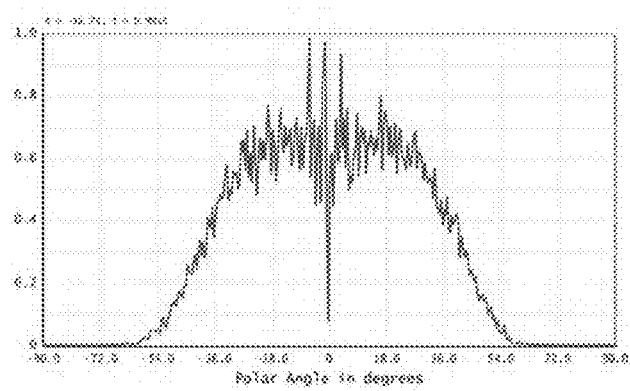
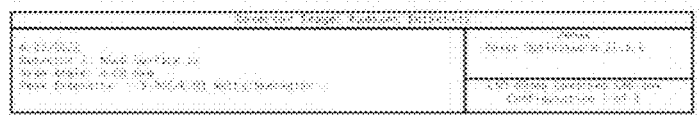
Fig. 29C

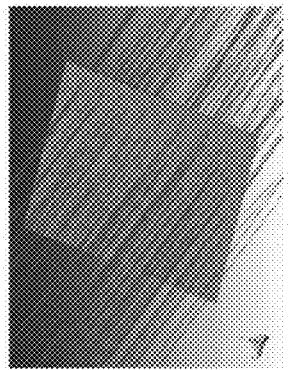
FIG. 30A
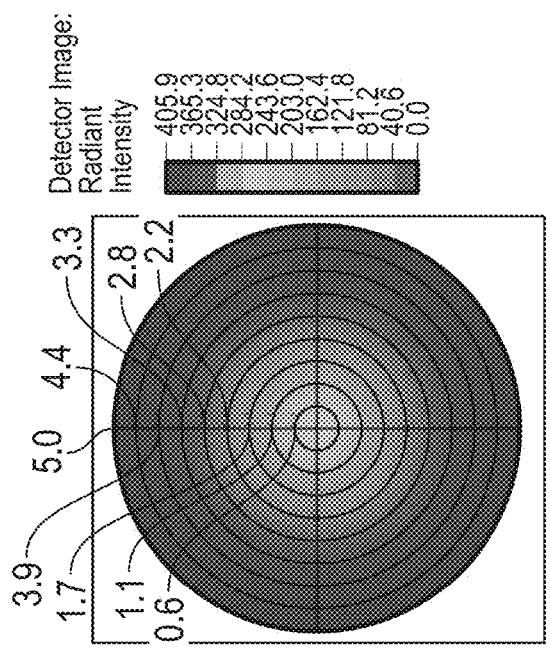
FIG. 30B
FIG. 30C

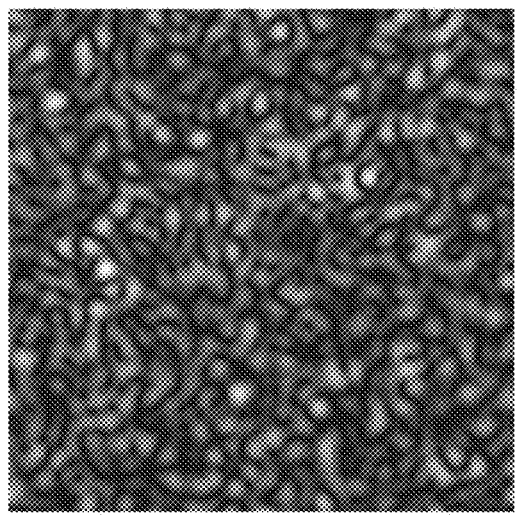 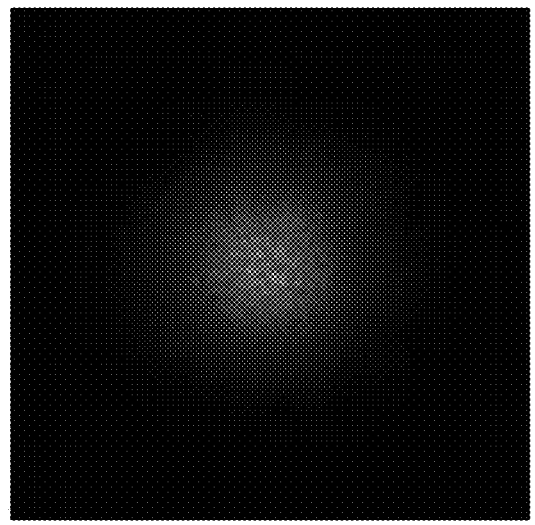
Fig. 32A
Fig. 32B
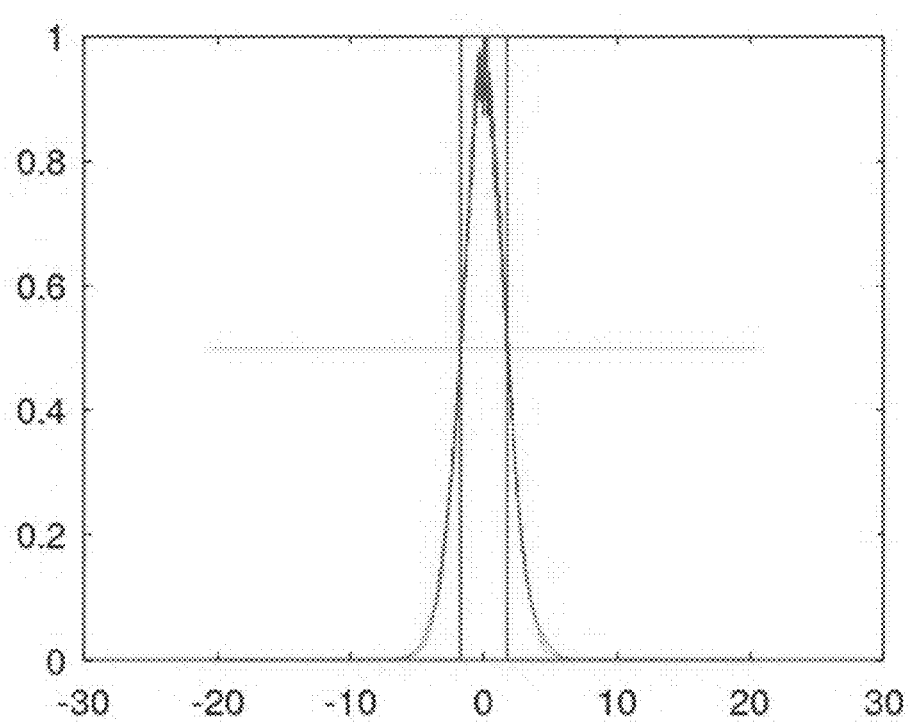
Fig. 32C

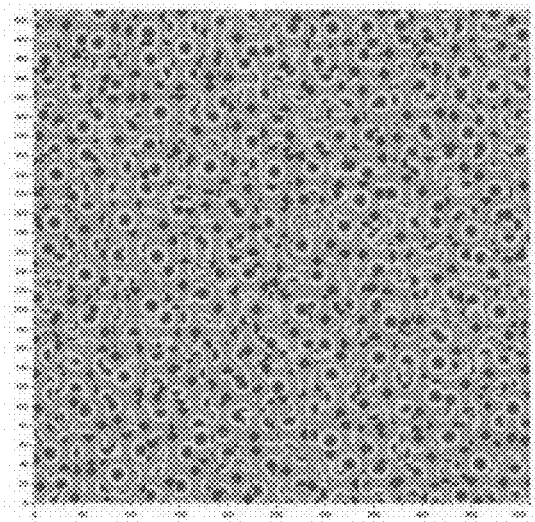 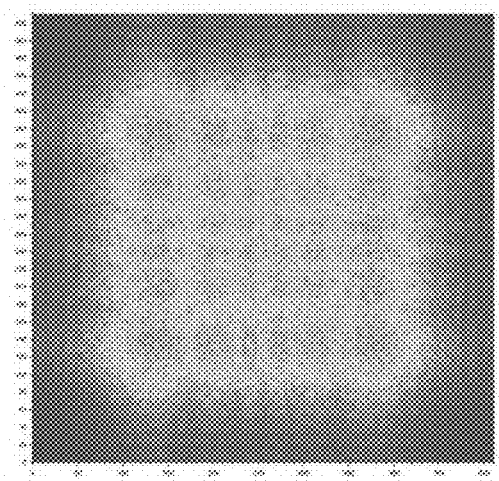
Fig. 33A  Fig. 33B
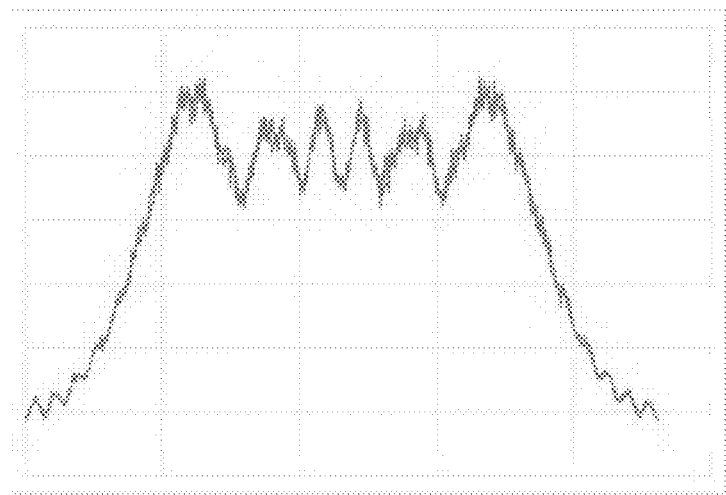
Fig. 33C

FLAT TOP DIFFUSER FOR LASER APPLICATIONS AND OTHER APPLICATIONS

CROSS REFERENCE TO RELATED APPLICATIONS

The present application is a continuation-in-part application of U.S. application Ser. No. 16/856,453 "Flat Top Diffuser For Laser Application," filed on Apr. 23, 2020, the contents of which are hereby incorporated by reference.

FIELD OF THE INVENTION

The present disclosure is generally related to optical diffusers.

BACKGROUND

Recently, flat top diffusers (FTD) using micro-lens arrays have become more important for applications which require the light to have high efficiency to travel through an aperture or high uniformity at the receiver.

However, the formation of a regular, repeated micro-lens array (MLA) can create high frequency diffracted orders related to the repeated lens pitch across the transverse and longitudinal axes of the structured surface plane when using coherent light. In addition to these orders, a low frequency diffraction pattern forms, which is related to the shape of the aperture.

Methods of forming a homogenized image from an FTD are needed.

Also, commercial products benefit from an aesthetic visual appearance. That is, in addition to the optical quality of the flat top diffuser, consumers prefer an aesthetic visual appearance of a flat top diffuser in applications for which the consumer has an opportunity to view the flat top diffuser.

SUMMARY

Optical elements including one or more micro-optic unit cells are disclosed.

In one implementation, an optical element includes one or more micro-optic unit cells. Each micro-optic unit cell includes one or more lenslets. Each lenslet has a boundary shape. The lenslets are configured in a regularly spaced micro-lens array (MLA). The lenslets are overwritten with partially filled randomly placed lenses (RPLs), which cover from 1 percent to 99 percent of the MLA. A light shaping diffuser (LSD) pattern is added on top of the micro-optic unit cell, wherein the LSD comprises an overlay micro-structure that at least partially camouflages the LSD from human viewers.

In one implementation, an optical element comprising one or more micro-optic unit cells. Each micro-optic unit cell is comprised of one or more lenslets. Each lenslet has a boundary shape. The lenslets are configured in a regularly spaced micro-lens array (MLA); wherein the lenslets are overwritten with partially filled randomly placed lenses (RPLs), which cover from 1 percent to 99 percent of the MLA. A light shaping diffuser (LSD) pattern is added on top of the micro-optic unit cell, the LSD having microstructure with low frequency structure and a higher frequency structure superimposed on the low frequency structures to at least partially camouflage the LSD from human viewers. An intensity or irradiance profile of the optical element comprises a flat top.

In one implementation, an optical element includes one or more micro-optic unit cells; wherein each micro-optic unit cell is comprised of one or more lenslets. Each lenslet has a boundary shape; wherein the lenslets are configured in a micro-lens array (MLA. The lenslets have randomly scaled lenses (RSL)s which cover from 1 percent to 99 percent of the MLA. wherein a light shaping diffuser pattern is added on top of the micro-optic unit cell.

In general, another innovative aspect of the subject matter described in this disclosure may include methods related to the use of the micro-optic unit cells in a variety of different optical applications.

It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The patent or application file contains at least one drawing executed in color. Copies of this patent or patent application publication with color drawings will be provided by the Office upon request and payment of the necessary fee.

The present disclosure is illustrated by way of example, and not by way of limitation in the figures of the accompanying drawings in which like reference numerals are used to refer to similar elements.

FIG. 19A is a surface depiction of a paraboloid surface.

FIG. 19B is a cross section of a paraboloid surface.

FIG. 21A shows a regular MLA.

FIG. 21B the far-field result of the MLA of FIG. 21A.

FIG. 21C shows an MLA with RPL.

FIG. 21D shows the corresponding far-field of FIG. 21C.

FIG. 21E shows an MLA with a PRPL overwritten on in place of MLA preceding it.

FIG. 21F shows a corresponding far-field pattern of the MLA with a PRPL for FIG. 21E.

FIG. 28. illustrates equation 20.

FIG. 29A illustrating importing an 80 deg FWHM LSD into Zemax® ray tracing program.

FIG. 29B illustrates near field intensity profile.

FIG. 29C illustrates far-field intensity.

FIGS. 30A, 30B, and 30C illustrate importing a 3.5 degree FWHM LSD into Zemax® and performing ray tracing.

FIG. 31B illustrates the two-dimensional intensity distribution.

FIG. 32A shows an LSD texture represented by a shade of grey with lenses placed randomly in X-Y plane.

FIG. 32B shows coherent diffraction pattern typical of rectangular flat top diffusers.

FIG. 32C shows the output analysis of FIG. 32A using a Fourier Transform analysis.

FIG. 33 shows a pattern of a flat top diffuser with lenses placed randomly in X-Y plane.

DETAILED DESCRIPTION

The present disclosure describes systems and methods for 1) a basic micro-optical cell design of a micro-lens array (MLA) with randomly placed lenses (RPLs) and a Light Shaping Diffuser (LSD); 2) a basic micro-optical cell design of a micro-lens array (MLA) with partial (RPLs) and a Light Shaping Diffuser (LSD); 3) an improved micro-optical cell design having a MLA, a partial RPL (PRPL) and a high-definition (HD) microstructure; and 4) an improved micro-optical cell design having a MLA and randomly scaled lenslets (RSLs).

MLA with RPL/PRPL and LSD

Figure 1:
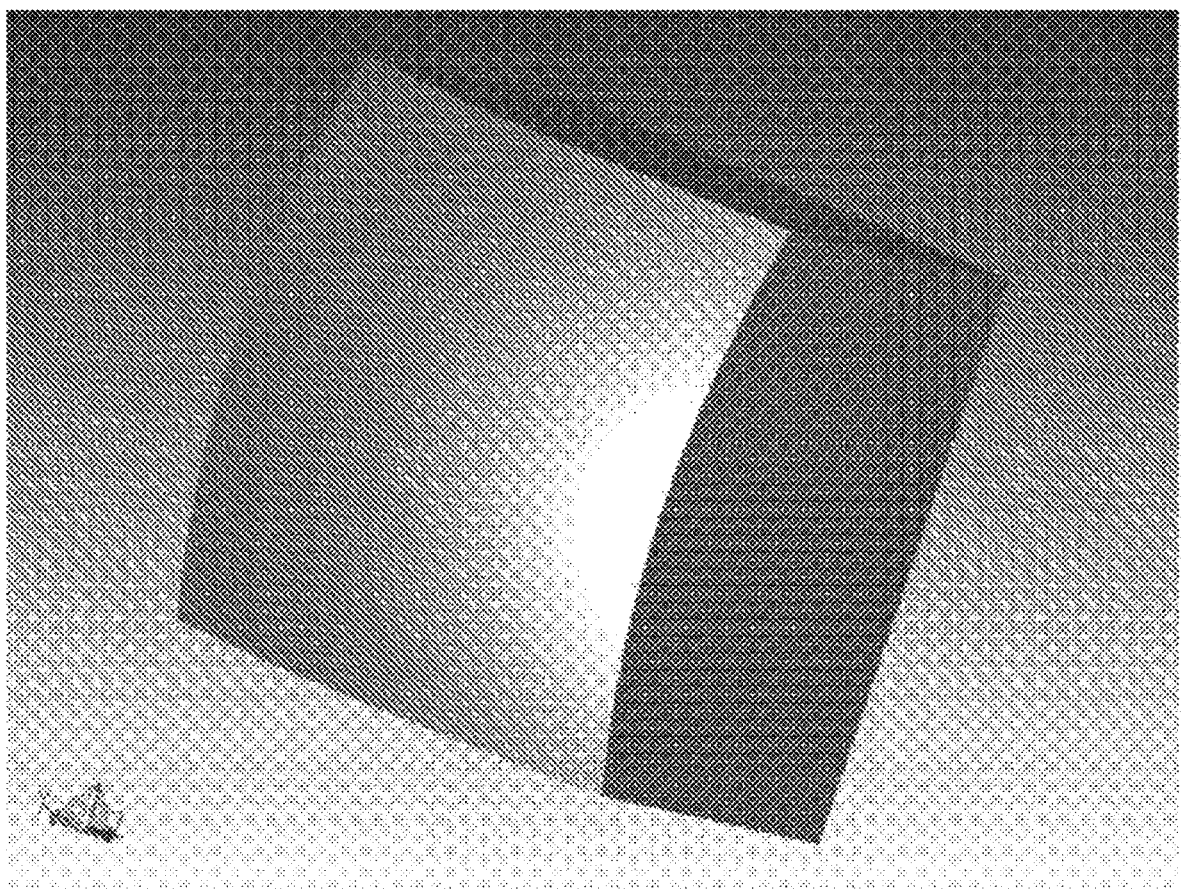
FIG. 1. Single Lenslet for flat top diffuser (FTD) 20×20 degrees Square.
Figure 5:
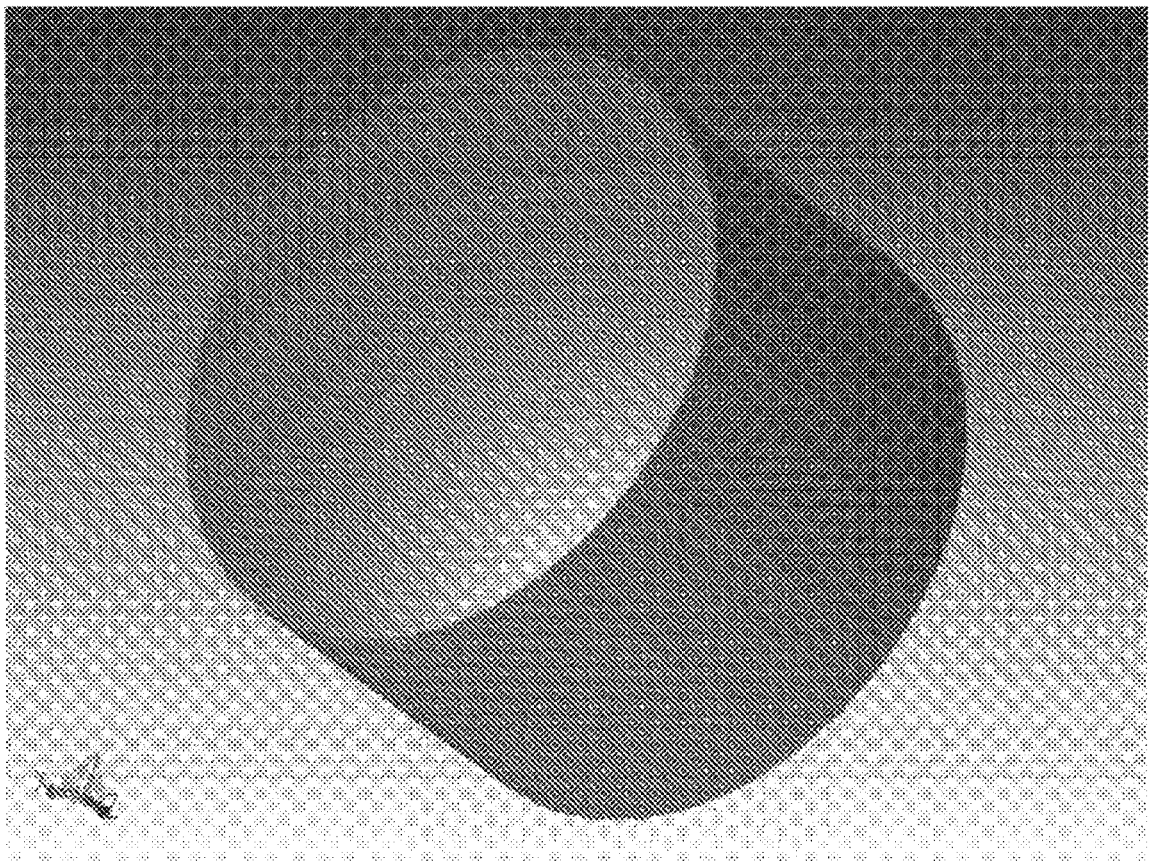
FIG. 5. Single Lenslet for FTD 20 degrees Circle.

Provided herein is an optical element that includes one or more micro-optic unit cells made of one or more lenslets, as shown in FIG. 1 and FIG. 5. A micro-optic cell design with a regularly spaced micro-lens array, having a series of randomly positioned lenslets that have been digitally overwritten, wherein the overwritten area is greater than 0 up to 100 percent fill, and wherein a light shaping diffuser pattern is placed on top of the lenslets of the micro-optic cell.

The micro-optic unit cell includes a size, XY, filled with lenslet(s) of a size m×n. The shape of the lenslet can be almost any known geometric shape, such as a square, a rectangle, a circle, an ellipse, a hexagon, irregular hexagon, a star, a cross, a logo, a generic shape, or mixtures thereof. Each lenslet has a boundary shape. Each lenslet is a single lens element having a size with lateral dimensions of about 10-500 micrometers. The size of the micro-optic unit cell is based on lenslet size, beam size, source size, shape of the optical element, or a mixture thereof. The lateral dimensions of the micro-optic unit cell are in the range of about 0.1-500 millimeters. The optical element has lateral dimensions ranging from about 0.1 millimeters to about 1 meter. A light shaping diffuser (LSD) pattern can be added on top of the micro-optic unit cell. The lenslet can wrap around one or more edges of the micro-optic unit cell.

The lenslets are initially uniformly distributed within the micro-optic unit cell, then more lenslets are added by digitally overwriting the previous lenslet locations and the newly added lenslets are randomly positioned. Randomly Positioned Lenslets (RPL) refers to one or more lenslets for which part or all of the lenslet is located in a micro-optic unit cell and for which the center of the lenslets are randomly positioned. The orientation of the RPLs are identical to each other and identical to the orientation of the other lenslets in the micro-optic unit cell.

Figure 9:
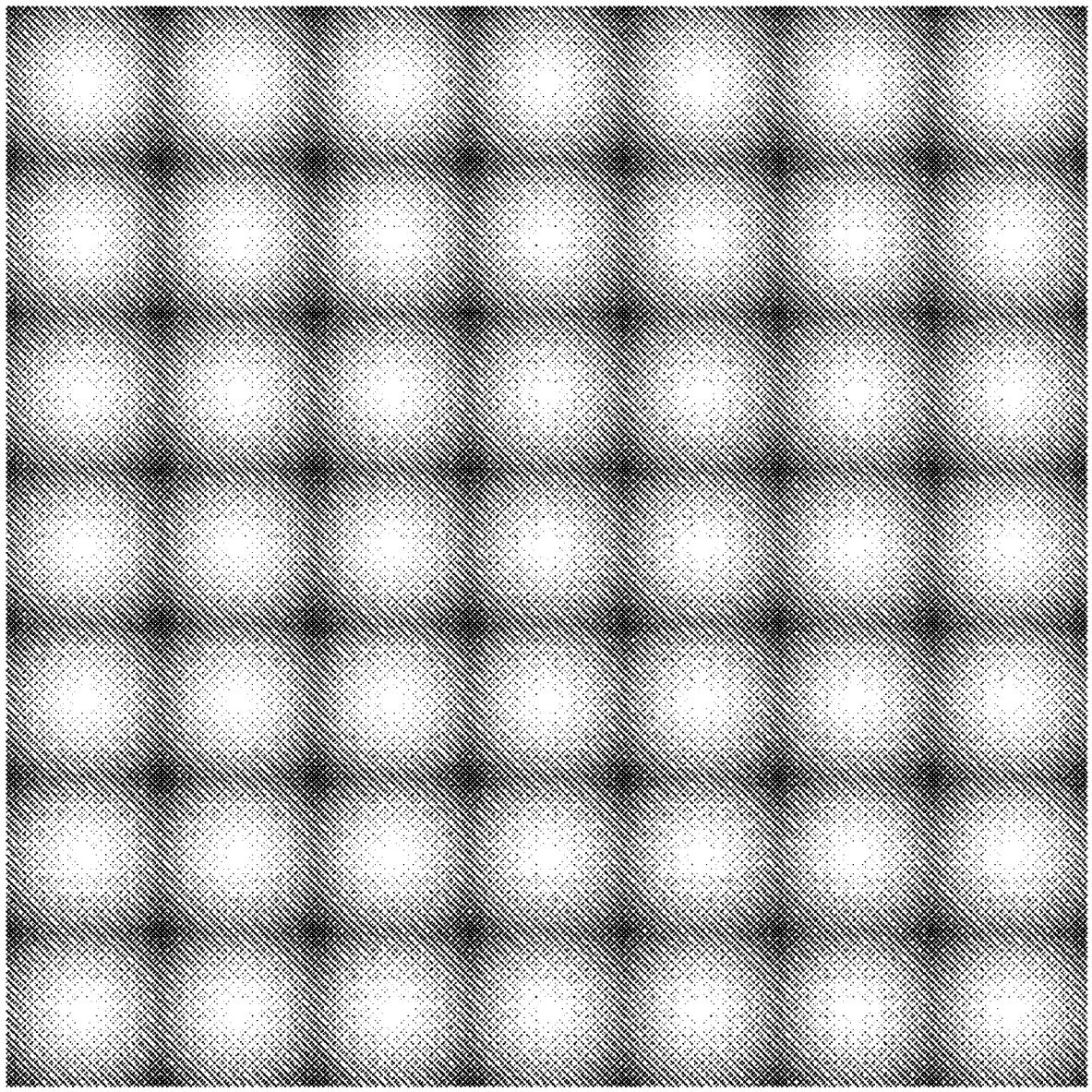
FIG. 9. Regularly spaced micro-lens array (MLA).

The lenslets are configured in a micro-lens array (MLA), which is a composition of lenslets in a regularly spaced lens array where the boundaries of adjacent lenslets are shared with each other and where the lenslets do not overlap each other. An example of a MLA is shown in FIG. 9. For rectangular arrays (including square arrays), the centers of lenslets in each row are co-linear and the centers of each lenslet in each column are co-linear. In the case of a hexagon lenslets, the lenslets are arranged in a hexagonal tiling pattern. In the case of a parallelogram lenslet, the lenslets are arranged in a parallelogrammical lattice pattern. In the case of a rhombus lenslet, the lenslets are arranged in a rhombic lattice pattern.

In another embodiment, multiple micro-optic unit cells are arranged into a Complete Design, which is a combination of micro-optic unit cells arranged in a pattern, such that they are adjacent to each other, and such that the micro-optic unit cells fill the entire area of the Complete Design with no gaps between adjacent micro-optic unit cells. An example of the size of the lateral dimensions of a Complete Design can be in the range from 0.1 millimeter to about 1 meter.

In another embodiment, the lenslets are not arranged in a perfect MLA, yet the lenslets have regular, multiple-centered spacings. The RPL involves each lenslet with sag(Z) profile, which is placed in a random position across X and Y independently. The lenslet writing process, described in detail below, is iterated in the framework of the micro-optic cell design until all blank areas are overwritten with the form of the lenslet for RPL100 (randomly positioned lenses 100% fill). The lenslets are overwritten with RPLs, which cover from 0 to 100 percent of the MLA. This writing process can also involve an MLA with a partially filled RPL where the number indicates the approximate percentage fill of the RPL. The partially filled RPL can have values between 1 and 99 percent. In one embodiment, the partially filled RPL is RPL25 (25% filled). In the writing process, when a new lenslet is randomly positioned in an area previously filled with a portion of another lenslet, the area is overwritten with the new lenslet. The result is a full lens overlapping a partial lens. The writing process is repeated and formed randomly, and can occur several times during the design of the micro-optic cell. If the cell is large enough to have a sufficient number of lenslets, then for each bin in the sag(Z) histogram of the cell, the value should be within about 10% of the value of a single lenslet. In an alternative embodiment, the intent is to have zero order or specular light where the unit cell does not have to be filled 100% by the lenslets.

In another embodiment, the tilt of an optical axis of the lenslets varies for a percentage of the lenslets (from 0% to 100%) is randomly varied for 0% to 100% of the lenslets. In another embodiment, the lenslets all have the same orientation (not rotated) with respect to each other.

In another embodiment, the optical element includes one or more micro-optic unit cells; where each micro-optic unit cell is comprised of one or more lenslets; where each lenslet has a boundary shape; where the lenslets are configured in a regularly spaced micro-lens array (MLA); where the lenslets are overwritten with randomly placed lenses (RPLs), which cover from 0 to 100 percent of the MLA; and where a light shaping diffuser pattern is added on top of the micro-optic unit cell.

Figure 2:
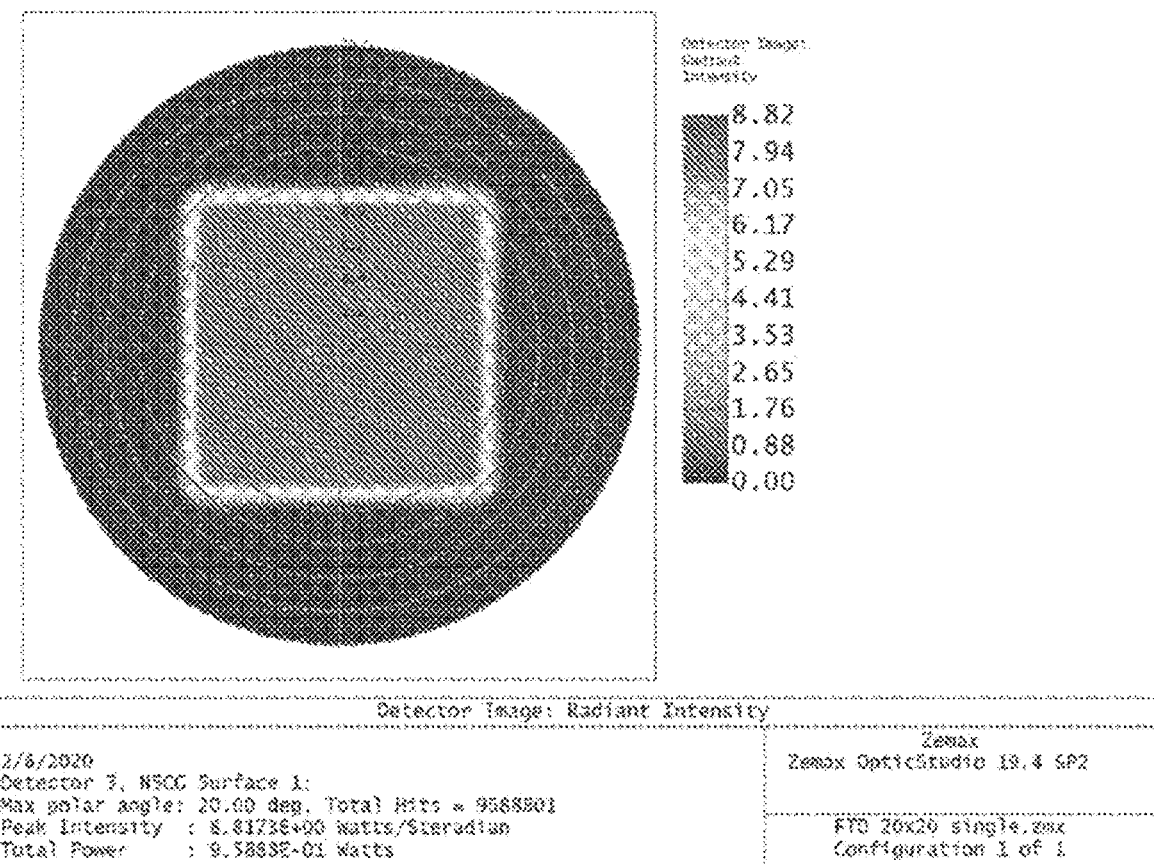
FIG. 2. Geometrical bidirectional scatter distribution function (BSDF) of a FTD at 20.times.20 degrees Square.
Figure 3:
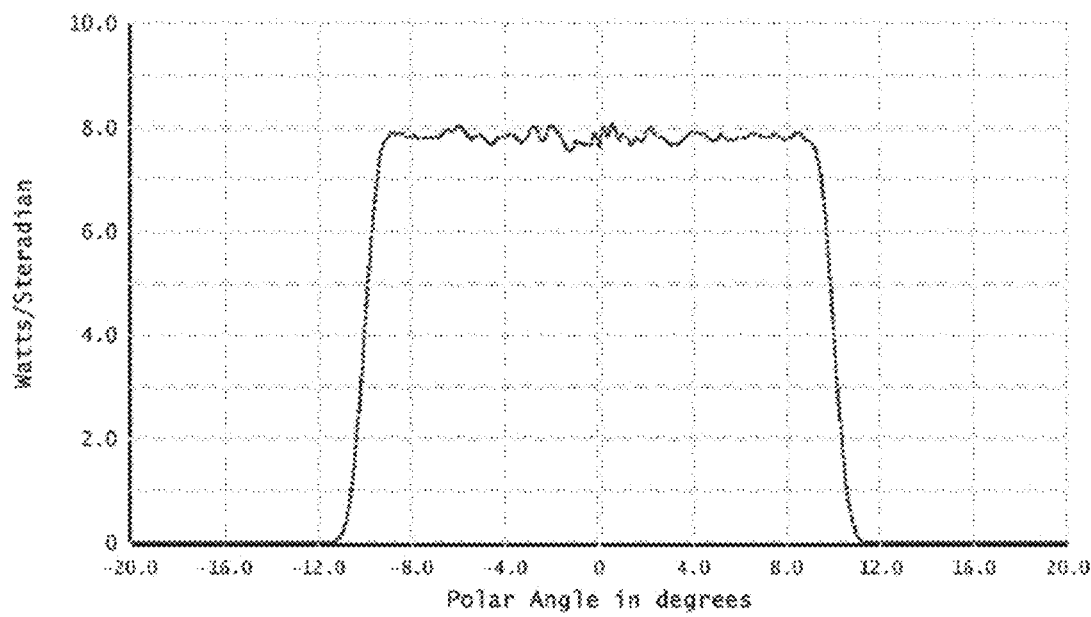
FIG. 3. Geometrical Horizontal Intensity Profile of a FTD 20×20 degrees Square.
Figure 4:
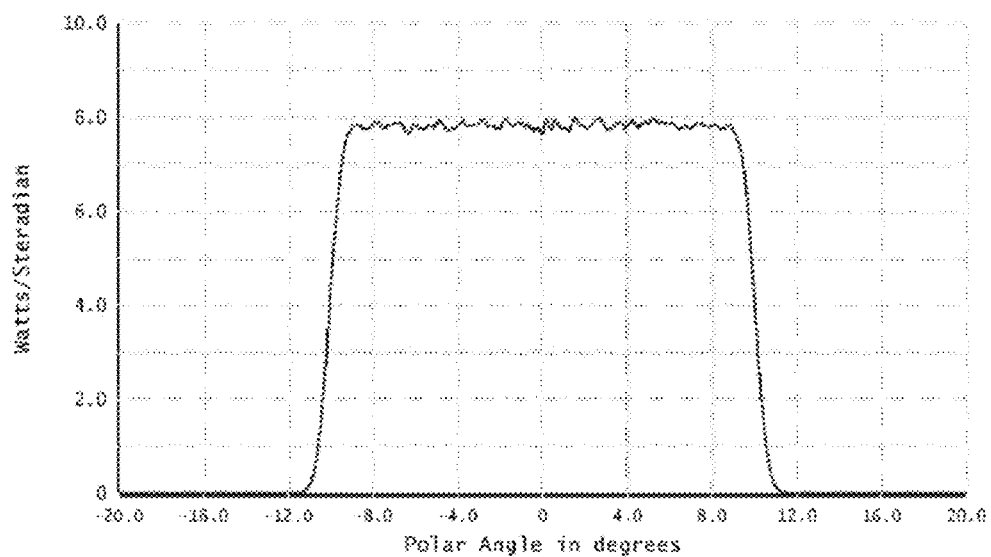
FIG. 4. Geometrical Vertical Intensity Profile of a FTD 20×20 degrees Square.
Figure 6:
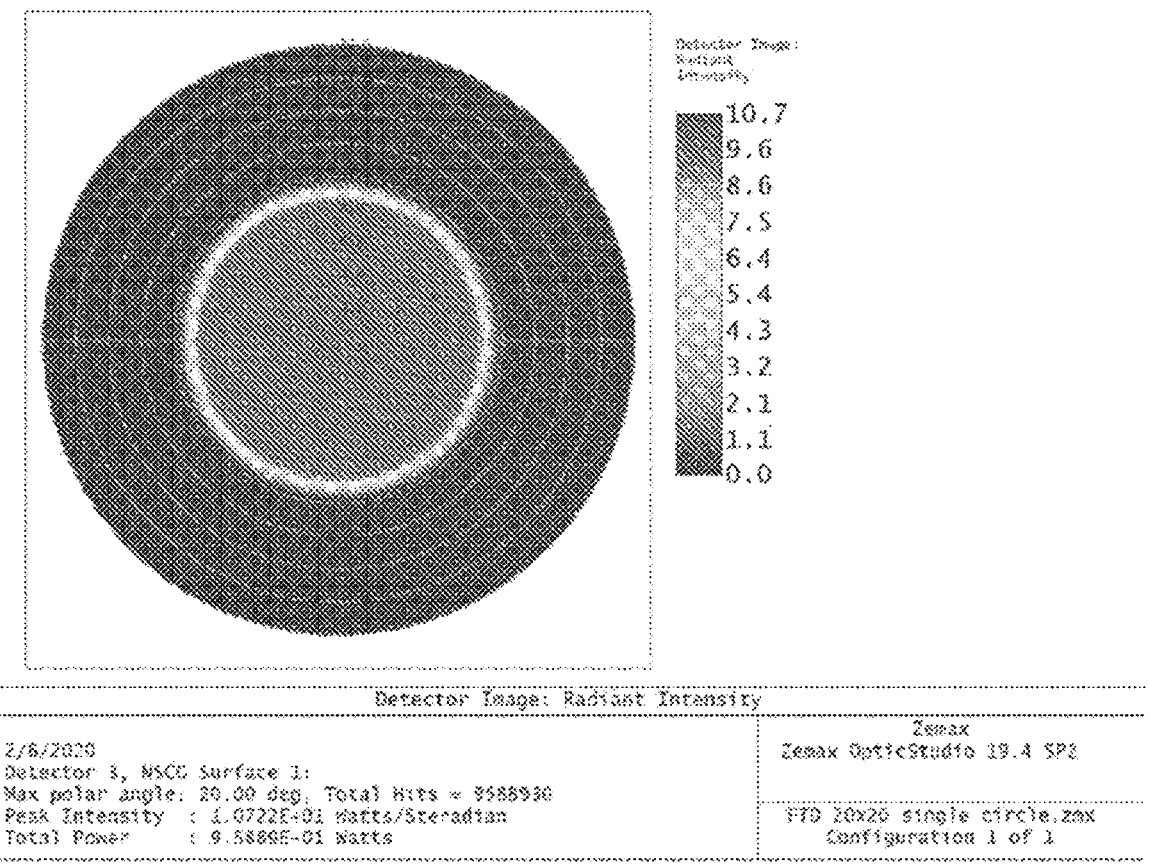
FIG. 6. Geometrical BSDF of a Flat Top Diffuser at 20 degrees Circle.
Figure 7:
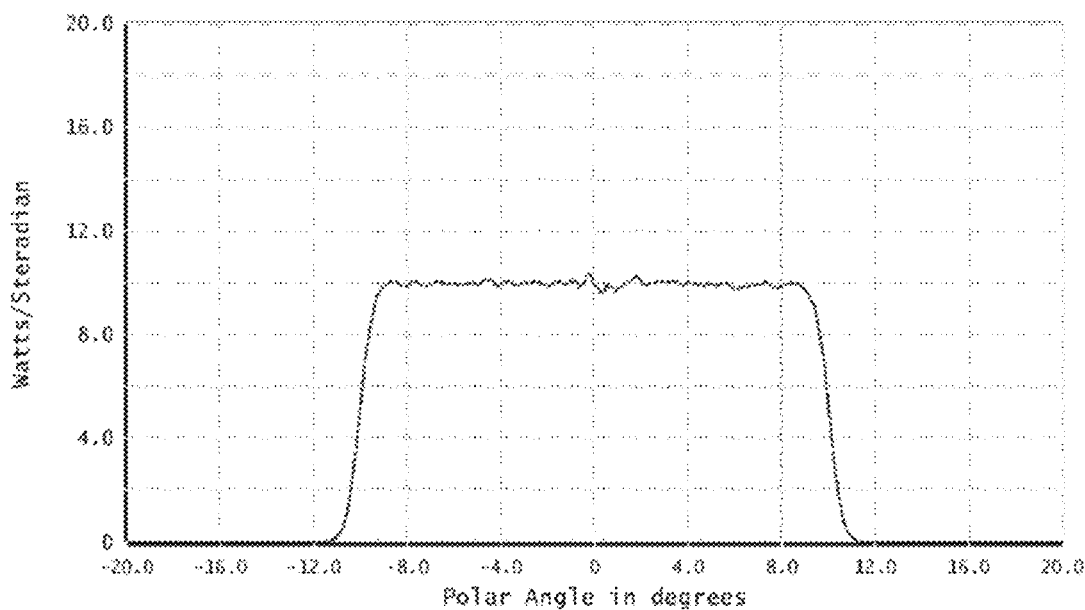
FIG. 7. Geometrical Horizontal Intensity Profile of a FTD 20 degrees Circle.
Figure 8:
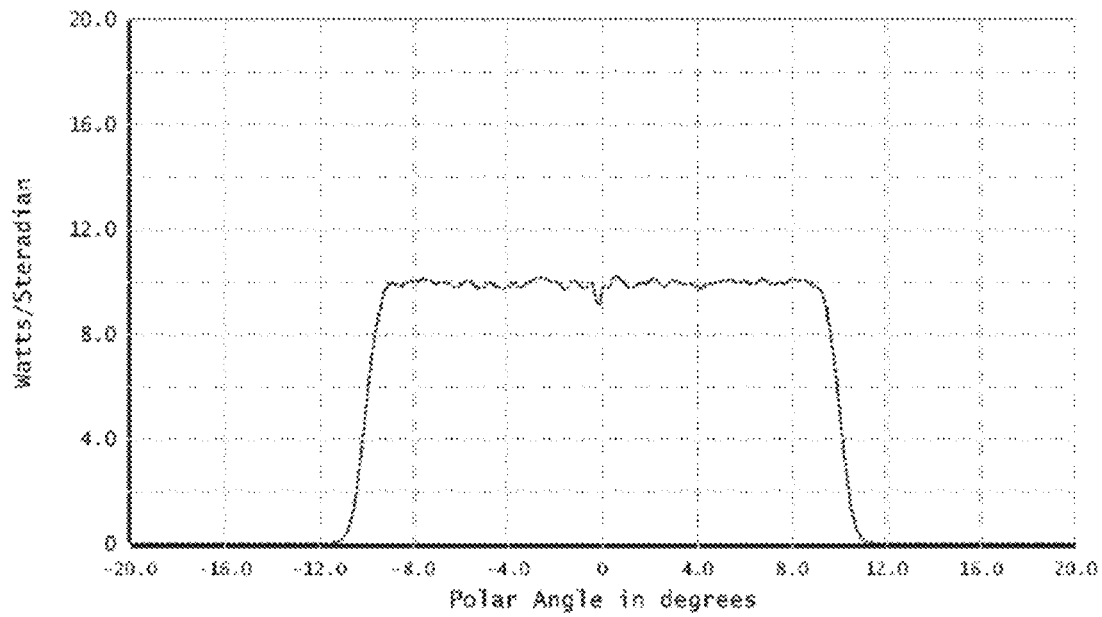
FIG. 8. Geometrical Vertical Intensity Profile of a FTD 20 degrees Circle.

The optical element can be designed to produce a flat top distribution (FTD). Flat-top/top-hat refers to a homogenized, projected image having uniform intensity. The intensity (the bidirectional scatter distribution function, BSDF, or the angular distribution) or irradiance profile (the projection onto a flat surface) can be a flat top, a gradient, or mixtures thereof. FIG. 2 illustrates the geometrical BSDF of a FTD as 20.times.20 degrees Square. FIG. 6 illustrates the geometrical B SDF of a FTD as 20 degrees circle. The optical element can have a coherent light source or an incoherent light source. The optical element can be utilized in either a transmissive or reflective mode. In one example of transmissive mode, a laser beam of coherent light transmits through an optical element and diffracts through the lenslets in the optical element and produces a light distribution, which has a desired irradiance or intensity profile, such as a flat top. In another example of transmissive mode, an incoherent light transmits through an optical element and refracts through the lenslets in the optical element and produces a light distribution, which has a desired irradiance or intensity profile, such as a flat top. In one example of reflection mode, a laser beam of coherent light is incident on the surface of an optical element and reflects off of the lenslets, which are naturally reflective or optically coated to be reflective) and produces a light distribution, which has a desired irradiance or intensity profile, such as a flat top. One reason for using reflective mode is that for a given slope of the lenslets, the reflective mode can achieve a higher angular distribution of the light irradiance or intensity profile.

In one embodiment, the optical element can also include a collimated or partially collimated light source. The light source is a coherent light source or an incoherent light source.

In an alternative embodiment, the intensity or irradiance profile comprises a flat top, a gradient, or mixtures thereof. In a different embodiment, where the intention is to have zero order or specular light, then the unit cell does not have to be filled by the lenslets 100%.

Also included herein is a method of making an optical element that uses a micro-optic unit cell comprising one or more lenslets. The method includes making an original photo resist master using a photolithography process, which can be done with a direct write laser machine. Subsequent masters can be made from a rubber master, plastic master, or metal master for replication purposes.

The method of construction of the micro-optic cell includes determining the B SDF or irradiance, as shown in FIGS. 2, 3, 4, 6, 7 and 8, from a single lenslet. The method also includes utilizing geometric lens design and statistical ray trace set from a standard optical raytracing program or from an in-house computational algorithm. This technique is used to determine the best lens sag(Z) shape to achieve the desired intensity profile, which can include a top hat (a uniform profile), gradient fall off (one or more high points in the center surrounded by a gradient, which decreases toward the edges), or gradient increase (one or more low points in the center), surrounded by a gradient, which increases towards the edges. The expected output is a beam homogenizer, corrector, or image projection to any shape, according to FIGS. 1, 2, 5 and 6, which can be an applied mask to the lens edge boundary.

Figure 10:
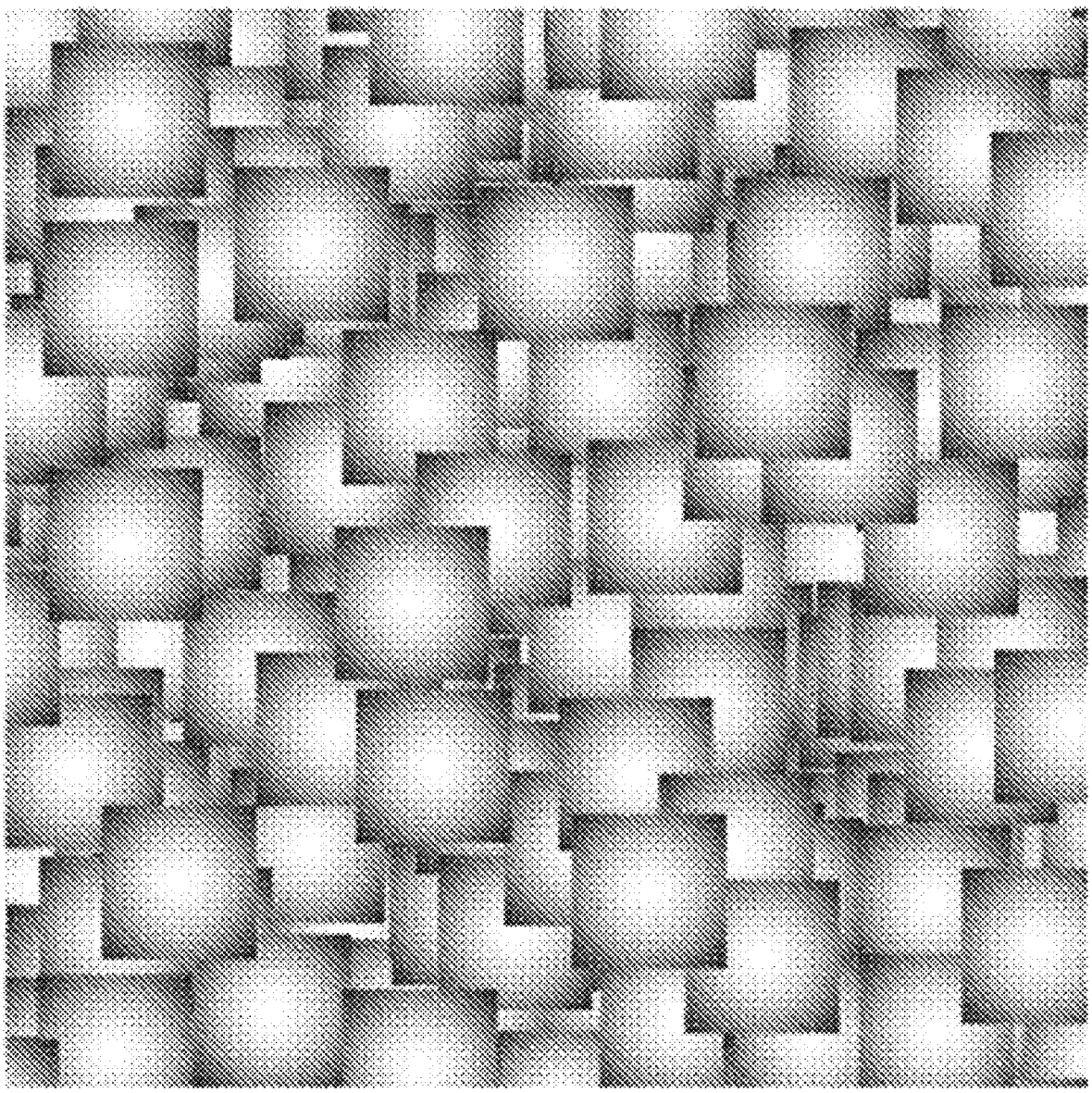
FIG. 10. Randomly Placed Lenslets (RPL) in a unit cell where the x and y positions are statistically randomly uniformly distributed.

A math program can be used to form a matrix of repeated lenslets in an MLA, shown in FIG. 9. Also, a random placement algorithm is used to place lenses in the unit cell with statistical uniform distribution. Each lens is positioned across the specified XY dimensions of the unit cell with statistically uniform random distribution positions of the lenslet to a unit cell as in FIG. 10. The lenslets all have identical size, shape (initially) and orientation. The size of the unit cell is predetermined based on the size of the lenslet, the aperture of the beam, and the design of the optical part. The process of randomization is based on statistical uniform distribution functions of a partial or full area of the unit cell and a process of digitally adding a pattern of a light shaping diffuser (LSD) on top of the lenslets in the micro-optic unit cell. In this process, previously written lenses can be overwritten several times by other lenslets positioned in the micro-optic unit cell. Also, lenses can wrap around the edge from right to left or bottom to top.

Figure 11:
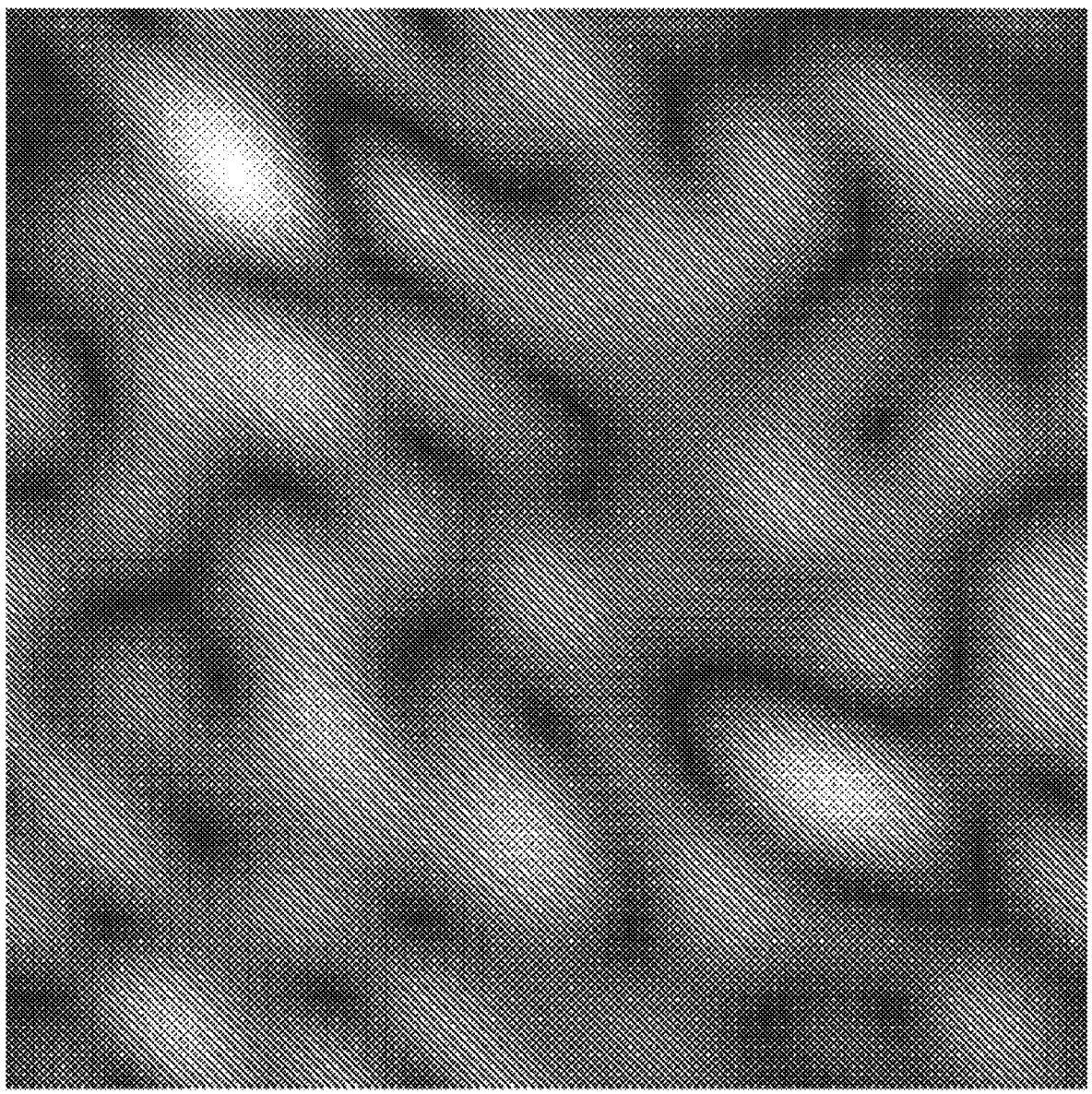
FIG. 11. The 3-D digital profile of a Light Shaping Diffuser (LSD®).
Figure 12:
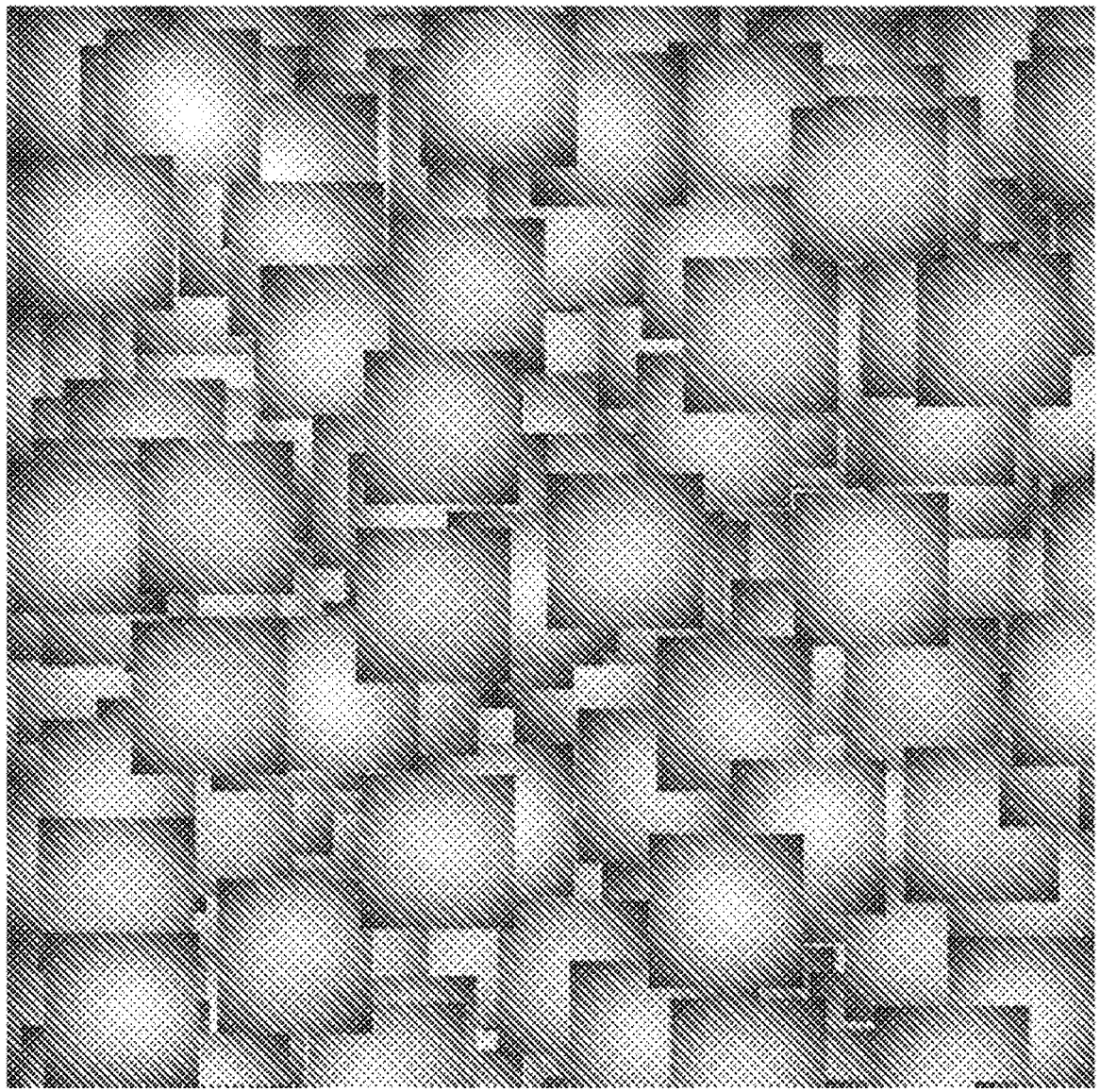
FIG. 12. RPL with LSD® depths added together.

Next the image of a light shaping diffuser (LSD), as an example LSD® by Luminit LLC, FIG. 11, is either imported from a 3D imaging device, such as a microscope, or generated from a mathematical code. The height parameter of each pixel is added onto the corresponding array point of the two matrices, RPL lenslets and LSD®, as in FIG. 12, which shows an RPL with the LSD® depths added together.

Micro-lens arrays (MLAs), RPLs, and LSD can be fabricated using either a Direct-Write-Laser (DWL) technique that is capable of exposing grayscale or with the use of grayscale Photomasks. In the former technique, the lenslets, which are represented as grayscale bitmaps and are representative of the varying depths spatially, are imaged into photoresist. The other photolithography techniques, which uses dithered photomasks, can also be used to produce these microlenses in photoresist. The photoresist of choice is a low contrast photoresist that is suitable for grayscale imaging where variable exposure intensities are used to control the depths at every 'pixel' of the design. While DWL techniques make use of a rastering laser beam that is acoustically modulated via an acousto-optic modulator (AOM) to control the intensity of the rastering laser beam, a photomask aligner or a stepper/scanner makes use of reduction lenses to expose these structures in resist. The photoresists are then developed in a developer bath, which results in the shapes of the microlenses. The exposure dose and/or development time in both the above lithography techniques are used to control the final depths or sags of the microlenses. The Peak-to-Valley (PV) depths/heights are theoretically calculated beforehand to achieve the right exposure conditions.

The structures in photoresist are then replicated into a rubber master (RM), transparent thermal or UV curable polymers. Nickel or metal masters can be made by transferring the surface relief micro-structure (SRMS) from the RM to a UV curable polymer, then utilizing electroplating techniques.

For transmissive parts, the refractive index of the replicating material/polymer is taken into consideration while designing the optical elements. Parts can be made in UV curable polymers from the master or submasters. For reflective parts, a metal or multilayer dielectric can be vacuum deposited onto the SRMS. Parts can be injection molded into a monolithic polymer form utilizing a metal master, such as Nickel. Parts can also be formed into glass, utilizing a RM in a SolGel process.

Figure 13:
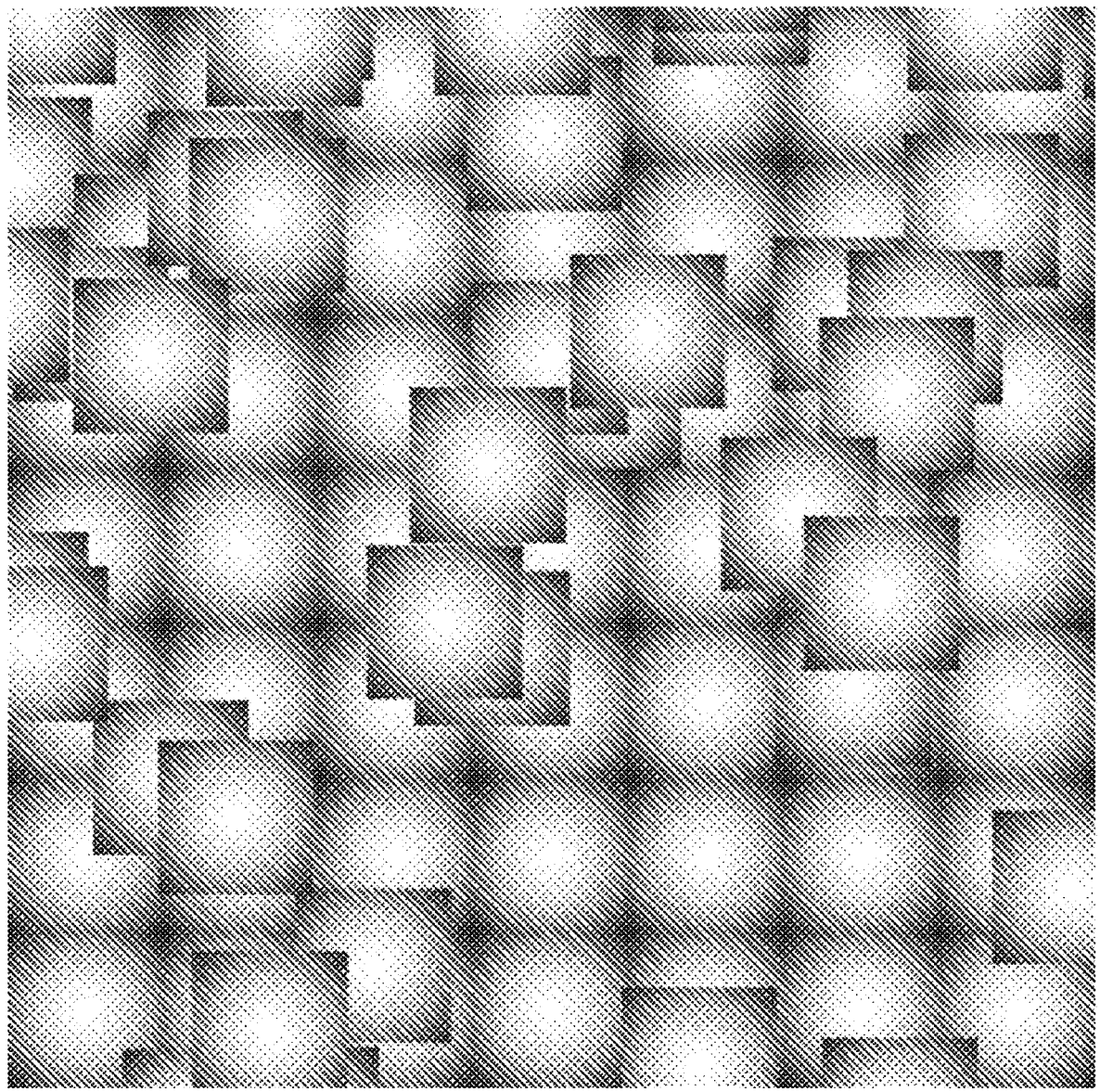
FIG. 13. MLA with Partial RPL.

The micro-optic unit cell functions similarly to the expected function of a regular repeated MLA, in that the envelope of profile and boundary shape can be designed. One advantage is that this MLA with randomized RPL (FIG. 10) or partial RPL (PRPL) (FIG. 13), overwritten on MLA (FIG. 9) and added to LSD (FIG. 11) have no regularly spaced dots. Thus, there are a variety of benefits to using RPL with LSD or using PRLP with LSD.

In another embodiment, a grid used for aligning rows and columns of the MLA is randomized and varied as to a y dimension of each row and as to an x dimension of each column.

In another embodiment, the aspect ratio of each lenslet is the same; wherein a size of each lenslet is scaled in size such that the lenslet fills in its boundary of its row and column; wherein a ratio of a width of the lenslet to a height of the lenslet is constant; and wherein a ratio of a length of the lenslet to a height of the lenslet is constant. The lenslets comprise rectangles, parallelograms, rhombuses, or squares; and wherein a y dimension of each row is constant along a length of an entire row and an x dimension of each column is constant along an entire column.

In another embodiment, replicated parts with one or more of these MLAs comprised of one of more lenslets can be made by replicating parts from a rubber master, glass master, metal master, plastic master, or any solid material that can be used for replication. The method to form a master can include a photolithography process or the use of a direct write laser machine. In one embodiment, the master is used to replicate parts and the replicas can be used as further masters for more replicas.

Additional Design Considerations to Minimize Zero Order Component in an FTD

In order to avoid zero order (zo) (specular component) in an FTD (or other engineered diffusers), refractive structures are utilized, instead of diffractive structures. An example of a diffractive optical element (DOE), which can generate a flat top distribution is a computer-generated hologram (CGH). A CGH can easily have zo, which is a defect for scattering the light. In addition, a CGH can only operate effectively in a single wavelength. So, CGHs are not effective for systems utilizing a range of wavelengths.

Figure 14A:
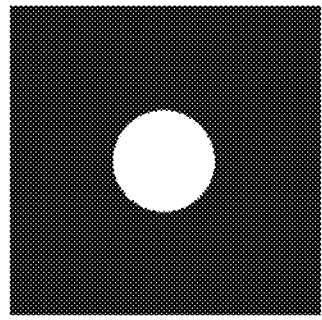
FIG. 14A shows a target (ideal) intensity pattern for CGH.
Figure 14B:
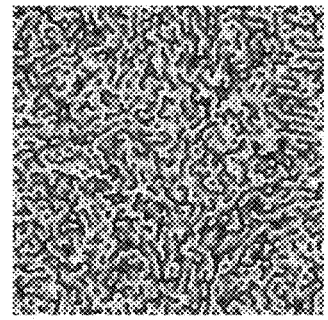
FIG. 14B shows a surface depth description of a diffractive optical element (DOE) known as a computer-generated hologram (CGH).
Figure 14C:
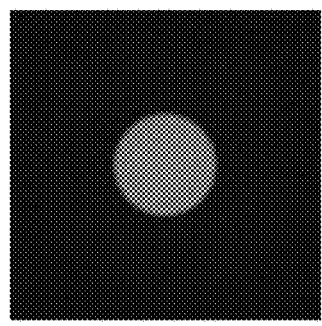
FIG. 14C is the computed far-field pattern of the CGH from FIG. 14B.
Figure 14D:
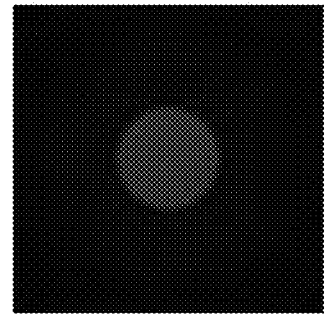
FIG. 14D is the far-field pattern with a zero-order defect.

FIG. 14A shows a target (ideal) intensity pattern for CGH. FIG. 14B shows a surface depth description of a diffractive optical element (DOE) known as a computer-generated hologram (CGH). FIG. 14C is the computed far-field pattern of the CGH from FIG. 14B. FIG. 14D is the far-field pattern with a zero-order defect.

Figure 15A:
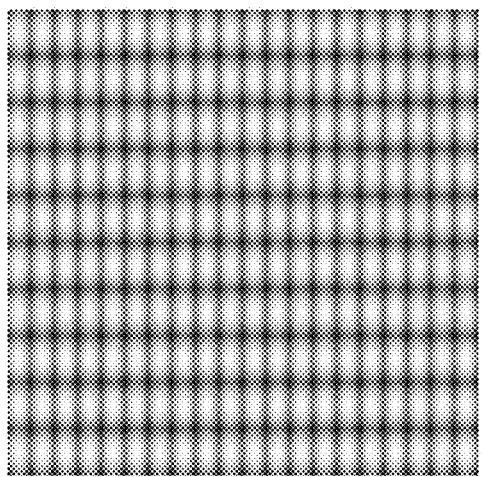
FIG. 15A illustrates a micro-lens array (MLA).
Figure 15B:
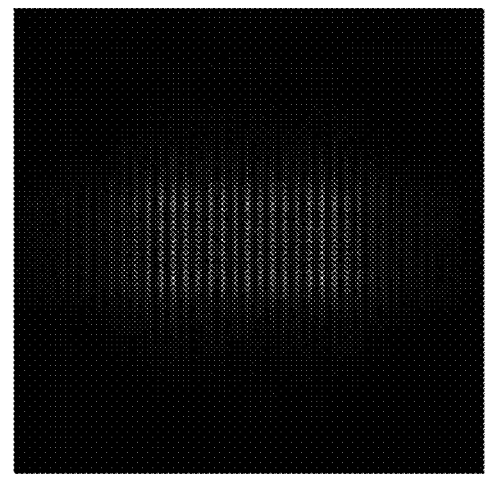
FIG. 15B shows the dot diffraction pattern formed by an MLA of FIG. 15A.

Flat top diffusers, which only use micro-lens arrays (MLA), will have noticeable diffraction dot patterns when used with a laser source. FIG. 15A illustrates a micro-lens array (MLA) and FIG. 15B shows the dot diffraction pattern formed by an MLA.

One example implementation to address these problems utilize micro-lenses in an array (MLA) in which 1) the microlenses are shaped to achieve the desired intensity pattern in the far-field, 2) are scaled (sized) specifically to avoid zero order, and 3) re optimized to produce the best slopes. The microlenses may be further overlayed with a uniformly random distribution of microlenses in x-y in a unit cell. In some implementations, a pseudo-random light shaping diffuser pattern (e.g., a holographic diffuser is provided. The light shaping diffuser pattern may further have a high frequency light shaping diffuser pattern.

Acronyms & Symbol Definitions

BSDF—Bi-directional Scatter Distribution Function. Describes the output of scatter in 2 directions based on the 2 direction ray inputs.
LSD—Light Shaping Diffuser. A light diffuser formed by using a holographic lab set-up and recorded using lithographic techniques. Results in a surface relief pattern.
FTD—Flat Top Diffuser. A diffuser which has a relatively uniform average intensity over a required boundary of angular range.
DOE—Diffractive Optical Element. Optics which operate with dominant diffractive effects such as holograms and diffraction gratings.
zo—Zero Order. Defective light for a DOE, when it is in excessive amount compared to desired results. In refractive elements it is known as 'specular' rays (component).
MLA—Micro-Lens Array. A matrix of micro-lenses which are identical in size, shape and orientation.
RPL—Randomly Placed (Positioned) Lenslets (Lenses).
PRPL—Partial RPL.
LSM—Light Shaping Micro-optics. 3D printed optics using lithographic techniques.
HD—High Definition
CGH—Computer-Generated Hologram
SRMS—Surface Relief Micro-Structure
FT—Fourier Transform
PV—Peak to Valley
FWHM—full width half maximum. Typically, the average angular far-field of the Gaussian scatter.
D—Diameter of an aperture
f—focal length of a lens
RSS—root sum square
(x, y, z)—Cartesian coordinate system
$\sigma$—standard deviation in statistics
$\lambda$—wavelength of light
$\Lambda$—grating pitch i.e. distance between grating lines
$\phi$—phase function in optics
$\pi$—ratio of circumference of a circle to its diameter. Used to describe the phase angle in radians
$r$—radial distance from the optical z axis
m—order number in diffraction
n—index of refraction
$\theta$—angle of rays
$\Delta$—difference or small change Mathematical Definition of Zero Order Zero order is a term associated with diffractive optical elements (DOE). The patterns of DOE can sometimes be calculated by using the grating equation:

$$\sin \theta_{out} = \sin \theta_{in} + m\lambda/\Lambda \qquad \text{eq. 1)}$$

Where $\theta_{in}$ is the incident angle and $\theta_{out}$ is the output angle. Where m is the grating order and $\Lambda$ is the grating pitch.

Zero order is the diffractive order m=0, in which direction the rays would have traveled if the DOE were not present. Analogous to zo in the refractive regime (illumination optics), is the term 'specular', referring to the rays traveling in a direction not deviated by scatter. We will use 'zero order' or 'zo' often as substitution for the word 'specular'. The reason is that 'speckle' is an effect associated with scattered laser light, and is unfortunately similar in spelling but opposite in meaning.

The micro-lenses may be scaled shaped to avoid zo rays from dominating the scattered rays. The main purpose of scaling a micro-lens for an FTD is to put it into a refractive (as opposed to diffractive) operating regime to avoid zo rays from dominating the scattered rays.

Some Optical Calculations for Diffractive and Refractive Operating Conditions

Translating between units, 1 wave in free space (vacuum or air) is equivalent to $2\pi$ radians in phase of the wave structure:

$$\lambda(\text{length}) = 2\pi(\text{radians}) \qquad \text{(eq. 2)}$$

For a surface relief micro-structure (SRMS), a physical thickness of the structure, z=□/(n−1)), results in a phase retardation of 2□ (radians) of the wavefront.

$$\square/(n-1) = 2\square \text{(radians)} \quad \text{(eq. 3)}$$

The above equation applies as a paraxial (explanation of paraxial later) limit in optics. Converting srms change in thickness □z, to change in phase □□:

$$\square\square = 2\square\square z(n-1)/\square \text{(radians)} \quad \text{(eq. 4)}$$

For a DOE the basic peak to valley (PV) thickness of its SRMS is designed so that the phase difference is 2□:

$$V = M\square/(n-1) \quad \text{(eq. 5)}$$

$$M = (L-1)/L \quad \text{(eq. 6)}$$

Where L is the number of levels created by the masks in a lithographic system And M is the numerical adjustment made for the number of levels L.

A CGH will have some amount of zo when the above PV condition is not exact. Hence a CGH can only operate well with a monochromatic source (laser). In any real manufacturing process, there will always be some distribution to a parameter, such as PV or laser wavelength, from piece to piece. Hence, some amount of zo is unavoidable with a CGH.

Figure 16A:
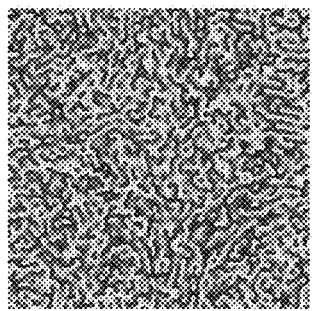
FIG. 16A shows a surface depth description of a CGH.
Figure 16B:
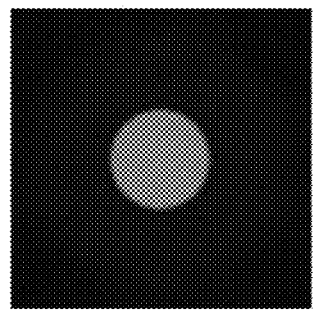
FIG. 16B shows a corresponding far-field pattern for the example of FIG. 16A.

FIGS. 16A and 16B with CGH of a circle and corresponding far-field pattern.

Figure 16C:
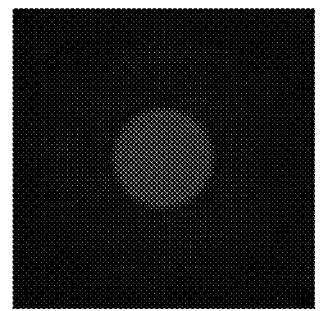
FIG. 16C shows zero order (bright dot in the middle) when the PV≠M☐/(n−1).

FIG. 16C shows zero order (bright dot in the middle) when the PV≠M□/(n−1).

Refractive systems have the advantage over CGH in terms of a broad-band (large wavelength range) coverage. The requirements for avoiding a significant (stand out) zo component are easier to accomplish since it does not have such a narrow (zero width tolerance) requirement. The refractive system has a one-sided limit.

Shaping the Lens

A refractive FTD can be generated by using a multitude of lenses. The geometric angular distribution of rays (far-field or BSDF) is dependent upon the lenslet shape and ratio of the aperture D to the focal length f of the lenslet. The ray directions are determined simply by using Snell's law of refraction at each interface surface:

$$n_1 \sin \square_1 = n_2 \sin \square_2 \quad \text{(eq. 7)}$$

The paraxial regime in optics, is when the angles of rays are so small, that the first order term in the Taylor series for the sine function is dominant, so that can be substituted for sin. The Taylor series of the sine function:

$$\sin \square = \square - \square^3/3! + \square^5/5! \quad \text{(eq. 8)}$$

So, Snell's law can be modified for paraxial rays, and can be calculated using:

$$n_1 \square_1 = n_2 \square_2 \quad \text{(eq. 9)}$$

limit as □$_1$ and □$_2$ approach 0

There are ray tracing programs such as the Zemax® optical design studio that can help calculate the relative geometrical far-field intensity.

Figure 17A:
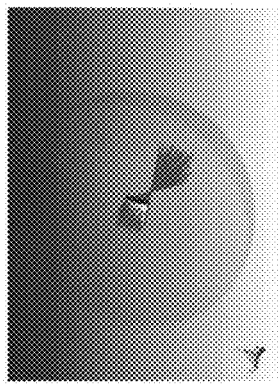
FIG. 17A, shows a geometrical configuration of the lens.
Figure 17C:
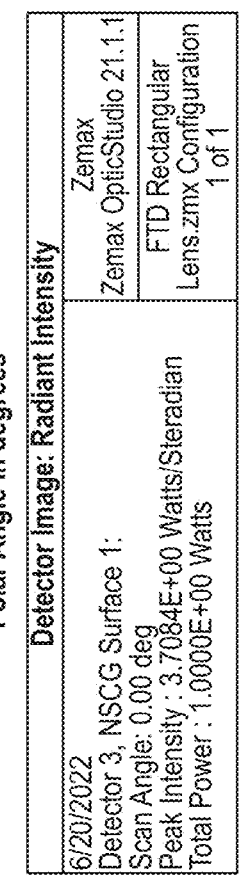
FIG. 17C, shows a 1D slice plot of the intensity distribution.
Figure 17B:
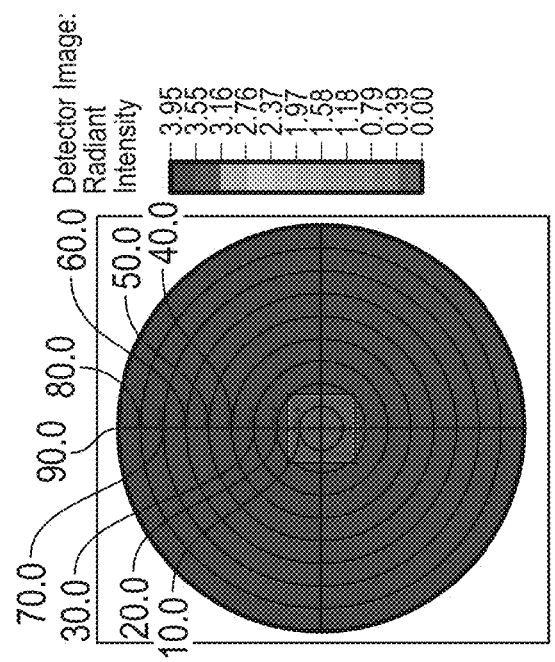
FIG. 17B, shows a 2D intensity distribution in the far-field.

FIG. 17A shows the geometrical configuration of the lens. FIG. 17B shows the 2D intensity distribution in the far-field. FIG. 17C shows a 1D slice plot of the intensity distribution.

The half angle formed by the rays is □ (theta). This related to the aperture diameter D and focal length f of the lens as follows:

$$\tan \square = D/(2f) \quad \text{(eq. 10)}$$

The relationship between the Radius of curvature R and focal length f can be determined by $$1/f = (n-1)/R \text{ or } R = f(n-1) \quad \text{(eq. 11)}$$

The shape of the lens is typically defined by the sag (the distance from vertex in the z direction), which has the following equation for an anamorphic surface:

$$\text{sag}(x,y) = [c_x x^2 + c_y y^2]/[1 + \text{sqrt}\{1 - (1+k_x)(c_x x)^2 - (1+k_y)(c_y y)^2\}] \quad \text{(eq. 12)}*$$

where x and y are the coordinates from the axis of the lens, $c_x = 1/R_x$, $c_y = 1/R_y$, the inverse radii of curvature in x and y directions kx and ky are the conic constants in the x and y directions. The conic constants define the surface shape of the lens. The conic constants define the surface shape of the lens: If k<−1, the surface is a hyperboloid. If k=−1, the surface is a paraboloid. If −1<k<0, the surface is an ellipsoid. If k=0, the surface is a spheroid. If k>0, the surface is an oblate ellipsoid.

Figure 18:
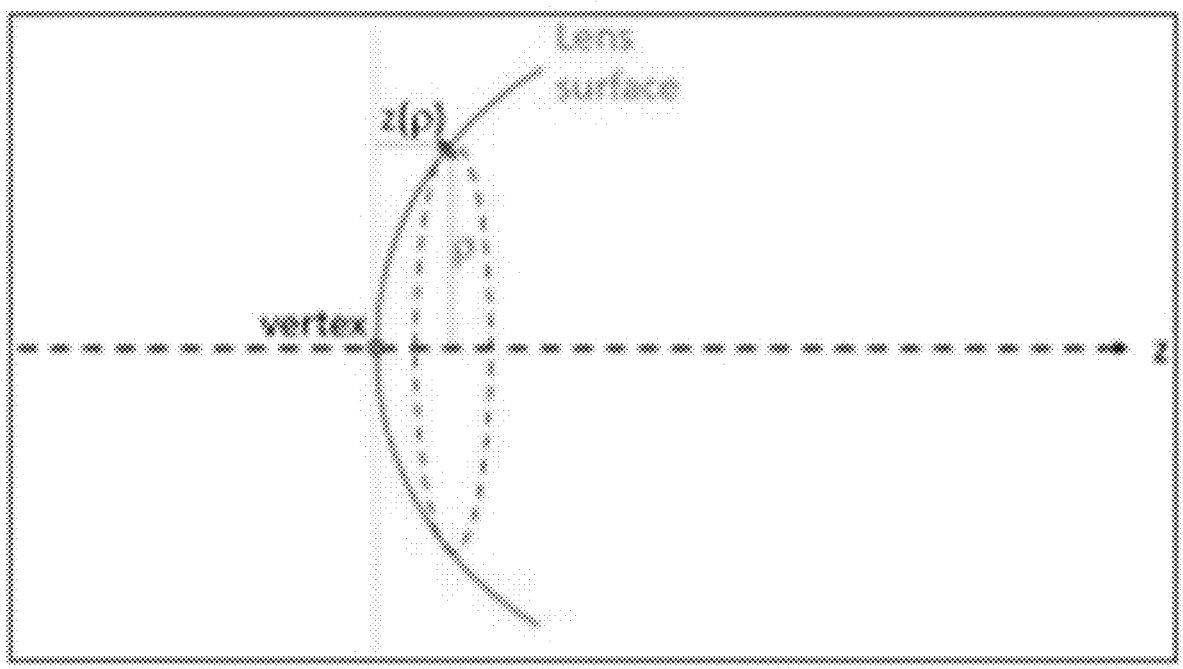
FIG. 18. illustrates the z(☐) description of the sag(x,y).

FIG. 18 illustrates the z(□) description of the sag(x,y). When z(□)=sag(x,y). The surface z is rotationally symmetric about the z axis and $$\square^2 = x^2 + y^2 \quad \text{(eq. 13)},$$

which is the Pythagorean theorem, and □ is the distance from the z axis.

The shape of the lens as defined by the conic constant k, and the index of refraction, determine the intensity distribution (FIG. 17B and FIG. 17C) of the far-field. The lens aperture shape (FIG. 17A) and relative size (to the focal length) determines the boundary shape and angular extent of the far-field distribution (FIG. 17B).

In order to avoid zo, the refractive micro lenses must have the lens scaled, such that the standard deviation □, of the thickness (sag or z direction) of the entire SRMS, produces wavefront differences equal to or larger than □ (longest wavelength of use in the system). In this case, □ is equivalent to the root mean square in other literature (□=rms).

$$\square = \text{sqrt}[\square(\text{sag}(x,y) - \square)^2/N] \quad \text{(eq. 14) (formula for standard deviation)}$$

Where □ is the surface mean height (sag or z), and N is the number of samples (pixel points) in the calculation.

$$\square \geq \square/(n-1) \quad \text{(eq. 15) (minimum physical thickness required)}$$

As an example, most lenses with far-field flat top incoherent irradiance will have a conic constant k near−1 (parabolic).

FIG. 19A is a surface depiction of a paraboloid surface. FIG. 19B is a cross section. The scale will refer to □ generated within the circular aperture.

For a circular aperture, paraboloid shaped lenses, □ with respect to PV in the z direction is precisely:

$$\square \sim PV/\text{sqrt}(12) \quad \text{(eq. 16)}$$

$$\text{Ratio } PV/\square\square \text{sqrt}(12) \sim 3.464101615 \quad \text{(eq. 17)}$$

Figure 20:
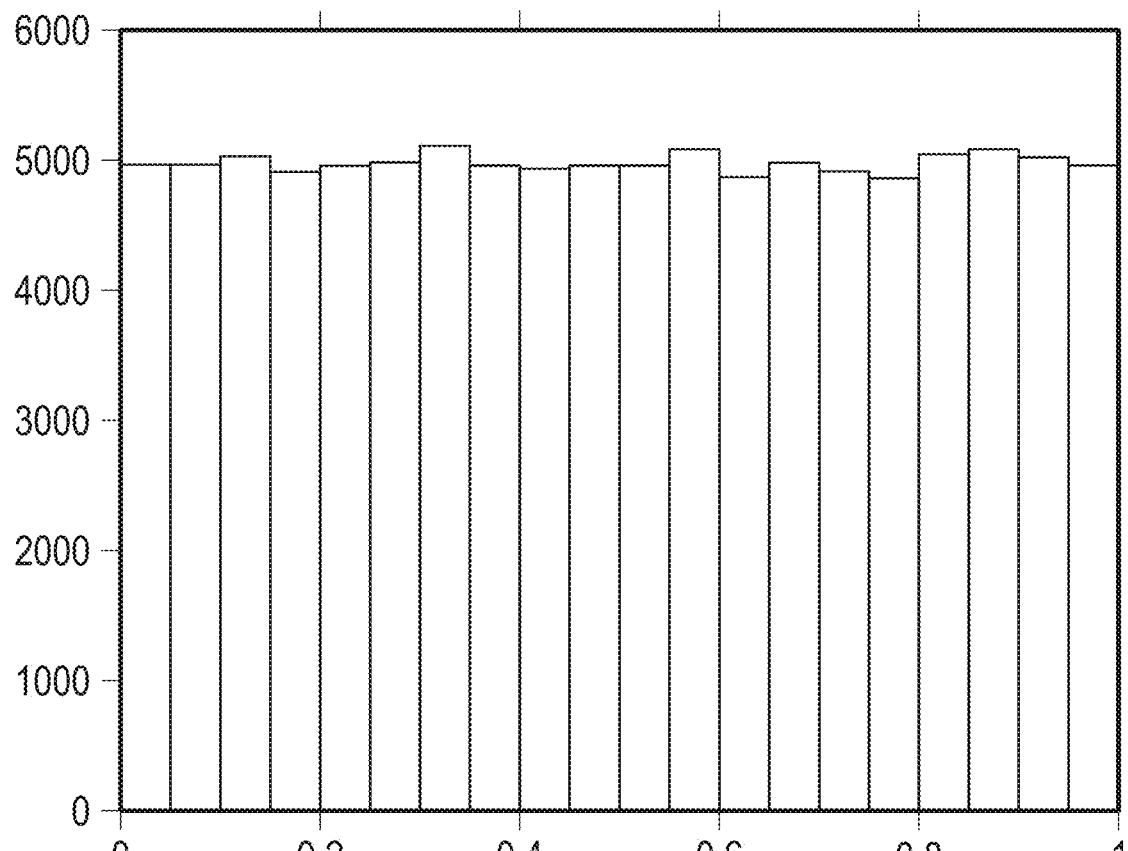
FIG. 20 illustrates a random uniform distribution.

FIG. 20 illustrates a random uniform distribution. The histogram for a random uniform distribution, U(0,1) can be seen in FIG. 20. The standard range is from 0 to 1. Interestingly, the standard deviation ratio, is the same for a random uniform distribution as it is for the parabolic lens. If you treat the PV as the range, then:

$$\text{range}/\square = \text{sqrt}(12) \quad \text{(eq. 18)}$$

To summarize, the PV of a refractive micro-lens must be at least 3.5 times the PV of a diffractive CGH in order to avoid zo.

PV ~3.5□ in a refractive lens

The lenslet is scaled so that its standard deviation meets the condition:

$$\square \ge \square/(n-1) \qquad \text{(eq. 19)}$$

Light Shaping Micro-Optics Design Considerations

The light shaping micro-optics (LSM) is a set of optics which are formed using the following exemplary process:
1. Design a surface relief optic on a computer.
2. Create a 3D file or an image file representing the designed relief optic.
3. Write the image via a laser image writer or an imager onto a photo resist material (coated onto a substrate).
4. Put the photo resist through developer to reveal the final surface pattern. This is the Photo Resist Master.
5. Replicate (copy) the surface relief form onto other materials through as many generations necessary to make an optical part. For example, the submasters can be made from materials such as: room temperature vulcanization (RTV) Silicon based materials, Resin on Plastic substrate, a metallic form such as Nickel. The parts can be made from materials such as: Resin on Plastic substrate, Glass, Resin on Glass substrate, Pure plastic from injection molding process.
6. Coat with anti-reflection or reflective material if required.

The following surfaces can be made using the LSM process (non-exhaustive list) so long as they do not exceed the depth capability of the process (current capabilities are tens of microns): CGH, MLA, RPL, PRPL, LSD, Fresnel Lens, Prismatic and Lenticular.

The MLA may be used as a base layer. The micro lenses (lenslets) of an MLA may be all the same size, shape and orientation. The location of each lens is spaced so that the center to center with the orthogonal neighbor is the boundary size of the lens in that direction. This will be true for the rectangular, square and hexagonal lenses. Other patterns which can fit in a regular pattern orientation would be the diamond and parallelogram.

Elliptical and circular lenses will have their own special arrangement, in which two layers (matrices) are formed. A bottom layer is first formed with spacings equivalent to the diameters in each orthogonal direction. The top layer fills in the gaps (flat spaces) by being centered on the gap areas and overwriting (description of overwriting will follow) the area it occupies.

FIG. 21A shows a regular MLA. FIG. 21B shows the corresponding far-field result of the MLA.

FIG. 21C shows an RPL. FIG. 21D shows the corresponding far-field of an RPL.

FIG. 21E shows an MLA along with PRPL overwritten on in place of MLA preceding it. FIG. 21F shows corresponding far-field pattern of a PRPL.

Using Randomly Placed Lenslets (RPL) in FIG. 21C, the dots formed by the MLA have disappeared (FIG. 21D), but the far-field structure is still not acceptably scattered. All the individual lenslets are randomly positioned in a unit cell, so that there is no regular frequency present. Some additional aspects of this are discussed in U.S. patent. application Ser. No. 16/778,820, the contents of which are hereby incorporated by reference.

Without a regular frequency, the dot pattern (FIG. 21B) disappears.

The far-field of a Partial RPL (PRPL) of FIG. 21F has similar results (FIG. 21D) to the RPL, but some of the benefits of PRPL will be seen later.

The Unit Cell

The unit cell is the repeating structure of the entire mosaic of MLA, RPL or PRPL. As an example, the unit cell can be from 1 mm×1 mm to 1 inch×1 inch. One of the considerations in unit cell size is that the cell size should preferably be larger than the optical beam size (in use) incident on the diffuser, if possible, to avoid high frequency dots. Another consideration for the unit cell size for the unit cell, is for the digital file to be of reasonable memory size, for the computer system to handle. As the memory capacity of computer systems increase, the size of the cell can be made larger. If the memory capacity exceeds the size of the manufactured surface area, the cell will no longer be necessary.

As can be seen with the PRPL (FIG. 21E), the MLA serves as a backdrop to the PRPL. The MLA is necessary to prevent holes (flat areas) in the pattern that would result in zero order. The PRPL fabrication involves overwriting new lenses in the locations previously occupied by other lenses. The process of overwriting of new lenses is a digital algorithm. It directly replaces the height of the new lens in the memory location of the old lenses within the cell. The distribution of the PRPL positions are uniformly random in both x and y. The density of the random lenses in the unit cell is preferably optimized in the optical design. As the PRPL leverage off of the MLA, from here on, we will refer to PRPL as the combination of an MLA and PRPL.

Pseudo-Random Structure of a Light Shaping Diffuser (LSD) Pattern (Holographic Diffuser)

An additional smoothing process may be performed by convolution of cell lenslets and a LSD. As can be seen by the far-field of the RPL (FIG. 21D) and PRPL (FIG. 21F), the dot structure has disappeared, but still leaves a scatter pattern which is undesirable. We can combine the function of the LSD (See, e.g., U.S. patent application Ser. No. 17/455,820, the contents of which are hereby incorporated by reference) to the previous pattern types, the MLA, RPL and PRPL. This helps smooth out the structures through the process of convolution.

Figure 22:
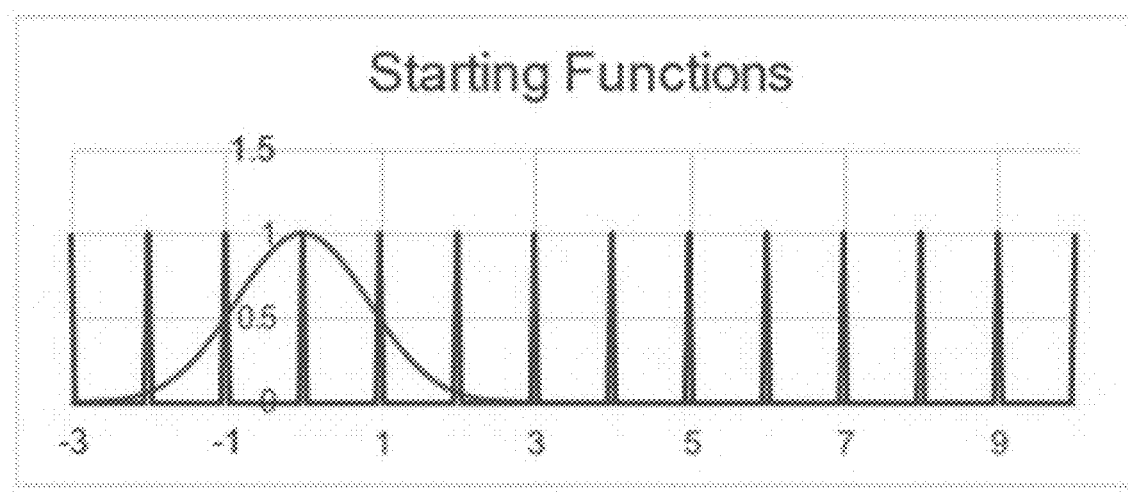
FIG. 22 illustrates the starting functions for a convolution, a Gaussian and a comb.
Figure 23:
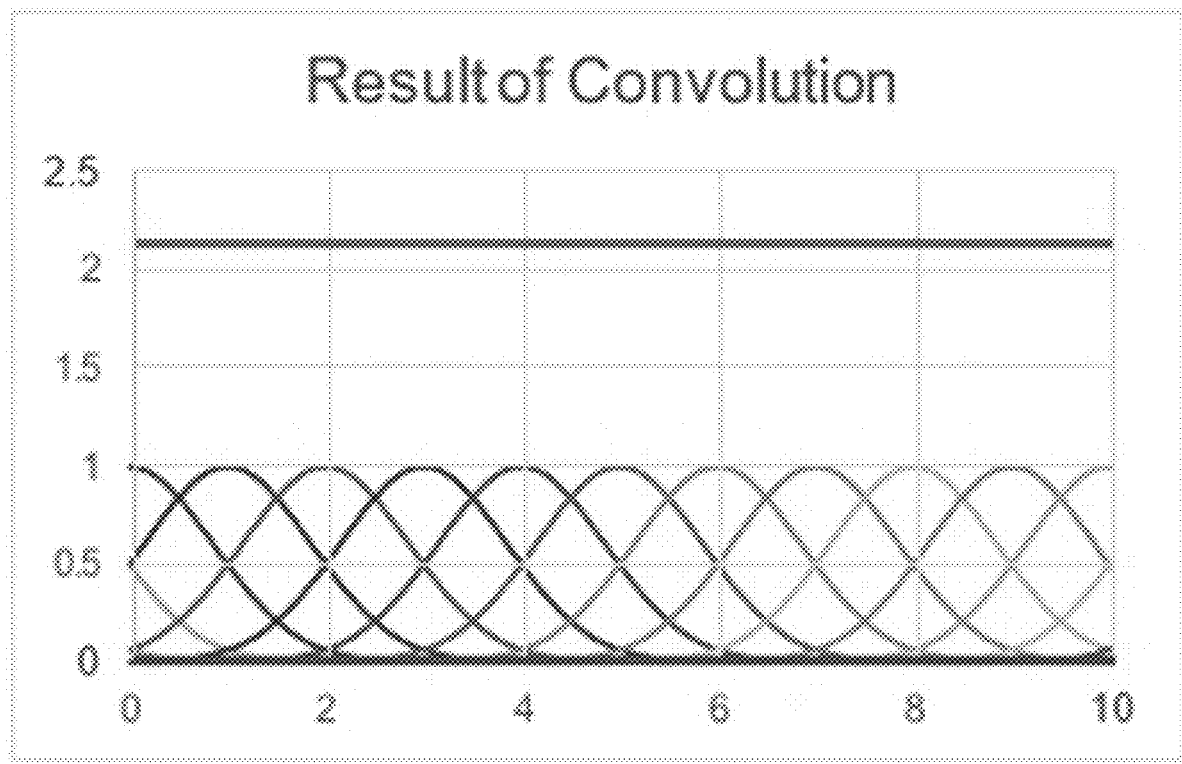
FIG. 23 shows the result of the convolution of the Gaussian and comb functions.

FIG. 22, the starting functions for a convolution, a Gaussian and a comb. FIG. 23 shows the result of the convolution of the Gaussian and comb functions.

The laser dots caused by diffraction pattern of MLA can be represented by the comb function in FIG. 22. The far-field pattern coming from the diffuser can be represented by the Gaussian (FIG. 22) as a simplification.

When the structure height of the two surface relief functions (MLA and LSD) are added together, the functional far-field output can be calculated as the convolution of the two individual far-field functions (Gaussian and comb in FIG. 23). The convolution of the two individual far-field functions (Gaussian and comb) is a flat (constant, uniform) pattern. (See, e.g., Introduction to Fourier Optics by Joseph W. Goodman, the contents of which are hereby incorporated by reference). Optimally, the FWHM (full width half maximum) of the diffuse Gaussian should be sized about twice the dot separation angle. As an example, if the diffraction dots were spaced 1 degree in X by 2 degrees in Y, then the diffuser portion would need to be designed 2 degrees in X and 4 degrees in Y. Convolution works similarly for the RPL and PRPL.

The Light Shaping Diffuser

Consider now the function of the LSD in more detail. The function of light diffusers is to scatter light. They are used in various industries which have an illumination or imaging function associated with the device. In a broad sense, the scattering mechanism (properties) can be within the volume and/or at the surface of the device. The atmosphere or even some colloidal liquids can act as a volume type diffuser. Solid materials which contain non-homogenous materials or gas bubbles, can scatter light. Glass can be ground on the surface or sand blasted to have scattering properties.

The light shaping diffuser is a surface relief microstructure (SRMS), FIGS. 24A through 24H shows a LSD formed by capturing the light pattern of an analog holographic optical setup. Hence the LSD is a surface type of optical diffuser, which can also be referred as a Holographic Diffuser. The recording of the master (original pattern) uses standard lithographic materials and processes. The measurement by a 3D microscope of the diffuser can be used to capture (digitized) the functional form of the surface.

Figure 24A:
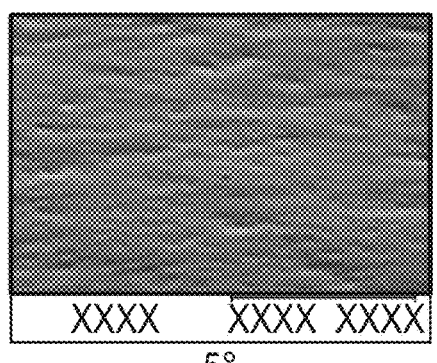
FIGS. 24A, 24B, 24C, 24D, 24E, 24F, 24G, and 24 H show diffuser surfaces which result in various angles include 5 degrees, 10 degrees, 20 degrees, 40 degrees, 50 degrees, 60 degrees, 70 degrees, and 80 degrees, respectively, where smaller angles have lower profile waves.
Figure 24B:
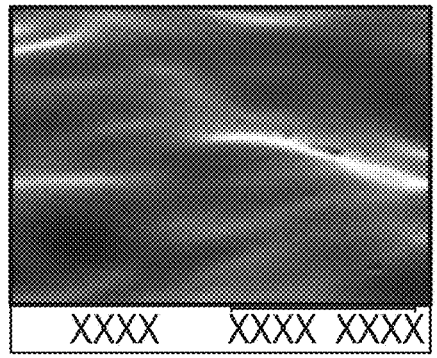
Figure 24C:
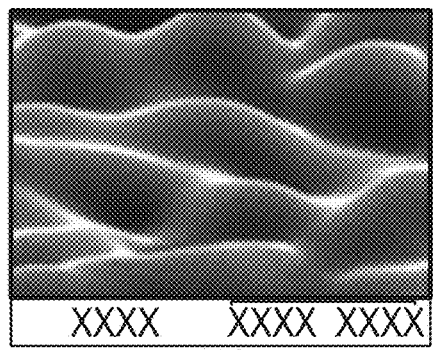
Figure 24D:
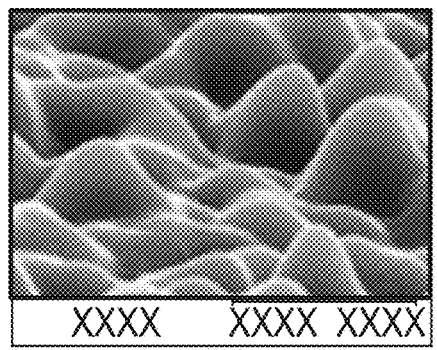
Figure 24E:
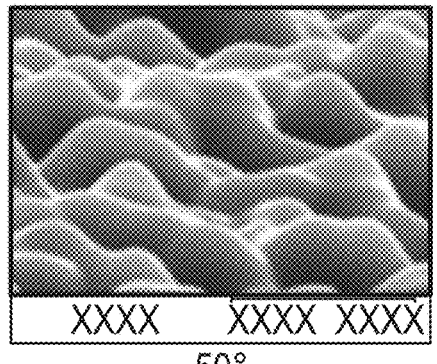
Figure 24F:
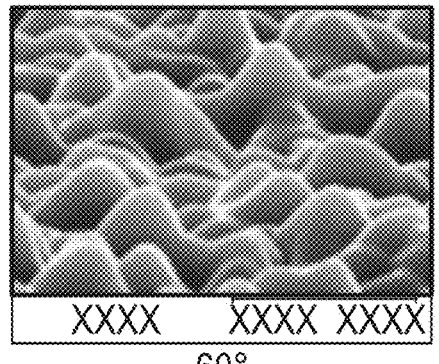
Figure 24G:
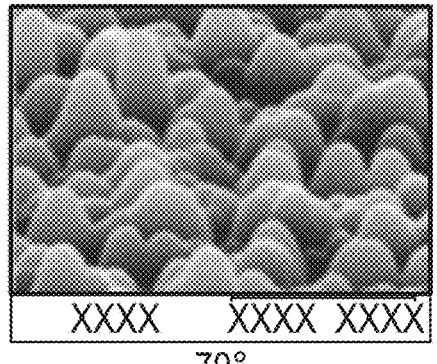
Figure 24H:
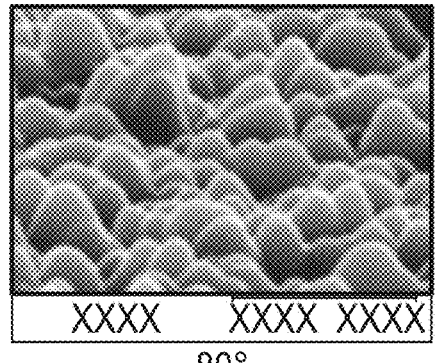
Figure 25A:
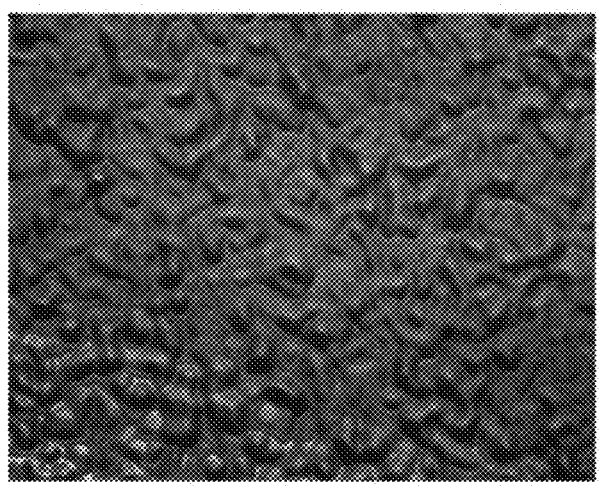
FIG. 25A is an image from an optical microscope.
Figure 25B:
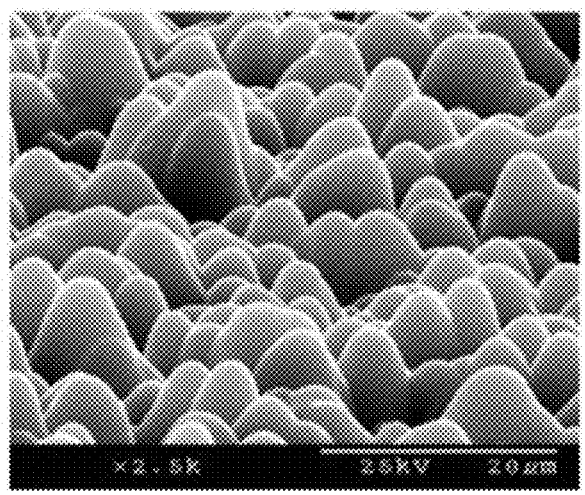
FIG. 25B is an image from a scanning electron microscope.
Figures 26A, 26B:
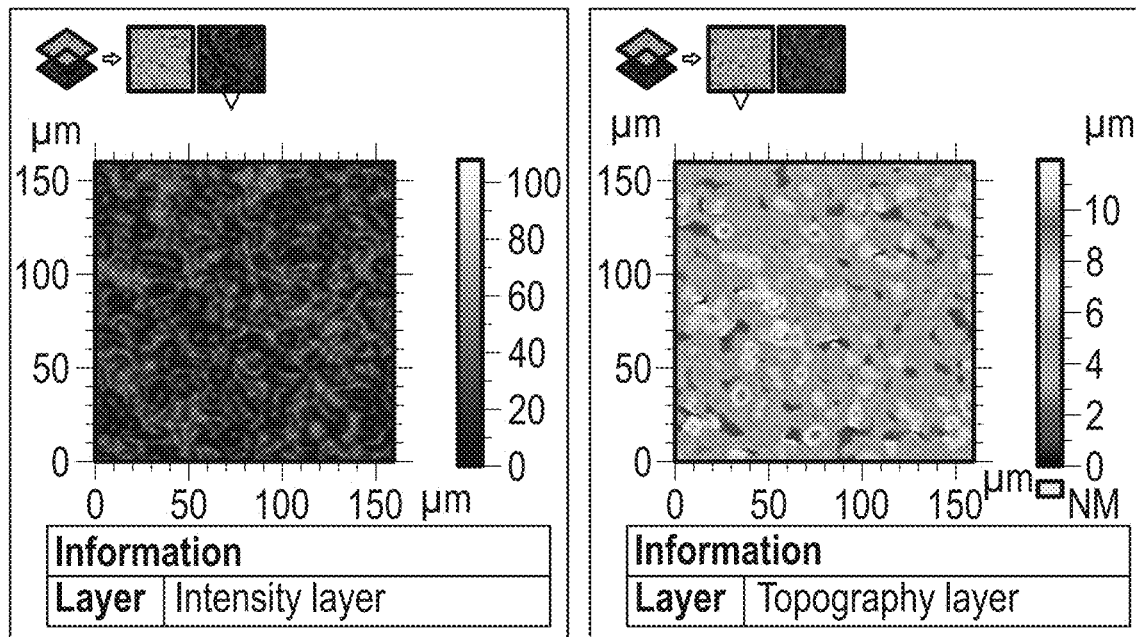
FIGS. 26A, 26B, and 26C are images from a 3D confocal microscope.
Figure 26C:
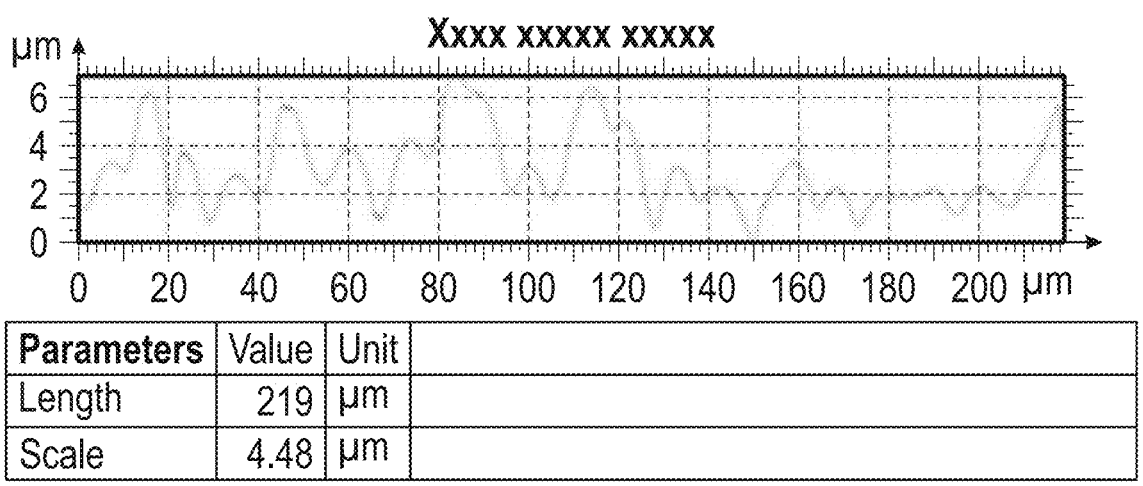

FIG. 24 A through FIG. 24H, show diffuser surfaces which result in various angles. Smaller angles have lower profile waves. FIG. 25A is an image from an optical microscope. FIG. 25B is an image from a scanning electron microscope. FIGS. 26A, 26B and 26C are images from a 3D confocal microscope.

Figure 27A:
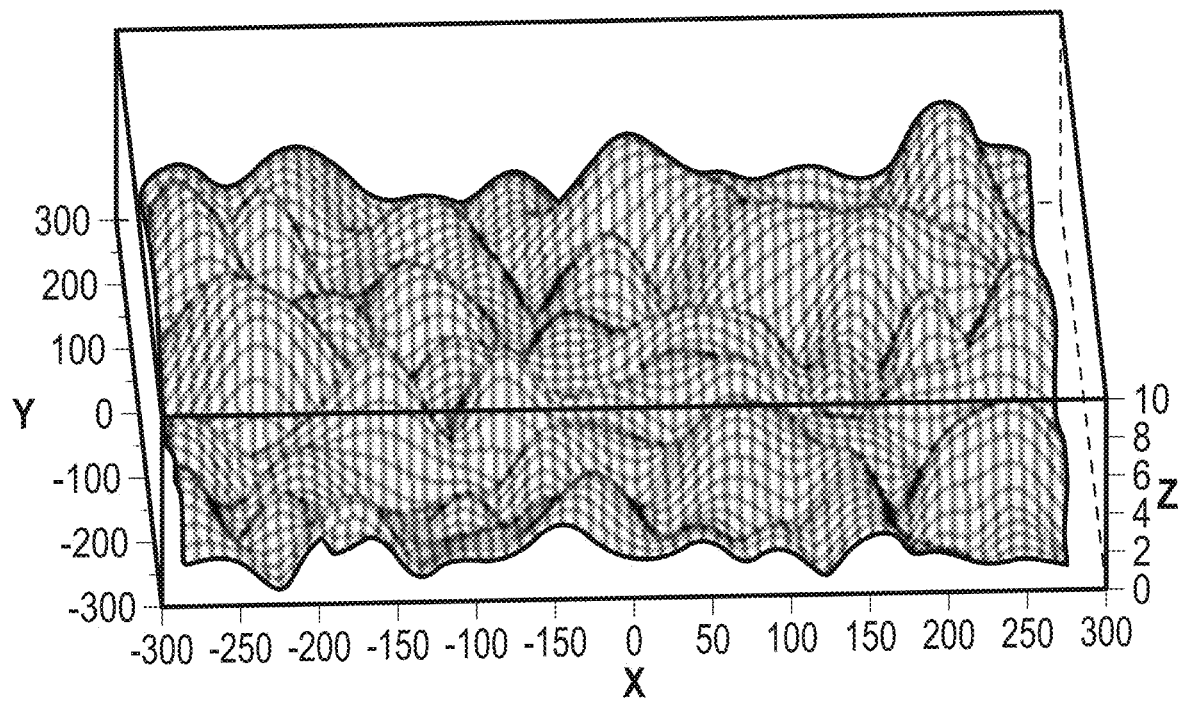
FIGS. 27A and 27B are digital representations of the LSD.
Figure 27B:
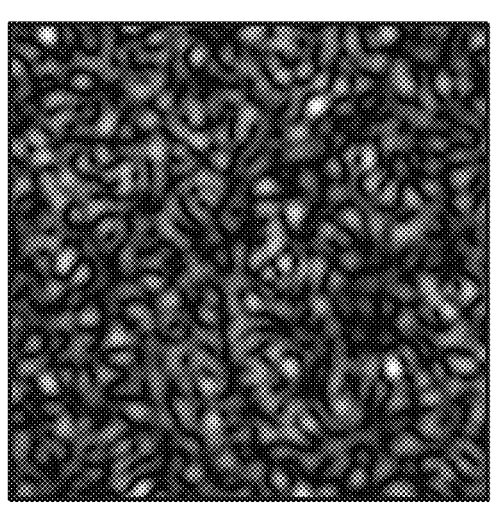
Figure 27C:
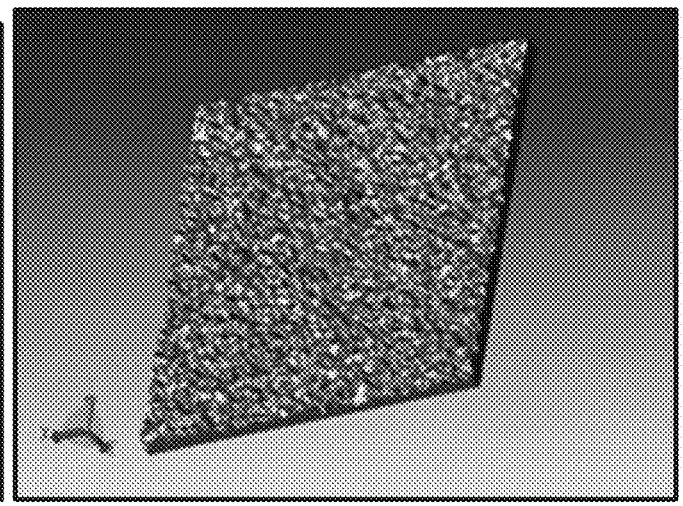
FIG. 27C is the rendering in the Zemax® optical design software of an LSD.

FIGS. 27A, 27B, and 27C are digital representations of the LSD. FIG. 27C is the rendering in the Zemax® optical design software of an LSD.

Eq. 20, is a highly complex mathematical equation and is shown in FIG. 28. Eq. 20 is found in "Tribute to Emil Wolf: Science and Engineering Legacy of Physical Optics". SPIE Press 2005. Chapter 5 "Physical Optics at Physical Optics Corporation" by Tomasz P. Jannson.

The shape of the LSD is a pseudo-random structure, as illustrated in (FIG. 24 through FIG. 27). The mathematical expression is complex and there is no simple mathematical expression (eq. 20) to describe the shape. Characteristically, each LSD has a lower lateral limit to the feature sizes. We can consider the valleys of the pattern (FIG. 27B) caused by erosion by rivers (dark areas). The lateral distance from one river to an adjacent river, can be considered the feature size.

The LSD also has a particular statistical height distribution, which is known as the Rayleigh distribution). The Rayleigh distribution is part of a class of distributions called the Weibull distribution (Rayleigh=Weibull shape 2)*4. The Weibull distribution is used in statistics.

The Probability Distribution Function of the Weibull distribution can be written:

Weibull pdf(x)=(shape/scale)[(x/scale)^(shape−1)]exp[−(x/scale)^shape],when the range x>=0.Weibull pdf(x)=0,when x<0. (Eq. 21)

FIGS. 29A to 29C illustrate importing an 80 deg FWHM LSD into Zemax® and performing ray tracing.

FIGS. 30A to 30C illustrate importing a 3.5 deg FWHM LSD into Zemax® and performing ray tracing.

Figure 31A:
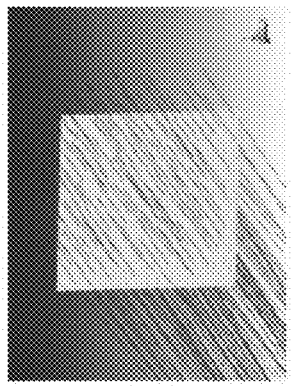
FIGS. 31A, 31BC, and 31 C illustrate examples of LSD surface functions imported into a non-sequential ray trace program such as Zemax® FIG. 31A
Figure 31C:
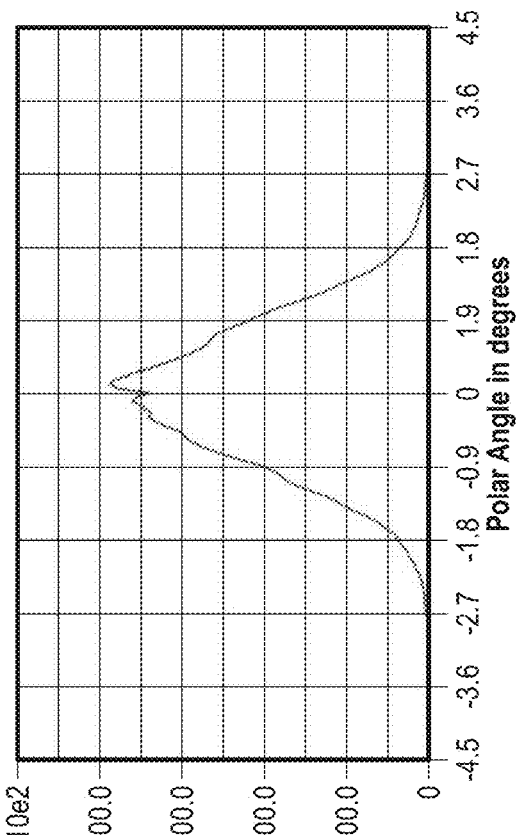
FIG. 31C illustrates a polar output in which a low angle LSD has an intensity distribution close to a statistical Gaussian distribution.
Figure 31B:
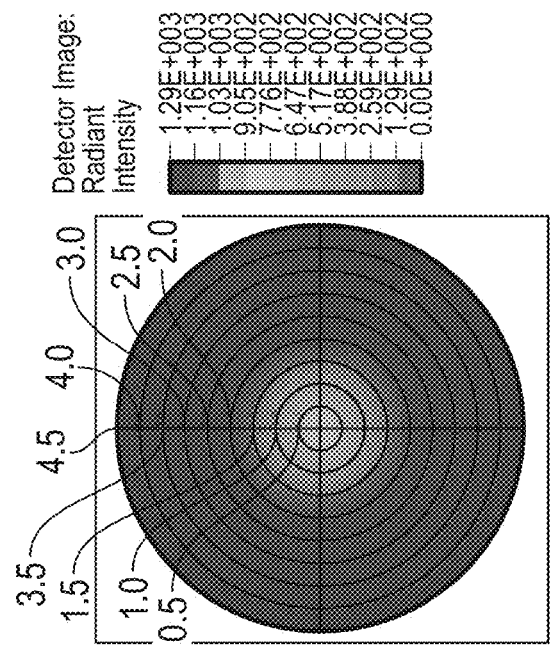

FIGS. 31 A to 31C show importing a 2 deg FWHM LSD into Zemax® and performing ray tracing.

When the LSD surface function is imported into a non-sequential ray trace program such as Zemax® (FIG. 31), the output result of a low angle LSD is close to a statistical Gaussian distribution.

FIG. 32A shows LSD texture represented by a shade of grey. FIG. 32B and FIG. 32C show the output analysis of FIG. 32A using a FT analysis.

So, the far-field function of the LSD is a statistical scatter function which has a Gaussian envelope (FIG. 32B and FIG. 32C).

Since the MLA, RPL, PRPL and LSD are all SRMS, they can be replicated via a mechanical process which transfers the surface from part to part. With this feature the MLA, RPL or PRPL can be placed on one side of a film and the LSD on the second side. However, it is less expensive as a product to have both functions on the same side, and only replicate one side. To do this, the heights of both functions are combined at each (x,y) coordinate (pixel) point. We will call this process overlay.

$$\text{Overlay}(x,y)=\text{function1}(x,y)+\text{function2}(x,y) \qquad \text{(eq. 22)}$$

To see what effects the overlay process results in, we must examine the Fourier Transform in more detail.

A More in Depth Look at the Fourier Transform

As a modeling tool, the Fourier Transform (FT) is very useful in optics to examine the wave (diffraction) characteristics of an optical system.

The FT math extracts the frequency content of a signal, along with amplitude and phase. The far-field angular pattern of a structure can be calculated as the FT of the structure. The key is to understand how to represent the structures and light in the model. Most optical functions can be represented by the amplitude and phase or how it modifies the amplitude and phase of what enters.

Let some function g(x) be the function under examination. Then the Fourier Transform of g is expressed:

$$F\{g(x)\}=\int g(x)\exp[-j2\pi x f x]dx=G(fx) \qquad \text{(eq. 23)}$$

The F{ } is the notation for FT of the function within { }
Here g represents a function in x space
The integral ∫ is performed from negative infinity to infinity (−∞ to ∞)
Where j is the base of the imaginary number, square root of negative one (j=sqrt[−1]) The output function G is a function of the frequency space fx
The FT can also be evaluated in 2-D space with $$F\{g(x,y)\}=\int g(x,y)\exp[-j2\pi(x\,fx+y\,fy)]dx\,dy=G(fx,fy) \qquad \text{(eq. 24)}$$

A Look at Convolution in Context of the Fourier Transform

The FT can be used to calculate the convolution. Let's use the notation ж to denote convolution between two functions. Let g ж h can be read, g convolve with h. Let G and H be the FT of g and h respectively. Then the convolution theorem for FT states that:

$$F\{g \text{ ж } h\}=G\,H \qquad \text{(eq. 25)}$$

$$F\{g\,h\}=G \text{ ж } H \qquad \text{(eq. 26)}$$

Where the FT of convolution of 2 functions lead to the multiplication of their individual FT in FT frequency space. And the FT of product of 2 functions is equal to the convolution of the 2 individual FT functions Converting Surface Relief Micro-Structure from Physical Units to Phase CGH are phase masks. So, a conversion needs to be made from the physical height to phase. Similarly, the lenslet cell (MLA, RPL, PRPL) can be considered phase masks and converted into complex notation. The LSD can also be converted into complex notation if the function shape can be described accurately.

Let us consider a function $g_z$ to be some generic SRMS, where the Z height of the function is known within the unit cell, covering an area described by the coordinates (x,y).

In order to convert the height to phase we go back to our previous equation:

$$\phi=2\pi z(n-1)/\lambda \text{ (radians)} \qquad \text{(eq. 27)}$$

$$g^\sim=(2\pi(n-1)/\lambda)g_z \qquad \text{(eq. 28)}$$

The conversion is linearly scaled so it is relatively simple just to scale the matrix representing the function from a physical height to a phase value.

Next, we want to represent the function for the Fourier Transform. We need to simply insert the phase g into the exponent of the natural base e, where $G_C$ is a complex valued function.

So, to find the far-field of an SRMS gz, you simply take the FT of the $g_C$.

$$F\{g_C(X,Y)\} = G_C(fX, fY) \quad \text{(eq. 30)}$$

GC is the complex field description. What humans see in the far-field is the intensity, which is a real valued function. To obtain the intensity, the function is GC multiplied by its complex conjugate at every point (fX,fY).

If a complex function C=a+j b (eq. 31), then the complex conjugate is C*=a−j b (eq. 32) C C*=(a+jb)(a−jb)=a²+b² (eq. 33)

$$I = G_C G_C^* = G_a^2(fX, fY) + G_b^2(fX, fY) \quad \text{(eq. 34)}$$

Overlay Interpreted Through Fourier Transform

So for the process of overlaying (L), the resultant function of adding 2 separate functions is simply the sums of the functions at each point in the coordinate (X,Y).

$$L_Z = \text{Overlay}_Z = g_Z + h_Z \quad \text{(eq. 35)}$$

Hence it follows that the phase values also add, since it is linear $L_\square = \text{Overlay}_\square = g_\square + h_\square$ (eq. 36)

So the complex valued function is:

$$L_C = \exp[jL_\square] = \exp[j(g_\square + h_\square)] = \\ \exp[jg_\square]\exp[jh_\square] = g_C h_C \quad \text{(eq. 37)}$$

Notice that the addition of the separate phase values is the same as the multiplication of the separate function since the phase is inserted into the exponent. Recalling that multiplying the individual functions in one space, leads to the convolution in the Fourier frequency space.

$$F\{L_C\} = F\{g_C h_C\} = G_C \circledast H_C \quad \text{(eq. 38)}$$

The result of overlaying (adding at every coordinate point) the height of two separate SRMS is the convolution of their individual functions in the far-field.

Some More Optimization with Scaling

The following graphs depict the resultant far-field of a lens which is randomly placed laterally.

FIG. 33A shows a pattern of a flat top diffuser with lenses placed randomly in X-Y plane.

At minimum refractive lenses need to have the □ thickness equivalent to the 2□ phase depth to confuse the phase of the wavefront. However, with coherent sources, □ needs to be a higher value.

FIG. 33B shows a coherent diffraction pattern typical of rectangular flat top diffusers. FIG. 33C shows a summation across rows and columns. FIGS. 33A, 33B, and 33C show the result of □ being equal to 2□ phase depth.

Figure 34A:
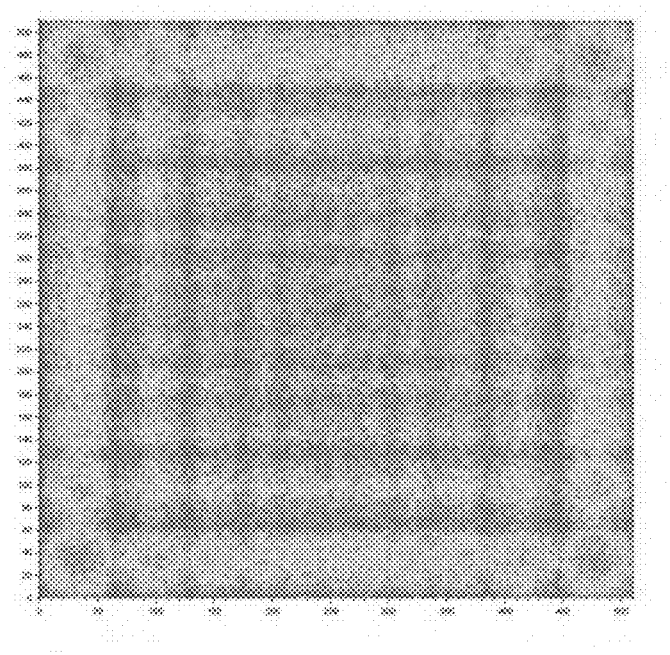
FIG. 34A shows a diffraction pattern of a rectangular flat top diffuser.
Figure 34B:
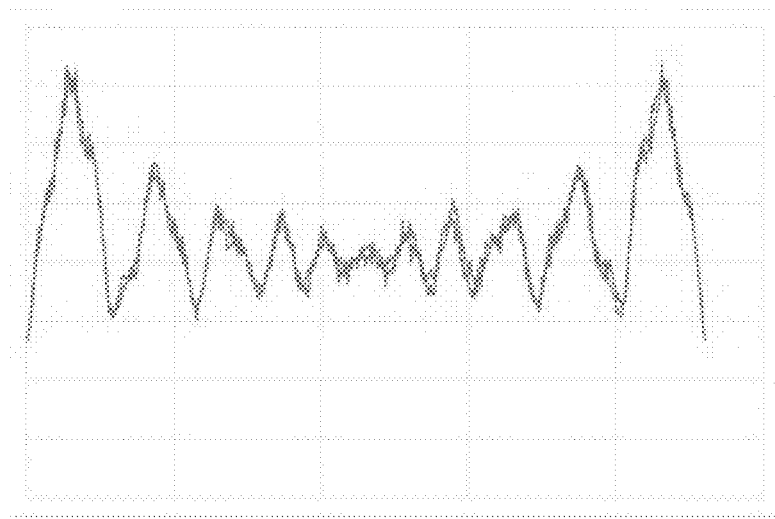
FIG. 34B illustrates summation across rows and columns.

FIG. 34A shows diffraction Pattern typical of Rectangular Flat Top Diffusers. FIG. 34B illustrates summation across rows and columns. FIGS. 34A and 34B shows the result of □ being 1.8 times the 2□ phase depth. In order avoid this pattern, the depth of the lenses are arranged to reach a constant frequency.

Figure 35A:
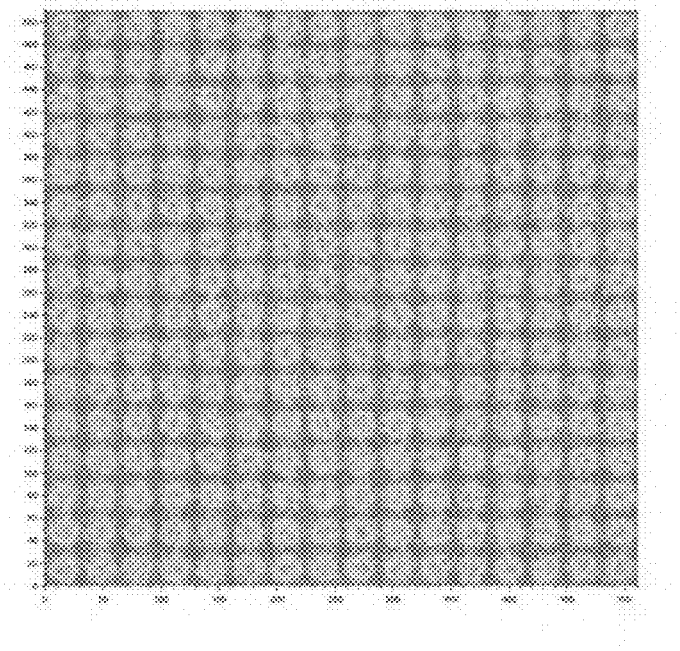
FIG. 35A illustrates a diffraction pattern typical of rectangular flat top diffusers.
Figure 35B:
FIG. 35B illustrates summation across rows and columns.

FIG. 35A shows diffraction pattern typical of Rectangular Flat Top Diffusers. FIG. 35B shows the summation across rows and columns. FIG. 35C shows the result of □ being 2.8 times the 2□ phase depth.

The final component is to overlay a pseudo random structure which is used to form light shaping diffusers which have a Gaussian distribution in the far-field.

Figure 36A:
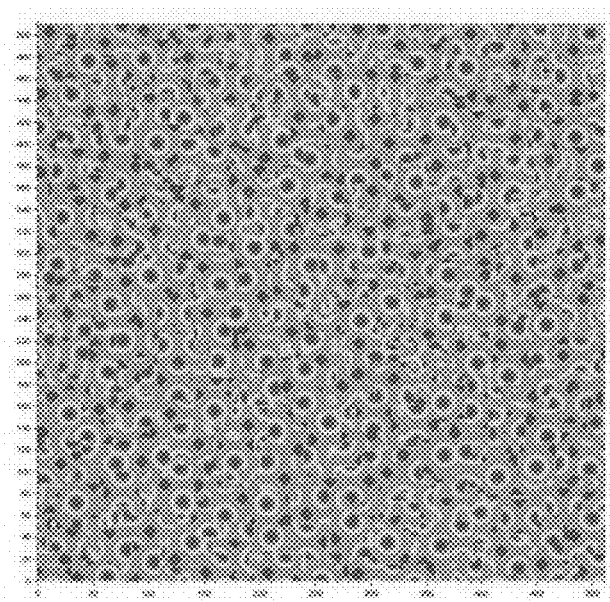
FIG. 36A illustrates randomly placed lenses.
Figure 36B:
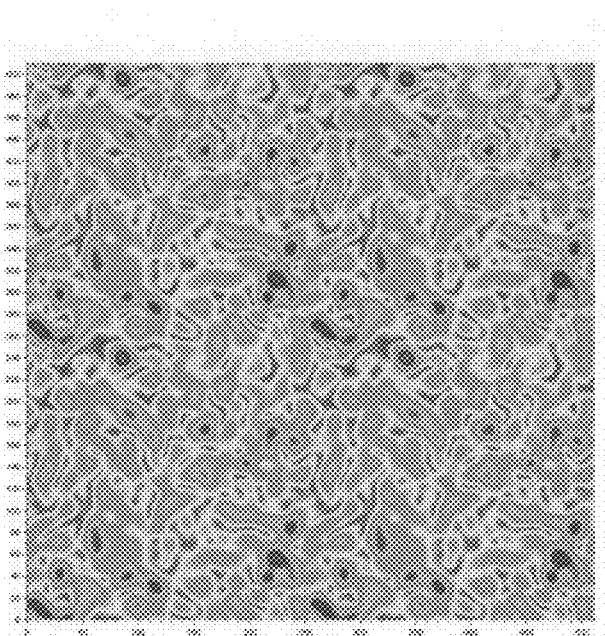
FIG. 36B illustrates a pseudo random structure which is used to form light shaping diffusers which have a Gaussian distribution.

FIG. 36A shows the randomly placed lenses. FIG. 36B shows the pseudo random structure which is used to form light shaping diffusers which have a Gaussian distribution.

Figure 37A:
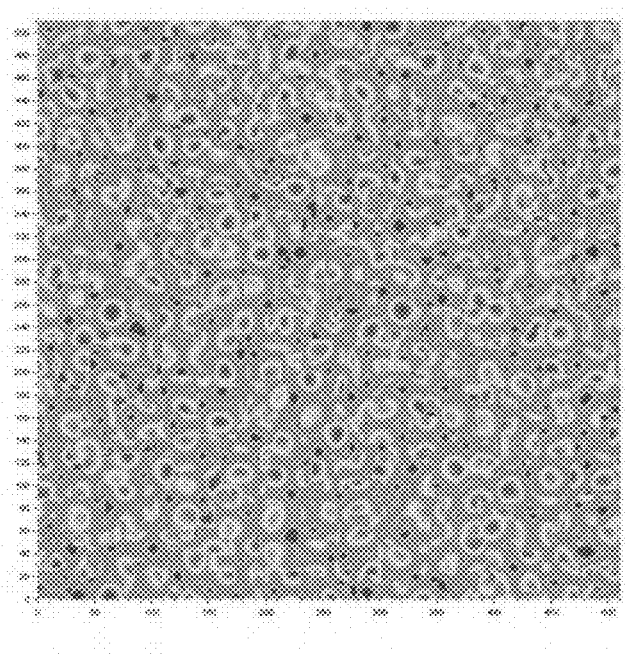
FIG. 37A is the combined surface of FIG. 36A and FIG. 36B.

FIG. 37A shows the combined surface of FIG. 36A and FIG. 36B. The resultant far-field image FIG. 37B.

Figure 37B:
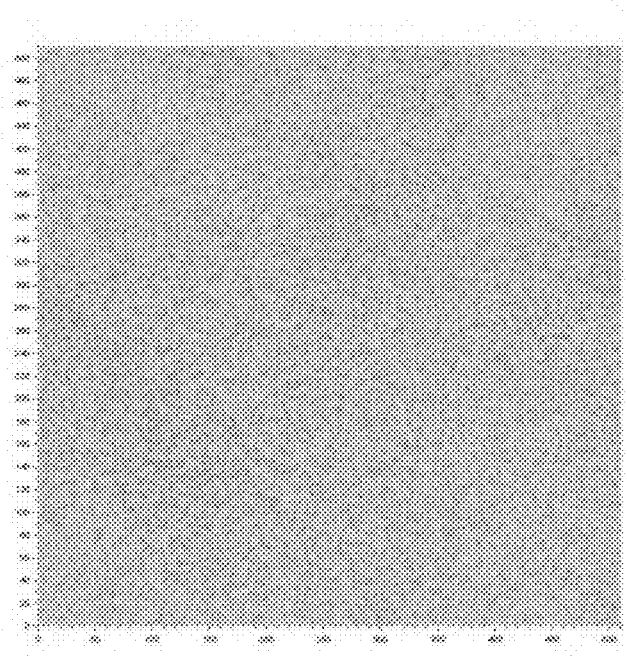
FIG. 37B is the resultant far-field pattern of the combined surface of FIG. 37A.
Figure 38A:
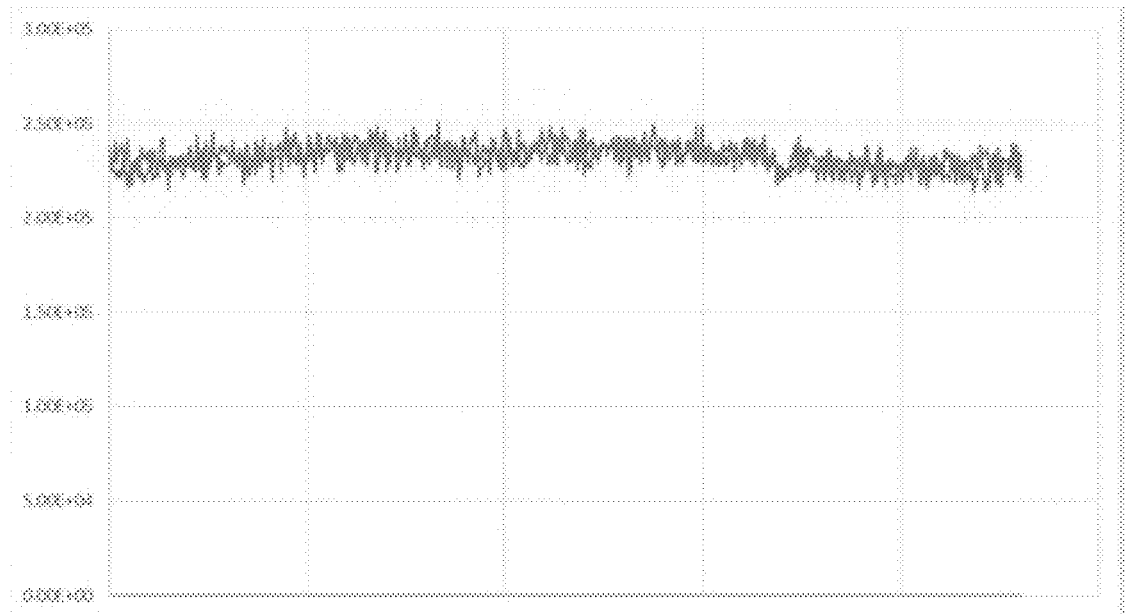
FIG. 38A is the summation of FIG. 37B in each direction (low frequency).
Figure 38B:
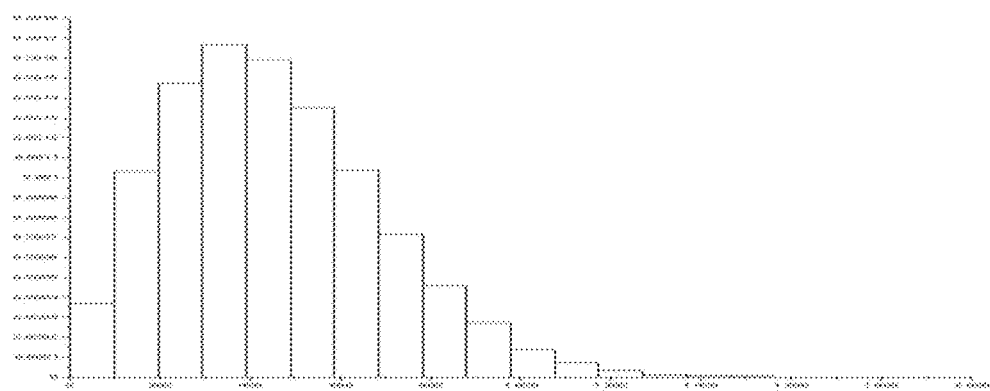
FIG. 38B is the histogram of the heights of the speckle field (high frequency) of FIG. 37B.

FIG. 38A is the summation of FIG. 37B in each direction (low frequency). FIG. 38B is the histogram of the heights of the speckle field (high frequency) of FIG. 37B.

Figure 39A:
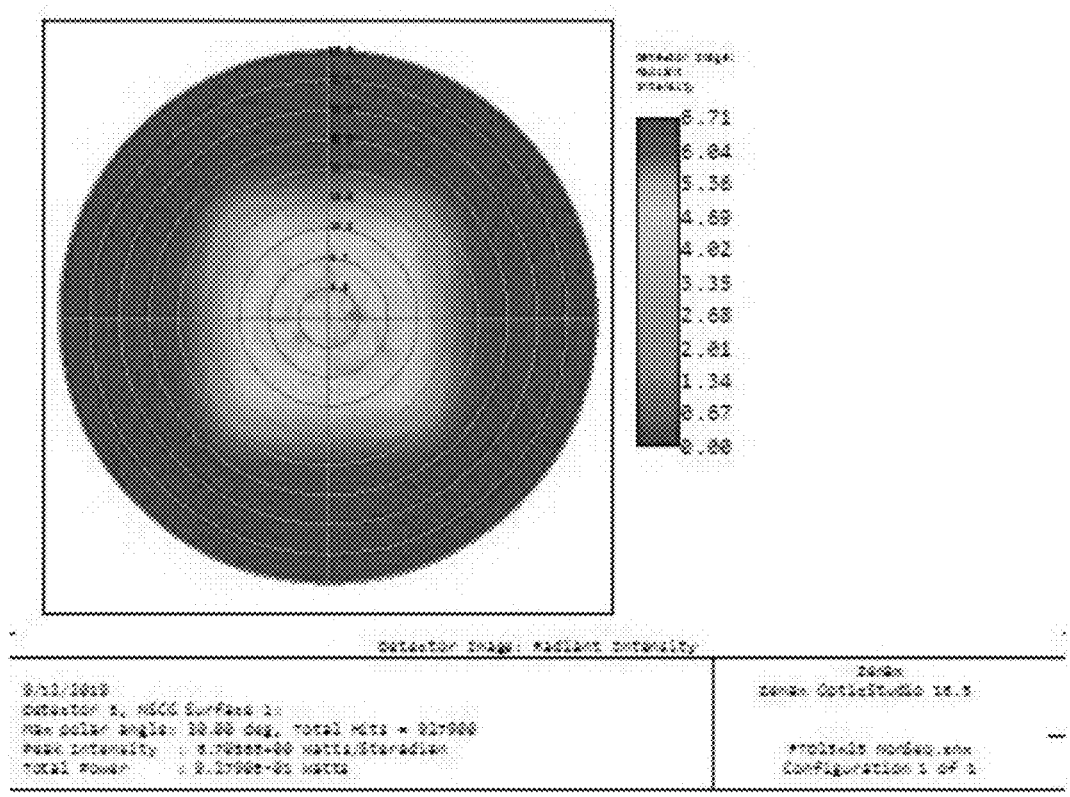
FIG. 39A shows a Radiant Intensity (Watts/Steradian) optical output distribution.
Figure 39B:
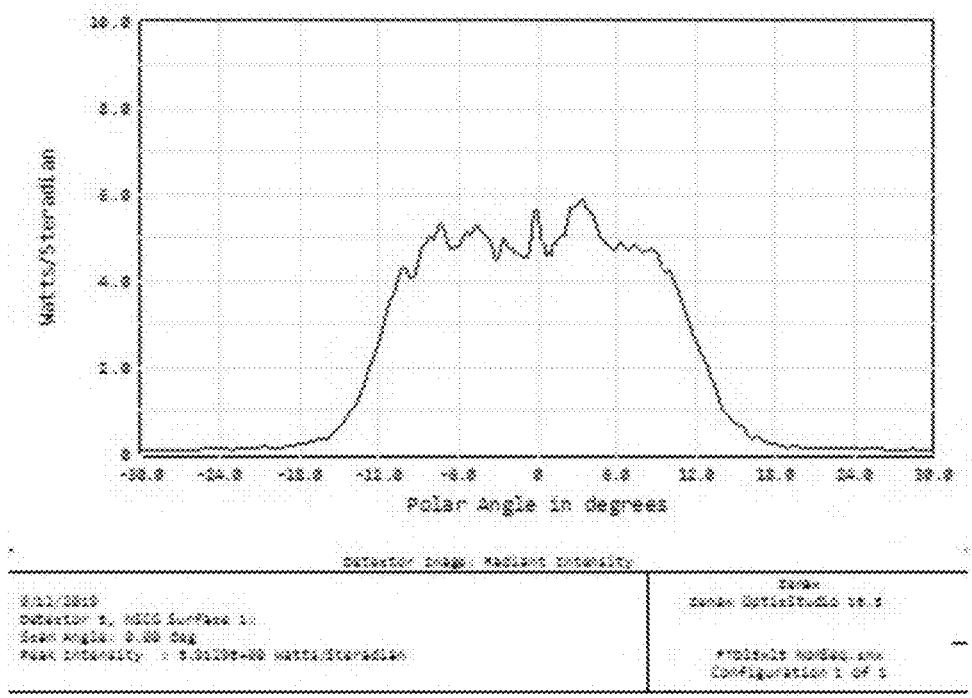
FIG. 39B shows a slice plot.

FIG. 39A shows the Radiant Intensity (Watts/Steradian) distribution. FIG. 39B shows a slice plot. Both are resultant of an incoherent ray trace in Zemax®.

Figure 41:
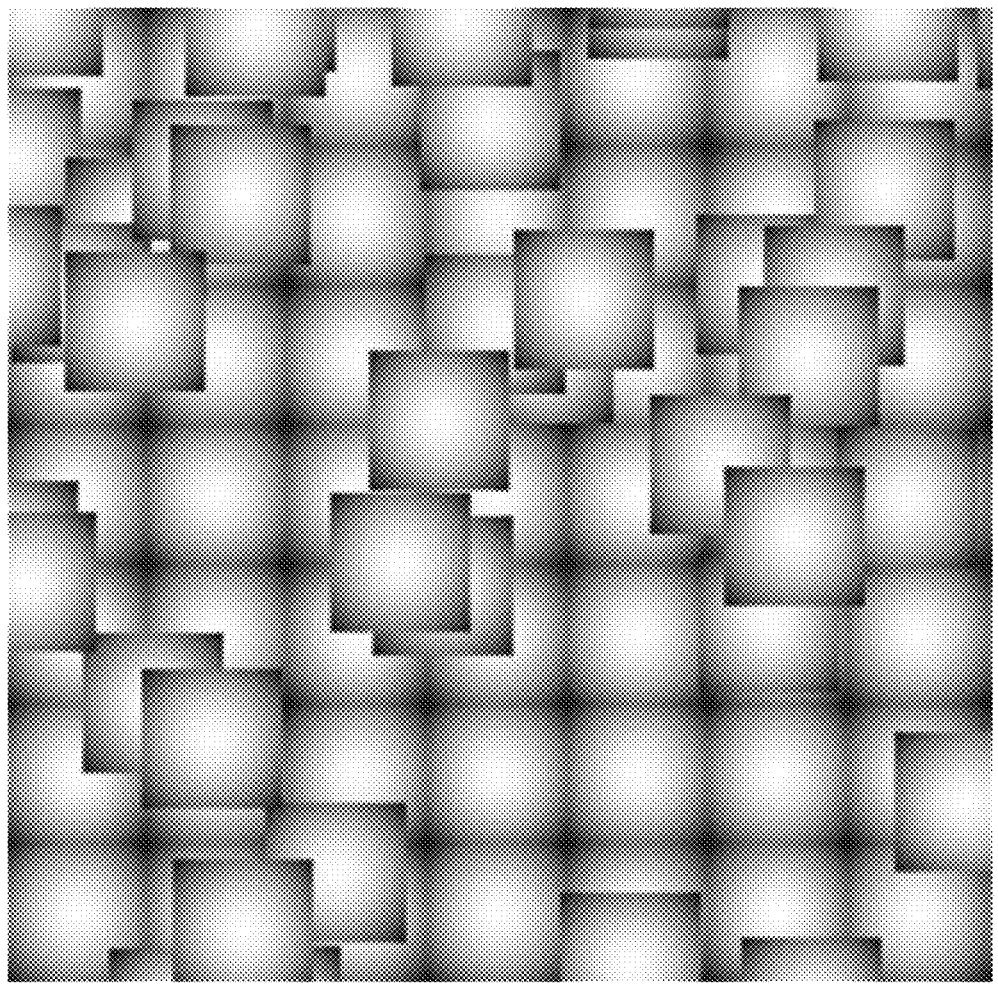
FIG. 41 illustrates a MLA with partial randomly positioned lenslets (RPL).
Figure 42:
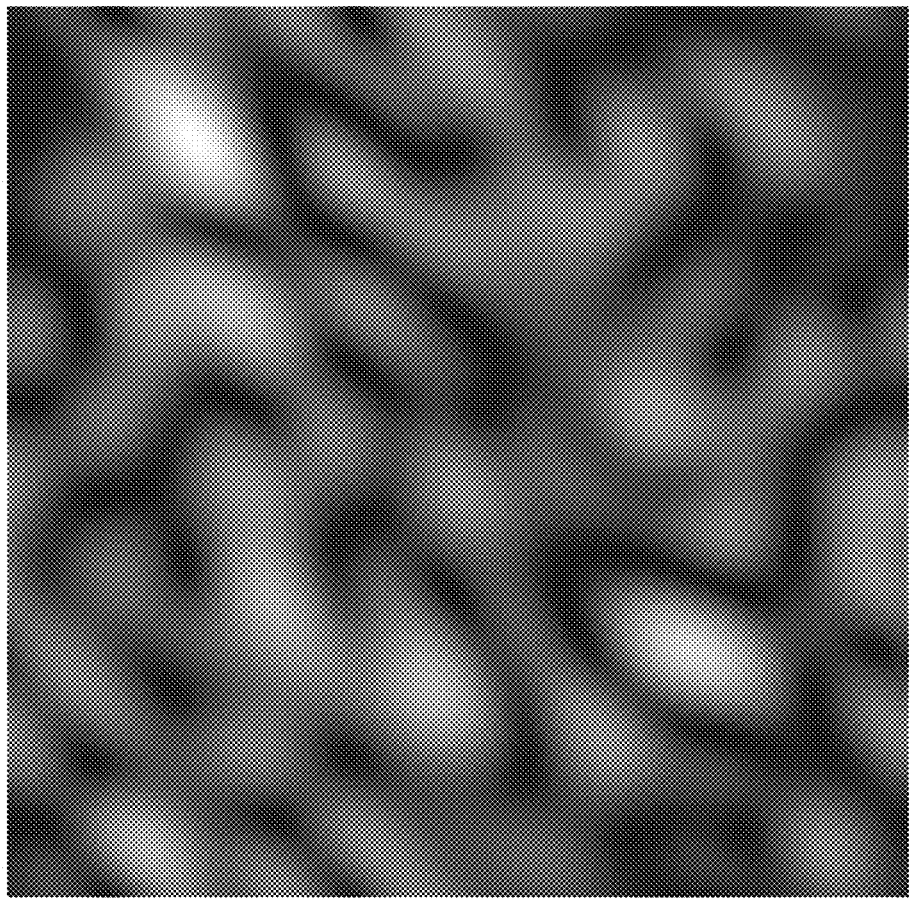
FIG. 42 illustrates the 3-D digital profile of a Light Shaping Diffuser.

Utilizing a regularly spaced micro lens array (MLA, FIG. 40), overwrite the MLA partially with micro-lenses (FIG. 41) which are randomly positioned lenslets (PRPL) in X-Y, sized specifically to a certain depth (z) with respect to the wavelength (λ) of use. And then combined (add the physical heights) with a pseudo random light shaping diffuser (LSD) pattern (FIG. 42).

Figure 40:
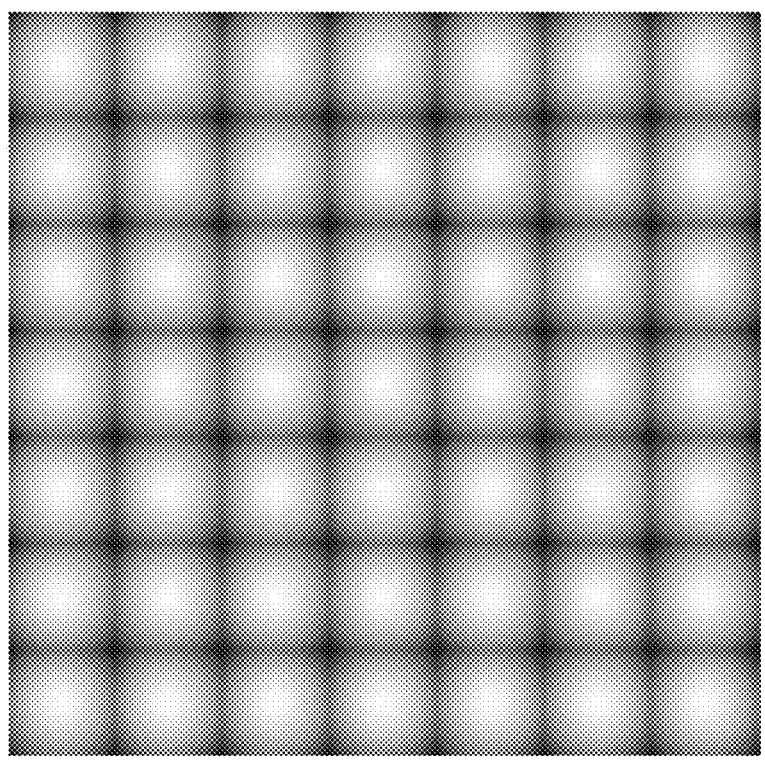
FIG. 40 illustrates a regularly spaced micro lens array (MLA).

FIG. 40 illustrates a regularly spaced micro lens array (MLA). FIG. 41 illustrates a MLA with Partial randomly positioned lenslets (RPL). FIG. 42 illustrates the 3-D digital profile of a Light Shaping Diffuser® (LSD®).

Figure 43:
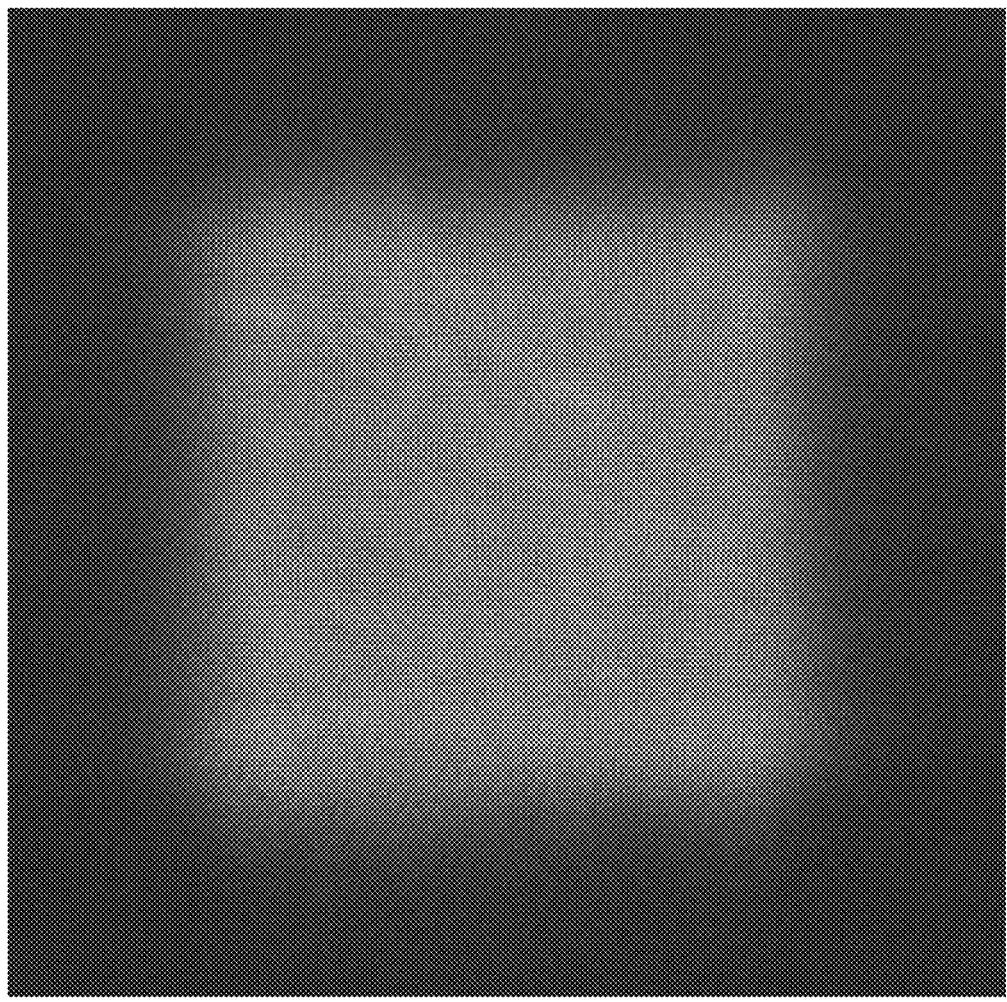
FIG. 43 illustrates the far-field image of the MLA combined with a partial RPL.

The far-field image of the MLA combined with a partial RPL and LSD, can produce a nicely random flat top diffuser (FTD) in FIG. 43. FIG. 43 illustrates a BSDF or far-field image simulation of a SRMS containing MLA, Partial RPL and LSD®.

Figure 44:
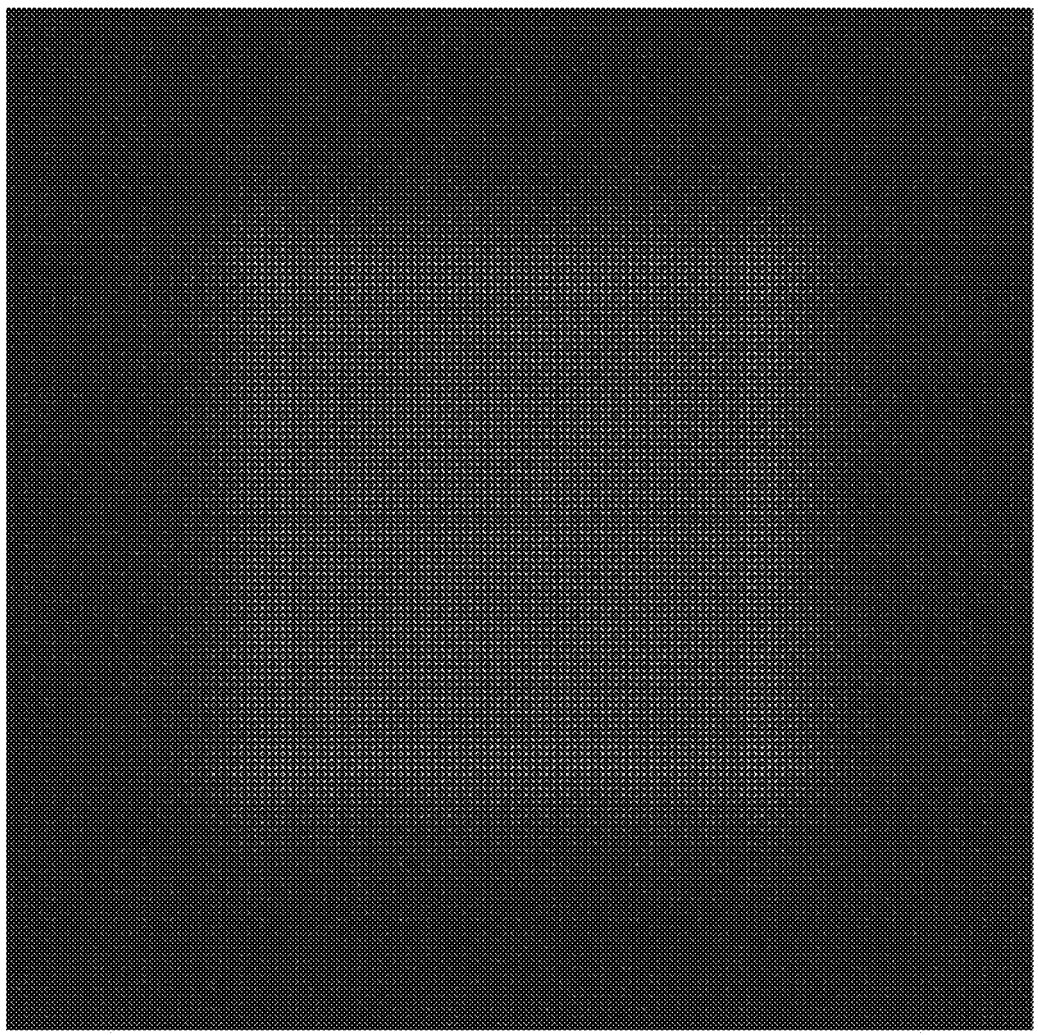
FIG. 44 illustrates a simulated far-field Dot pattern from a regularly spaced MLA micro-structure.

As comparisons, the regularly spaced MLA by itself produces a noticeable high frequency dot pattern (FIG. 44) associated with the size of the lenses. FIG. 44 illustrates a simulated far-field Dot pattern from a regularly spaced MLA micro-structure.

Figure 45:
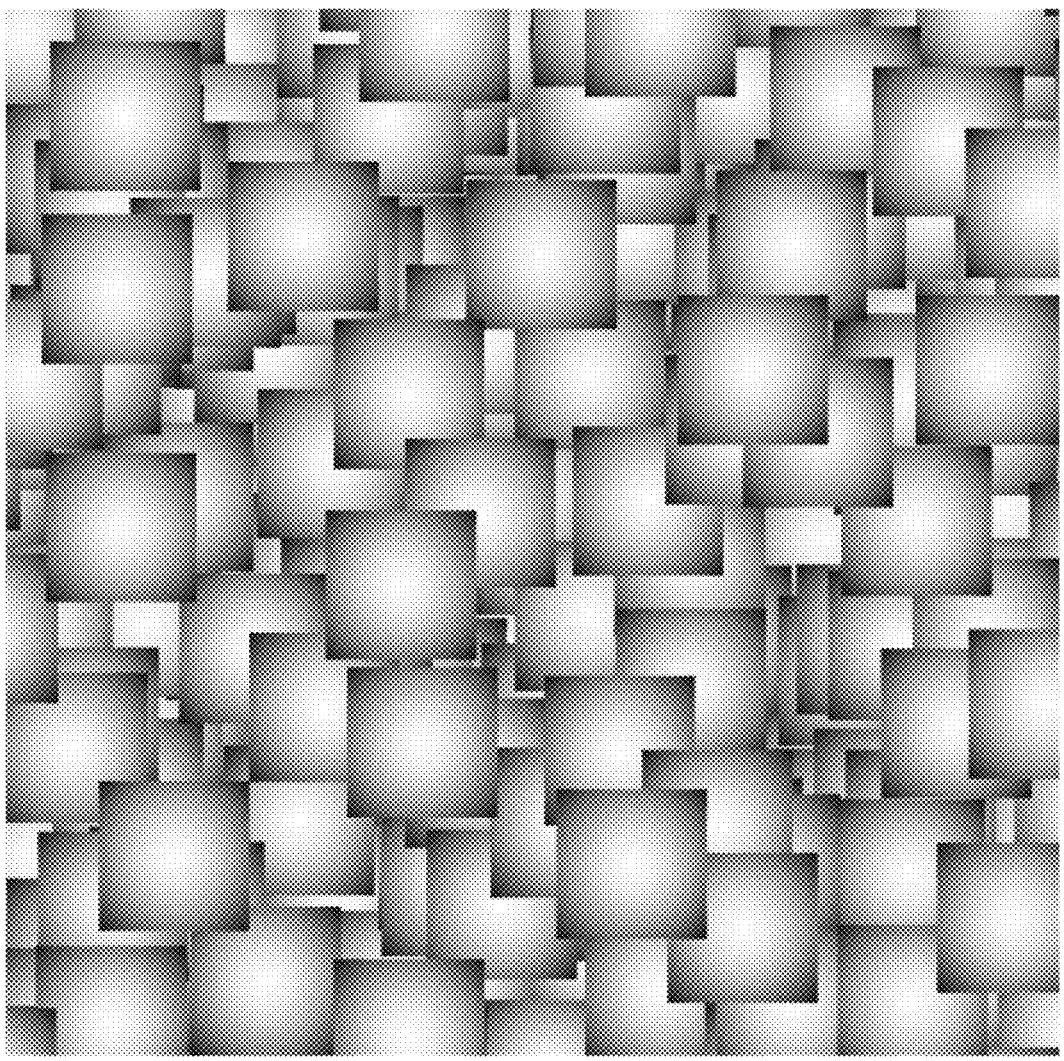
FIG. 45 illustrates randomly placed Lenslets (RPL) in a unit cell where the X and Y positions are statistically randomly uniformly distributed.
Figure 46:
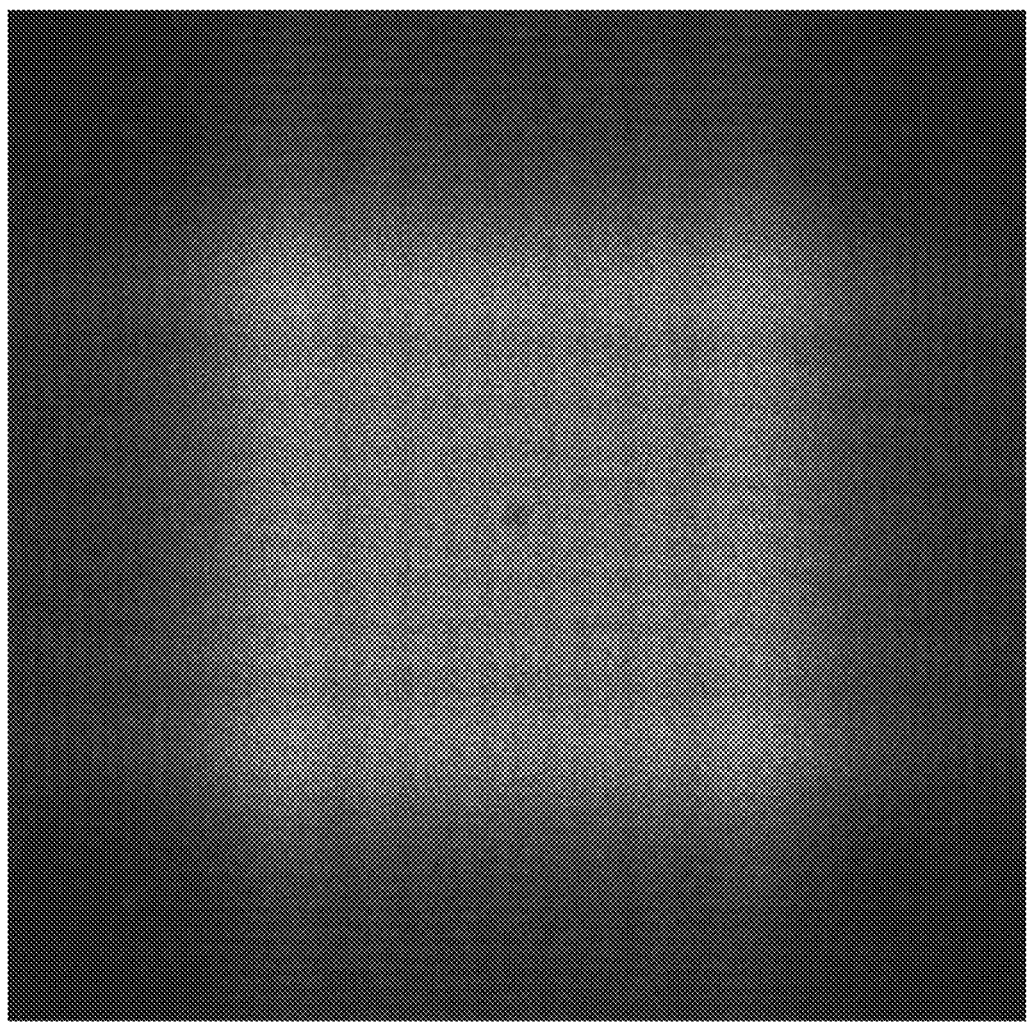
FIG. 46 illustrates a simulation of a far-field pattern from randomly positioned lenslets.

A pattern of randomly positioned lenslets (FIG. 45) in a micro-structure creates a far-field image with a low frequency diffraction pattern (FIG. 46). FIG. 45. illustrates Randomly Placed Lenslets (RPL) in a unit cell where the X and Y positions are statistically randomly uniformly distributed. FIG. 46 illustrates simulation of the FTD 20×20 far-field pattern from only randomly positioned lenslets and RPL.

Figure 47:
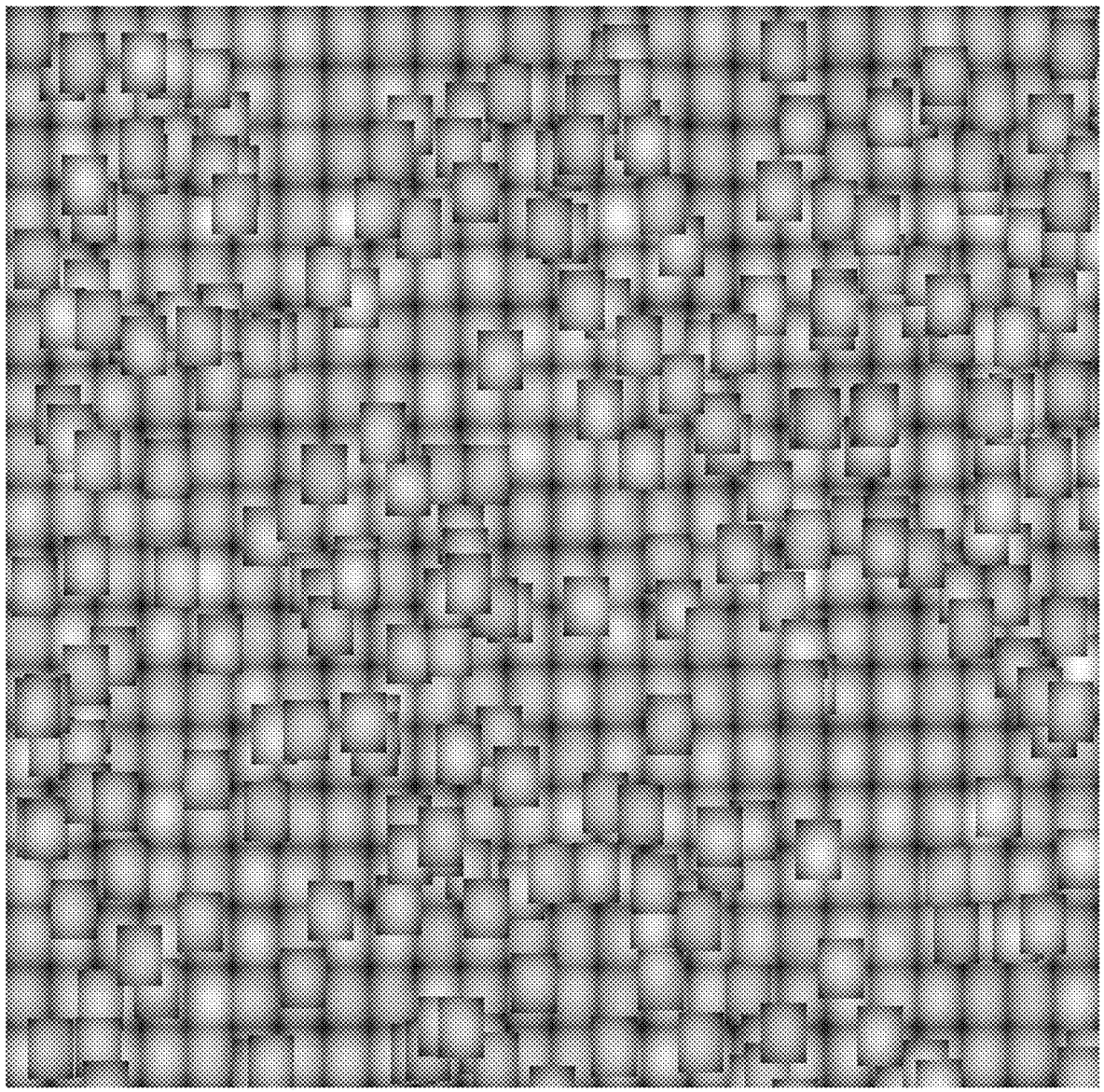
FIG. 47 shows a bitmap file used to produce the flat top diffuser (FTD).

FIG. 47 is an image of an actual bitmap file which is used to produce the flat top diffuser (FTD). Empirically, the far-field patterns (FIG. 30) of the MLA with Partial RPL and LSD have no structured low frequency patterns.

Figure 48:
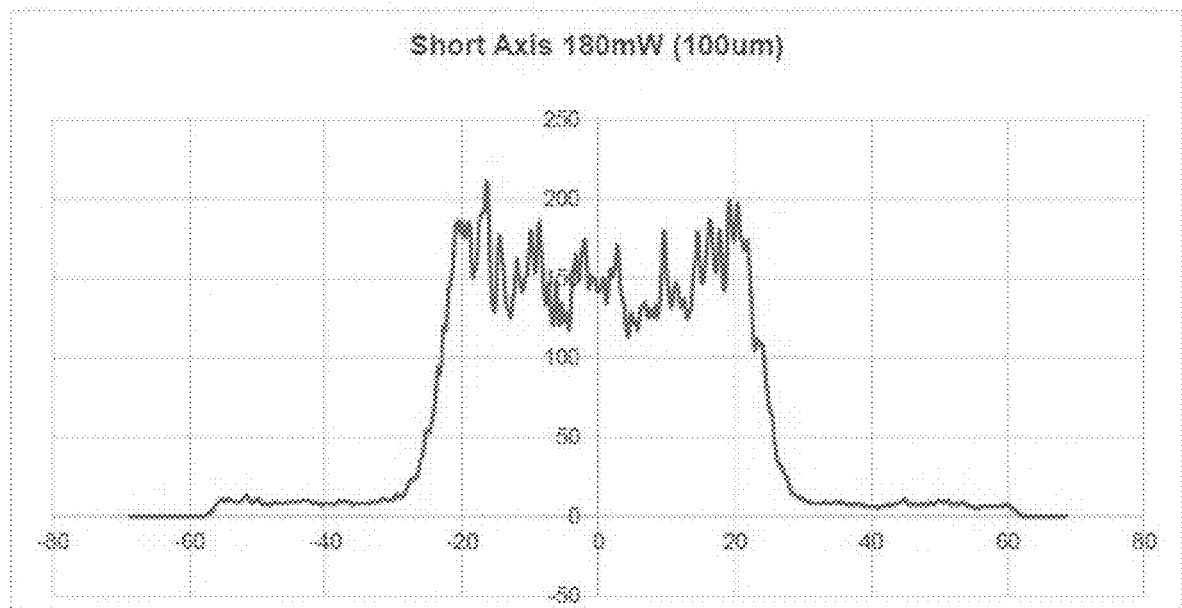
FIG. 48 illustrates a far-field goniometer plot of the Short BSDF axis MLA with Partial RPL and LSD.
Figure 49:
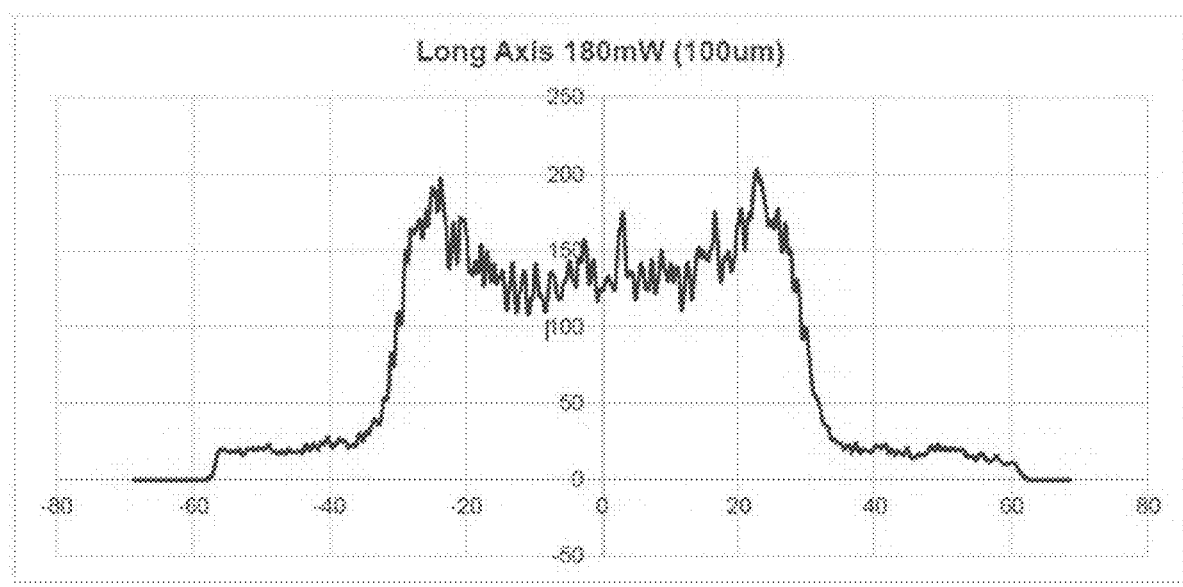
FIG. 49 illustrates a far-field goniometer plot of the Long BSDF axis MLA with Partial RPL and LSD.
Figure 50:
FIG. 50 is a photograph of the far-field pattern of the Rectangular FTD.

FIG. 48. Far-field goniometer plot of the Short bsdf axis MLA with Partial RPL and LSD. FIG. 49 illustrates far-field goniometer plot of the Long bsdf axis MLA with Partial RPL and LSD. FIG. 50 is a photograph of the far-field pattern of the Rectangular FTD.

Final Scaling for Optimizing Edges of the FTD

The scaling of the micro-lenses can affect the edge appearance and efficiency of the FTD. The following images show progression with the lens scaling where sigma is from 0.5×, 1×, 2×, 3× and 4× of the diffraction retardation criteria of lambda/(index-1) in FIGS. 38 through 42. They show that the boundary of the far-field pattern (BSDF) becomes more defined the higher the scaling of the lens. There is a tradeoff between edge quality and depth. There are manufacturing limits of how deep the structures can be made.

Figure 51:
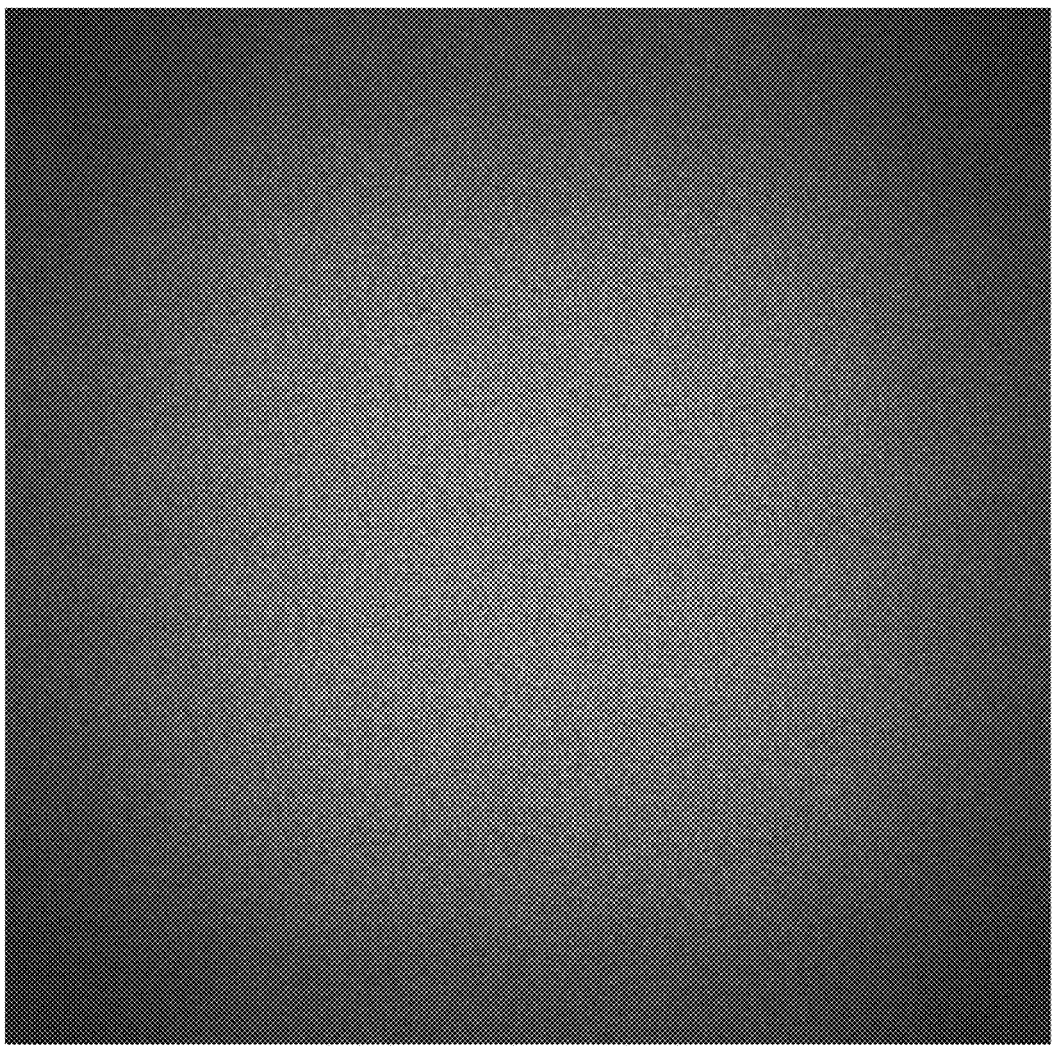
FIG. 51 is a simulation of the far-field with axial lens sag scaled to sigma ~0.5×/(n−1) with MLA+Part RPL+LSD structures.

FIG. 51 is a simulation of the far-field with axial lens sag scaled to sigma ~0.5×/(n−1) with MLA+Part RPL+LSD structures.

Figure 52:
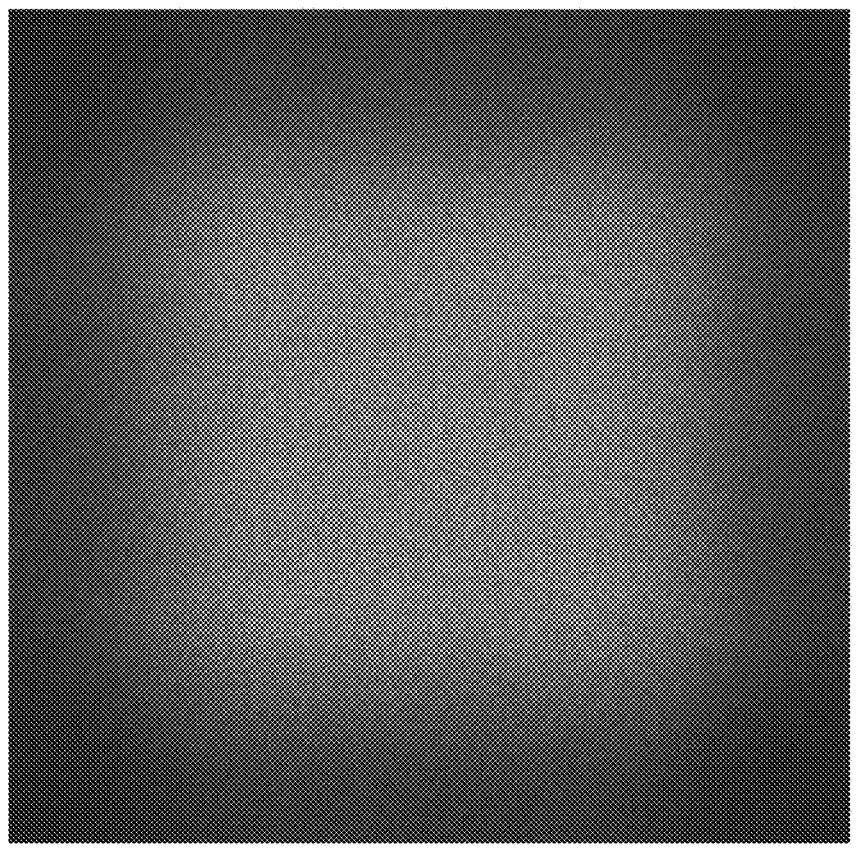
FIG. 52 is a simulation of the far-field with axial lens sag scaled to sigma ~1×/(n−1) with MLA+Part RPL+LSD structures.

FIG. 52 is a simulation of the far-field with axial lens sag scaled to sigma ~1×/(n−1) with MLA+Part RPL+LSD structures.

Figure 53:
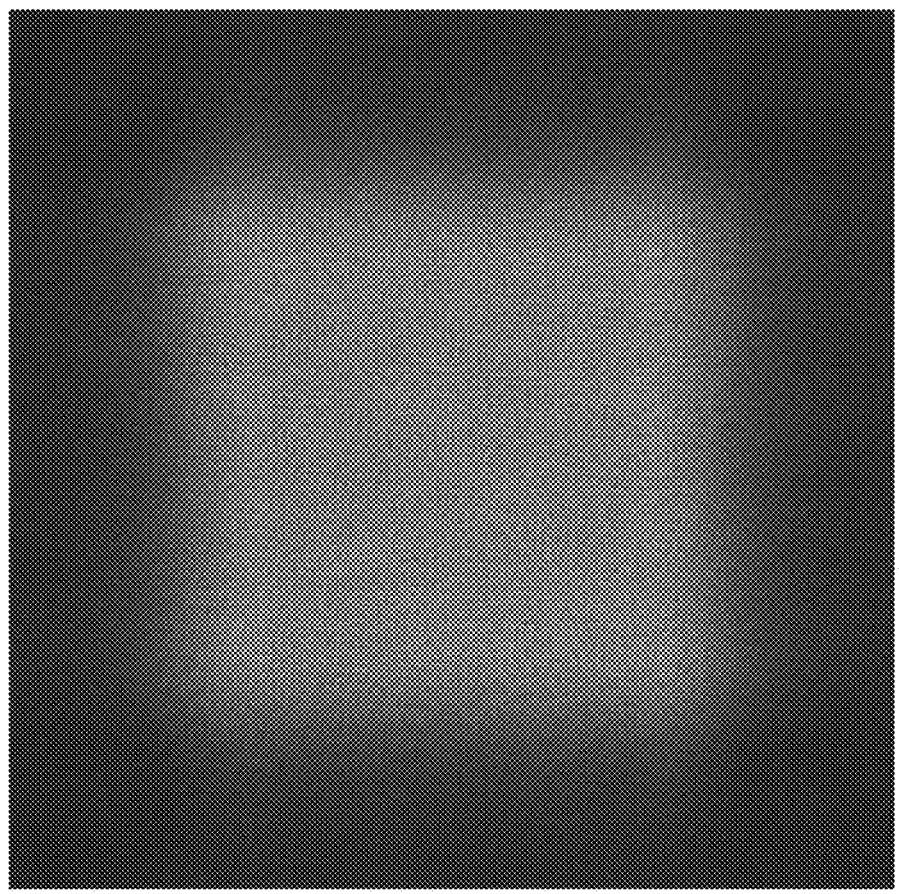
FIG. 53 is a simulation of the far-field with axial lens sag scaled to sigma ~2×/(n−1) with MLA+Part RPL+LSD structures.

FIG. 53 is a simulation of the far-field with axial lens sag scaled to sigma ~2×/(n−1) with MLA+Part RPL+LSD structures.

Figure 54:
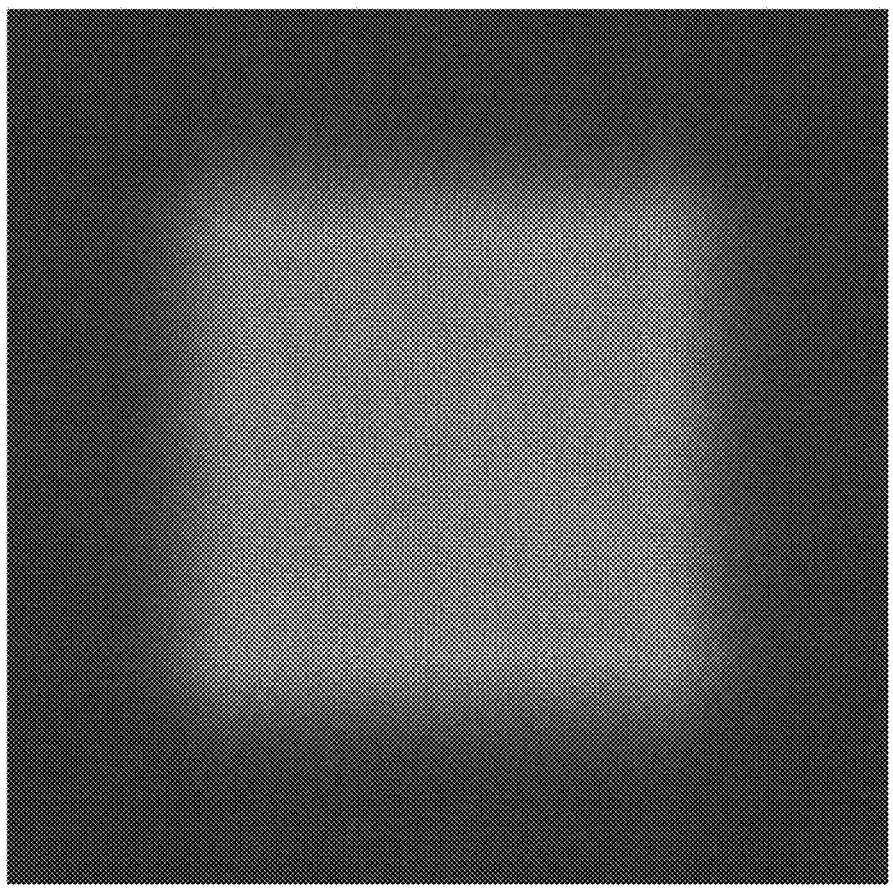
FIG. 54 is a simulation of the far-field with axial lens sag scaled to sigma ~3×/(n−1) with MLA+Part RPL+LSD structures.

FIG. 54 is a simulation of the far-field with axial lens sag scaled to sigma ~3×/(n−1) with MLA+Part RPL+LSD structures.

Figure 55:
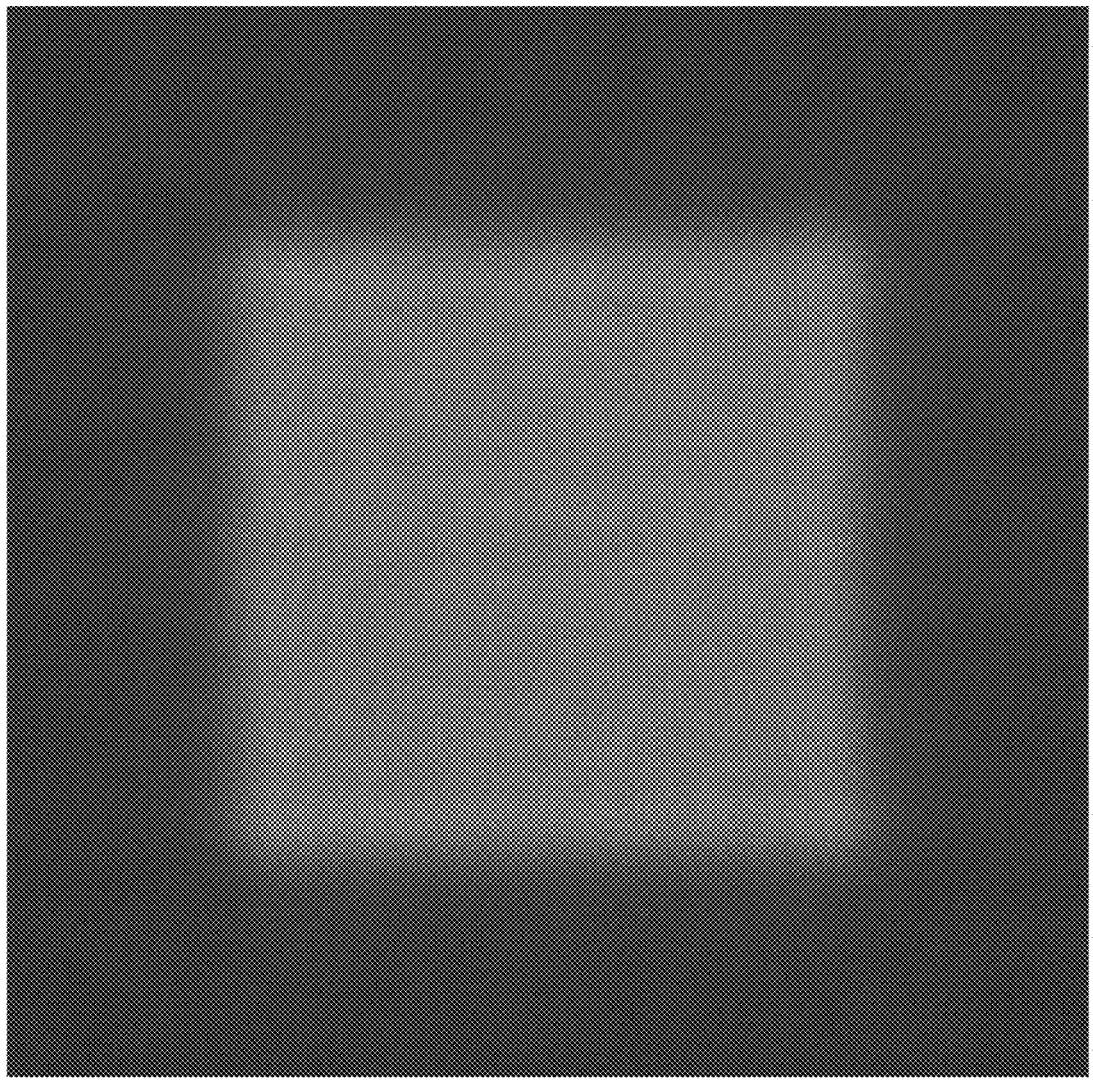
FIG. 55 is a simulation of the far-field with axial lens sag scaled to sigma ~4×/(n−1) with MLA+Part RPL+LSD structures.

FIG. 55 is a simulation of the far-field with axial lens sag scaled to sigma ~4×/(n−1) with MLA+Part RPL+LSD structures.

Overlaying a High Frequency LSD for Improved Aesthetic Appearance

In many end-use cases a consumer wouldn't notice that an optical diffuser has an MLA, PRPLs, and an LSD. But there are certain conditions for which a consumer might notice that there is an odd visual appearance to the optical diffuser. Under certain circumstances, this might result in an optical diffuser that doesn't have an aesthetic visual appearance to consumers. Or in the worst case, a consumer may incorrectly assume that there is something wrong with the optical diffuser if it doesn't appear to have a smooth contour under all light conditions a human user might view it in. This is not a question of the functionality of the optical diffuser for its intended purpose. It's a question of how ordinary consumers have aesthetic expectations for how products should look. Visual design is an important consideration in consumer products.

If the dot structures from the MLA are fairly low angles (below 5 degrees), the corresponding LSD have fairly large structures. In some cases, a human user notices the structures with the naked human eye unless measures are taken to try to camouflage the structures. This is an important question of aesthetics for end-users.

If the low frequency structures can easily be seen by the naked human eye of end users, then it is beneficial to employ a high frequency LSD structure on top of the base LSD. This is for appearance only and has no direct bearing on the optical performance of the FTD.

U.S. Pat. No. 9,568,885B2, the contents of which are incorporated by reference, includes a technique to overlay smaller (higher spatial frequency microstructures on top of larger (lower spatial frequency) microstructures. The higher frequency microstructure suppresses undesired visible optical artifacts. That is, the larger, lower-frequency aspects of the microstructure perform the optical LSD function and the small, higher-frequency microstructure are selected to act something like camouflage in regards to creating an aesthetically appealing optical diffuser when viewed by ordinary consumers.

Figure 56:
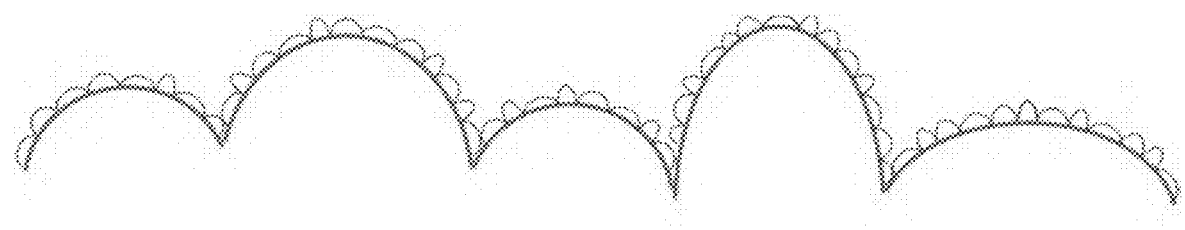
FIG. 56 illustrates a LSD with high definition (HD) micro-structures.
Figure 57A:
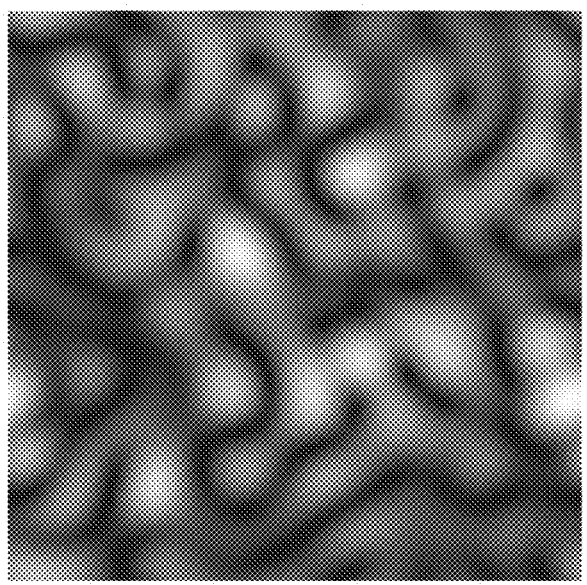
FIG. 57A shows the base layer LSD.
Figure 57C:
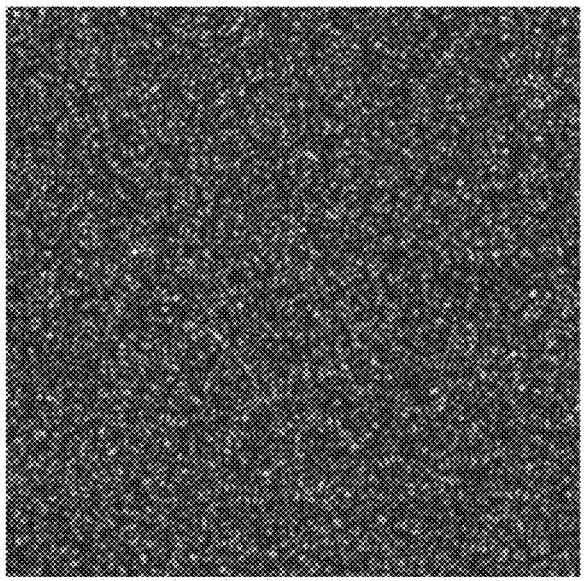
FIG. 57C shows the combination in detail from the top view.
Figure 57B:
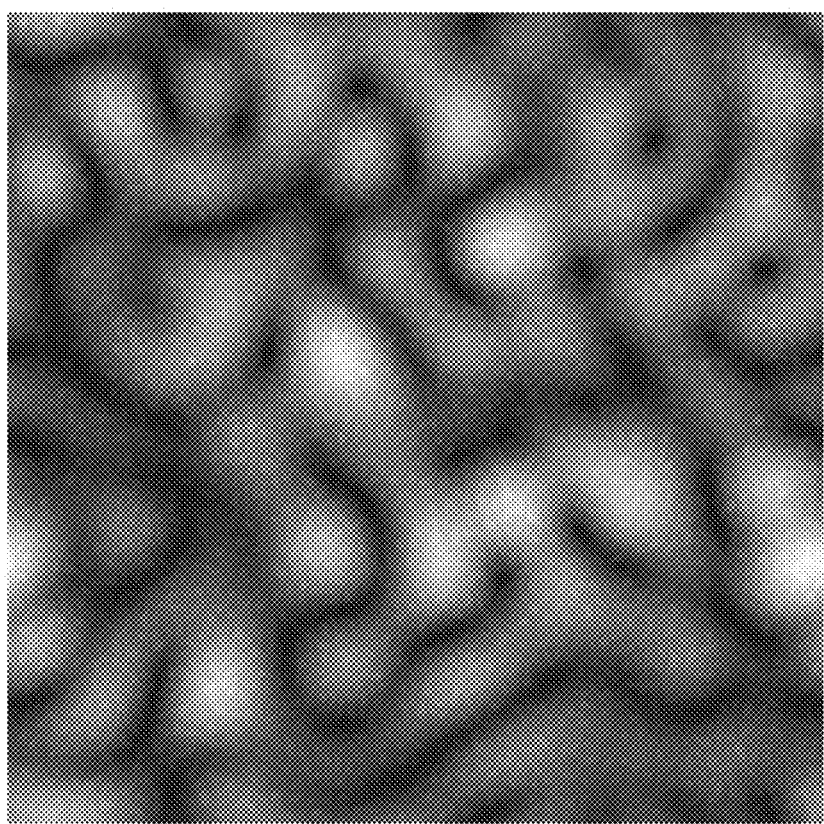
FIG. 57B shows the high frequency LSD layer.

FIG. 56 illustrates a LSD with high definition (HD) micro-structures. FIG. 57A shows the base layer LSD. FIG. 57B shows the high frequency LSD layer. FIG. 57C shows the combination in detail from the top view.

Benefits of PRPL Vs RPL

Figure 58A:
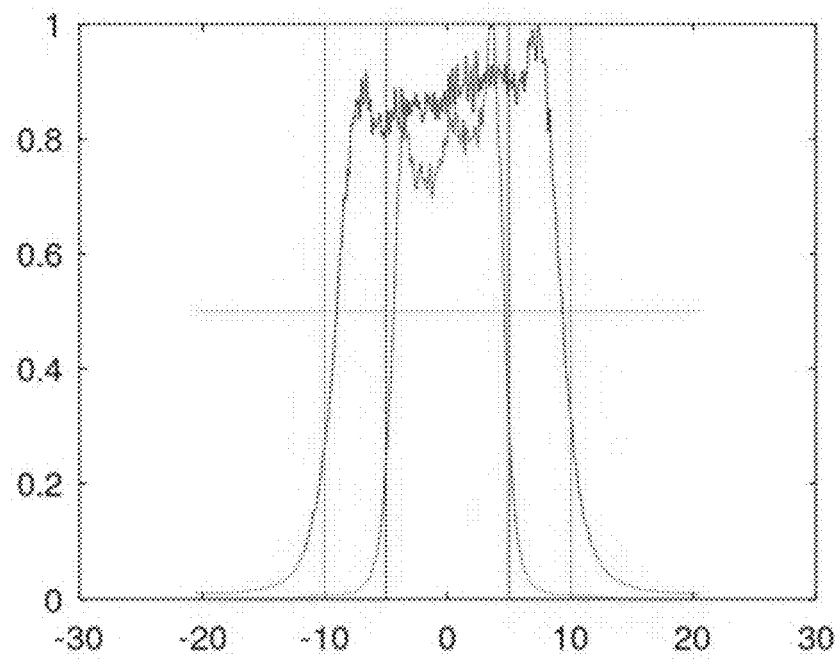
FIG. 58A illustrates RPL+LSD.
Figure 58B:
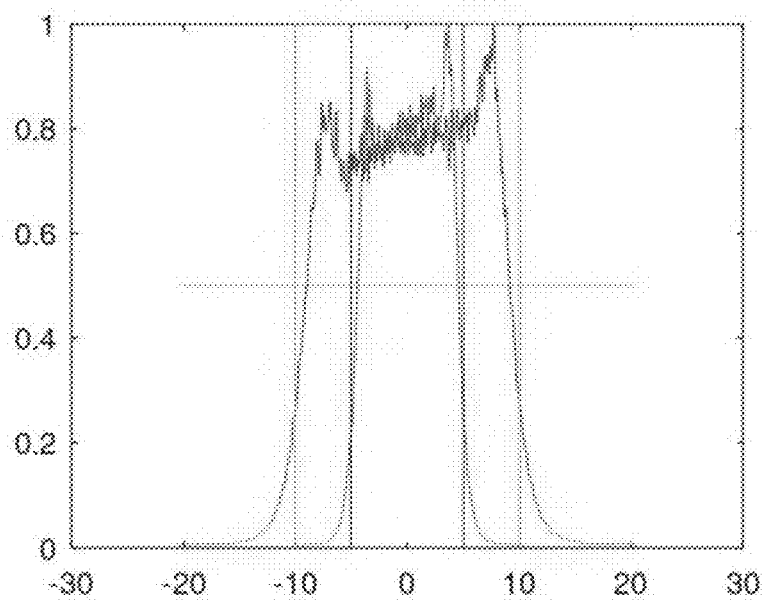
FIG. 58B illustrates PRPL+LSD.

PRPL and RPL will now be compared. FIG. 58A illustrates RPL+LSD and FIG. 58B illustrates. PRPL+LSD. Comparing FIG. 58A and FIG. 58B, there is some benefit to PRPL, in that the tails have less noise as seen in FIGS. 58A and 58B.

Figure 59A:
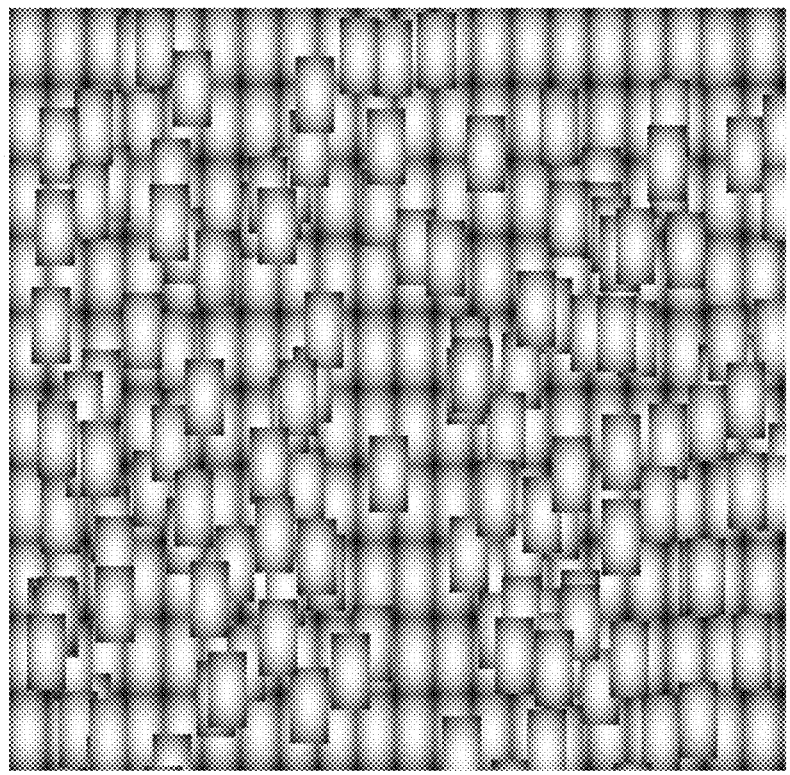
FIG. 59A shows the MLA with PRPL.
Figure 59B:
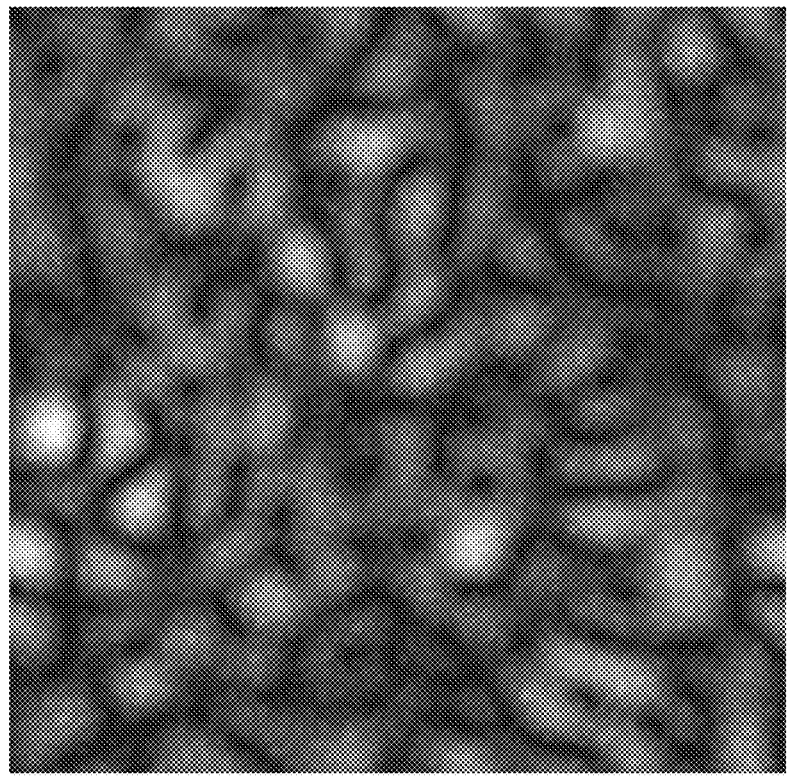
FIG. 59B shows the base LSD with HD.
Figure 59C:
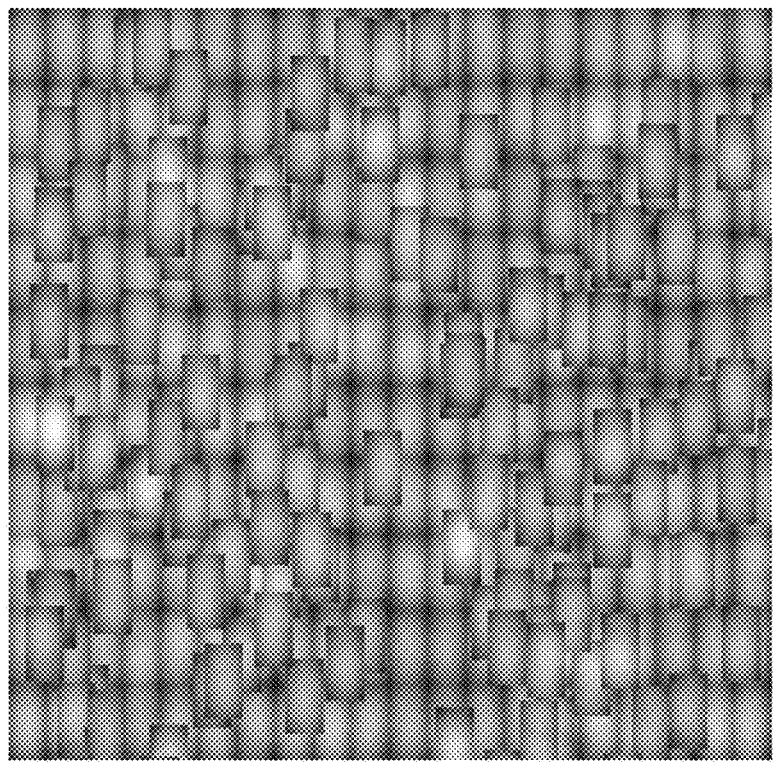
FIG. 59C shows the combined PRPL (MLA+PRPL) plus HD (LSD1+LSD2).
Figure 59D:
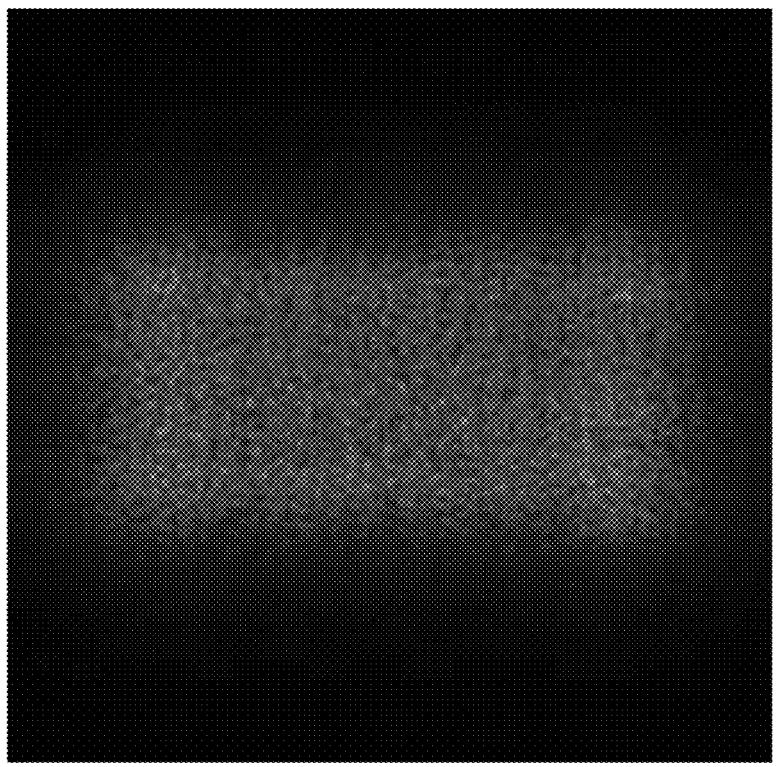
FIG. 59D shows the far-field of PRPL plus HD.

FIG. 59A shows the MLA with PRPL. FIG. 59B shows the base LSD with HD. FIG. 59C shows the combined PRPL (MLA+PRPL) plus HD (LSD1+LSD2). FIG. 59D shows the far-field of PRPL plus HD.

Figure 60A:
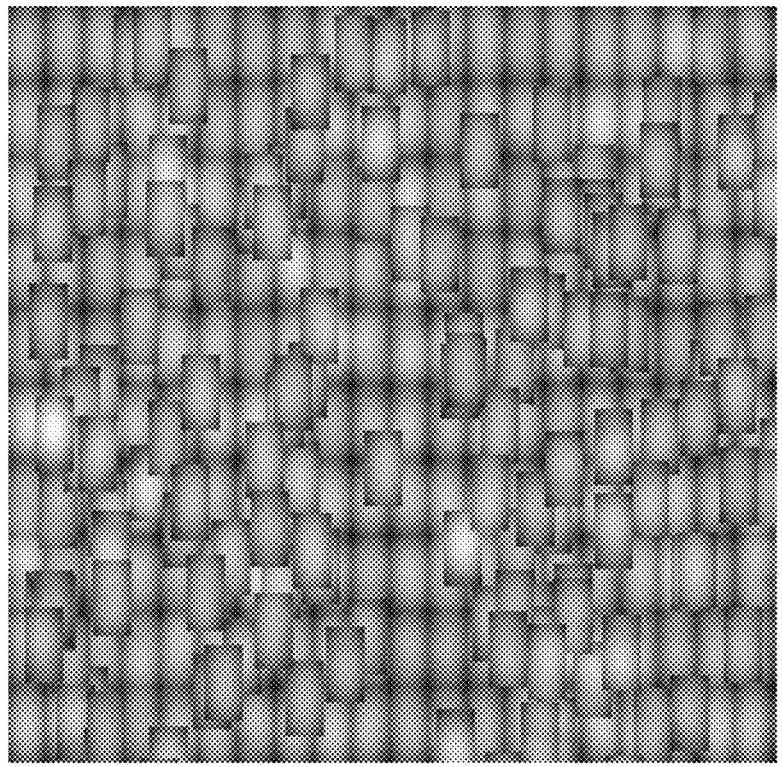
FIG. 60A shows the combined PRPL plus LSD.
Figure 60B:
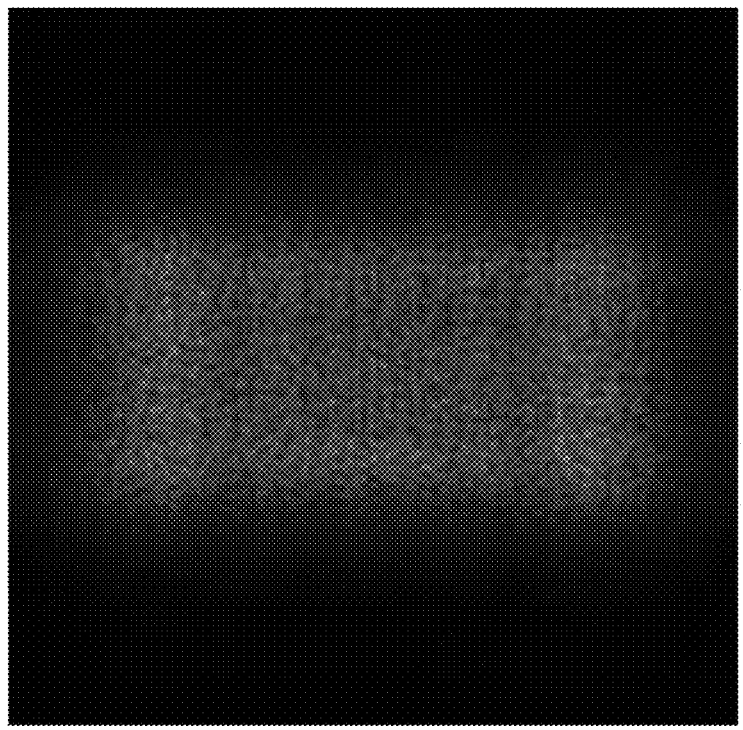
FIG. 60B shows the far-field of PRPL plus LSD.

FIG. 60A shows the combined PRPL plus LSD. FIG. 60B shows the far-field of PRPL plus LSD.

FIG. 59A is the grey scale contour map of the MLA as a base and PRPL overwriting areas of the MLA (PRPL). In FIG. 59B we show the grey scale contour map of low frequency LSD added to the high frequency LSD (HD). Combining the PRPL and HD we get the structure shown in FIG. 59C. The far-field of FIG. 59C results in the final FIG. 59D of the flat top diffuser we are looking for.

It is difficult to see an improvement between the PRPL+LSD and PRPL+HD for the far-field (FIGS. 59D and 60B). However, the benefits to PRPL+HD apply more to the appearance of lens sizes from the structures which produce the far-fields of FIGS. 51 to 55. Recall that larger lenslets produce sharper far-field boundaries. The trade-off is the appearance of the larger lens structures to the customer is less appealing. The HD helps hide the lens contours. When we substitute the HD for a regular LSD, we do not lose performance, but we gain in market appeal.

Figure 61A:
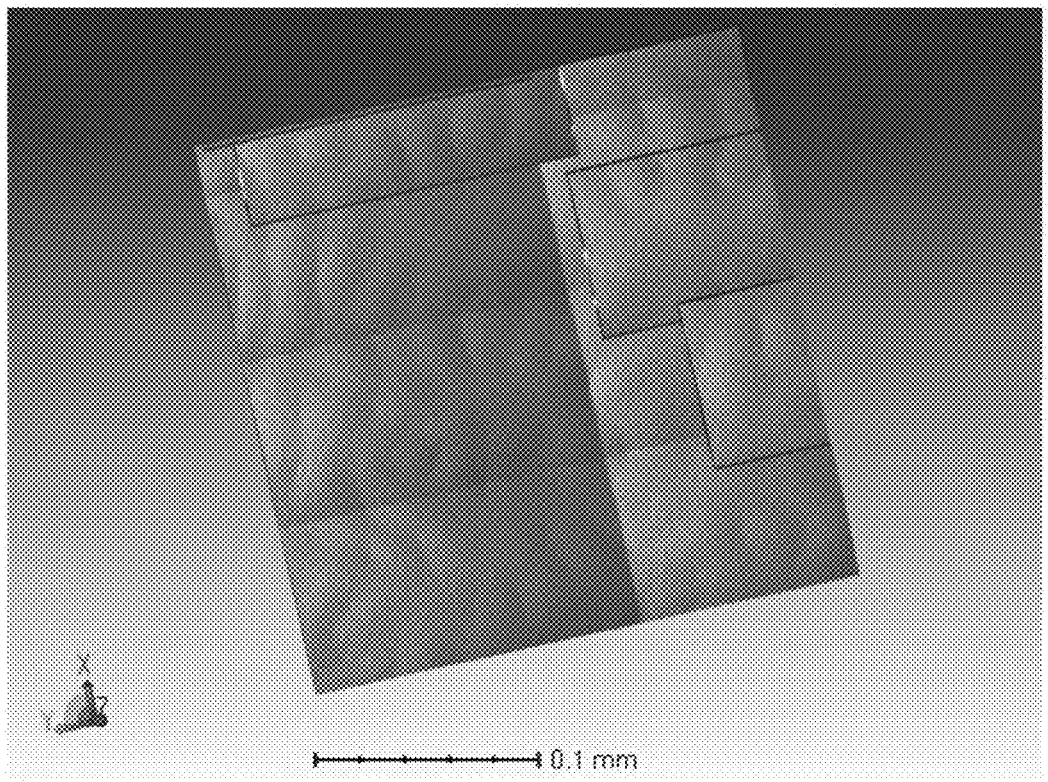
FIG. 61A shows the PRPL with HD.
Figure 61B:
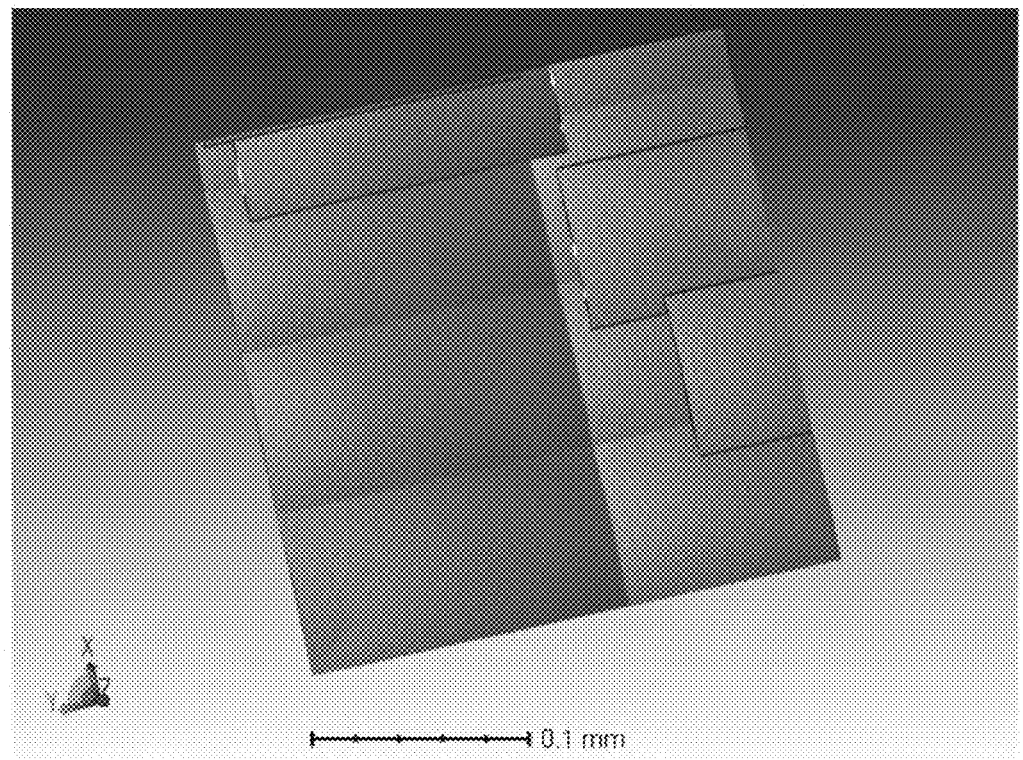
FIG. 61B shows PRPL with LSD.

FIG. 61A shows the PRPL with HD and FIG. 61B shows PRPL with LSD.

The high frequency structure in the HD microstructures (FIG. 61A) hide the contours of the lenses better than the regular LSD microstructures (FIG. 61B). The effect is similar to camouflage used by military to break up the contour of an object.

Lower angle FTD need larger lenses, so camouflaging the lenses is more important for lower angle FTDs. The reason is that the depth factor remains the same, but since the FTD angles due to Snell's law (of the surface normal) need to be conserved, the lower angle diffusers need larger lateral features.

In addition, diffusers designed for longer wavelengths such as infrared (IR) compared to the visible also require larger lenses. Designing to avoid zero order, the longer wavelengths require deeper lens structures to provide the scatter to the wavefront. Scaling the lenses to wavelength, the lateral features again need to be larger than their visible designed FTD counterparts.

From a visual perspective, humans can distinguish objects 1 arc minute in size (See, e.g., the book Modern Optical Engineering), which translates to approximately 74 microns when the object is 10 inches from the observer. Which means a diffuser with non-optimum performance (FIG. 61) can be made for 15 degrees in the visible range (up to 700 nm) with this limitation. With the HD microstructure, this boundary disappears. So we can make lenses larger without objection from the customer.

In summary, the advantages of using the HD instead of LSD in FTD, by combining it with PRPL is 3 fold, it allows larger lenses for:

optimization of sharper boundaries in the far-field;
reduces the objections of lower angled FTD; and
reduces the objections of IR FTD.

Some implementations include one or more the following aspects:

1. Scale micro-lenses with height sigma>=lambda/(n−1) to avoid zero order,
2. Optimize the scale to 2.5× to 4× this number to get a more defined shape to the boundary.
3. Arrange the lenses in a Regularly spaced micro lens array (MLA).
4. Overwriting the MLA with a Partial (Sparse population P, 1%<P<99%) Randomly (Uniformly in the unit cell in X-Y) Placed Lenses. Which gets away from the high frequency far-field structures
5. Add the height of a pseudo random micro-structures from light shaping diffuser (holographic diffuser) which have a Gaussian far-field distribution envelope. Which eliminates any possibility of dot structures.

6. The LSD has an additional high frequency HD overlay micro-structure. For the visual appearance to avoid low frequency structures.

Randomly Scaled Lenslets

Flat Top Diffusers work well with RPL or PRPL combined with LSD or HD, however, the Line generator Flat Top Diffusers (FTDL) have a harder time getting a decent profile due to the information density of a one dimensional (x direction lens power) variation vs. 2-D variation (x and y direction lens power).

Figure 62A:
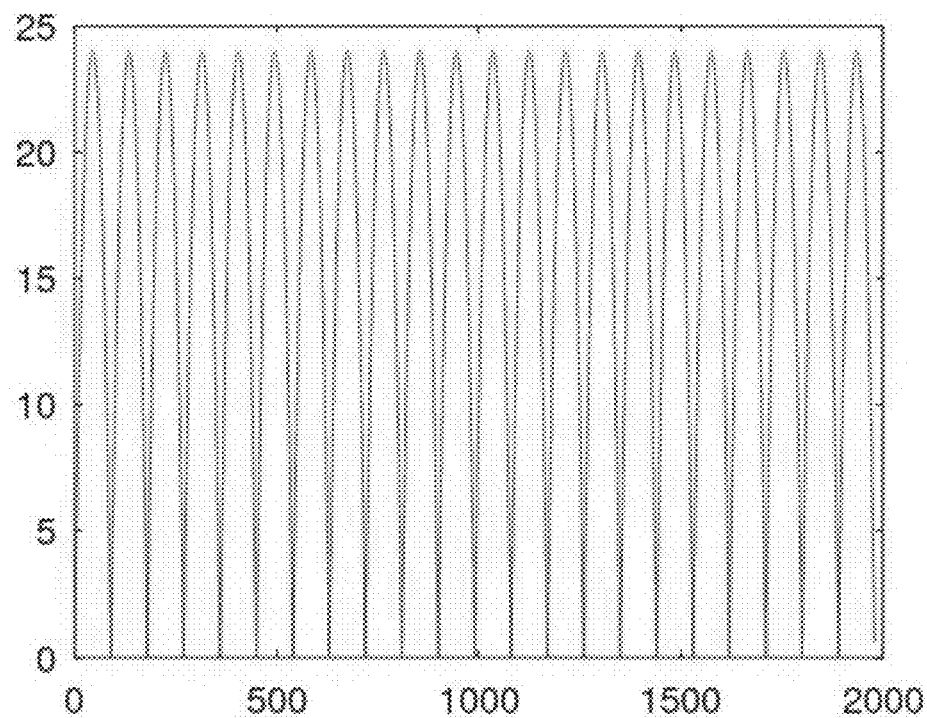
FIG. 62A illustrates a one-dimensional MLA.
Figure 62B:
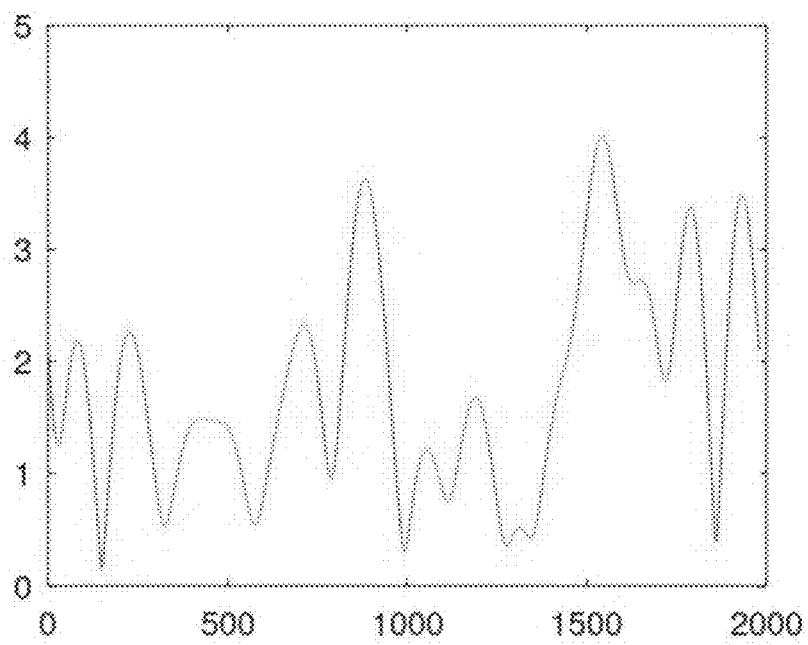
FIG. 62B illustrates a one-dimensional LSD.
Figure 62C:
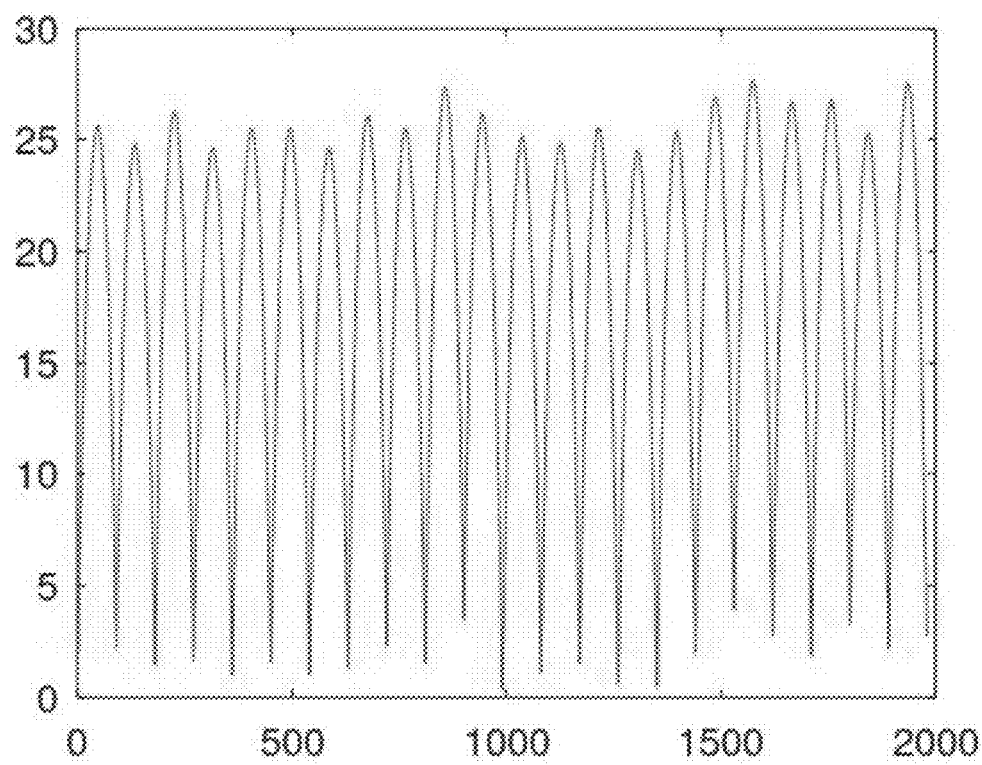
FIG. 62C illustrates the superposition of the one dimensional MLA and LSD.
Figure 62D:
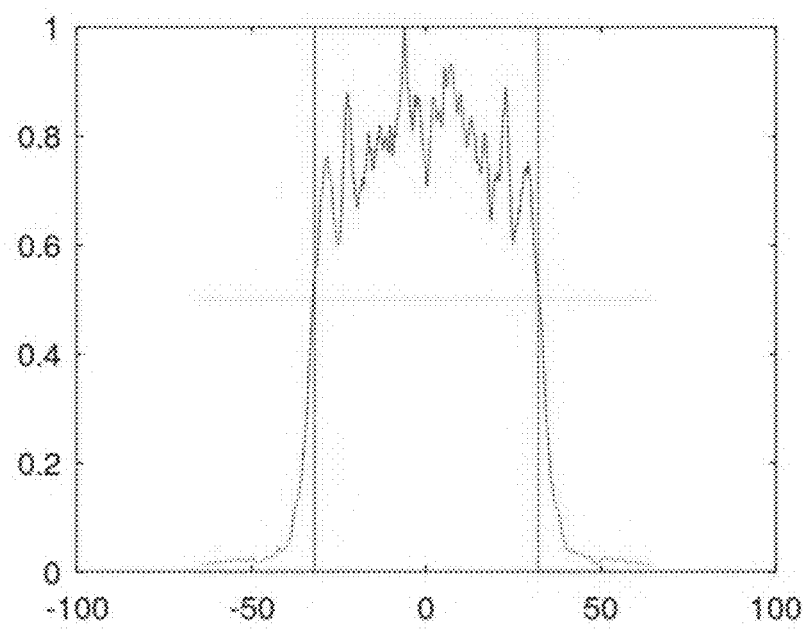
FIG. 62D illustrates the far-field pattern associated with FIG. 62C.

FTDL with only variation in the scale of the lens may be combined with Randomly Scaled Lenslets (RSLs) with a one dimensional LSD. So the architecture for FTDL=RSL+LSD. FIG. 62A illustrates a one-dimensional MLA and FIG. 62B illustrates a one-dimensional LSD. FIG. 62C illustrates the superposition of the one dimensional MLA and LST, which results in the far-field pattern of FIG. 62D. We see in FIGS. 62A through 62C, that the MLA added with the LSD results in a line diffuser, which is described in more detail in U.S. patent application Ser. No. 17/455,820.

Figure 63A:
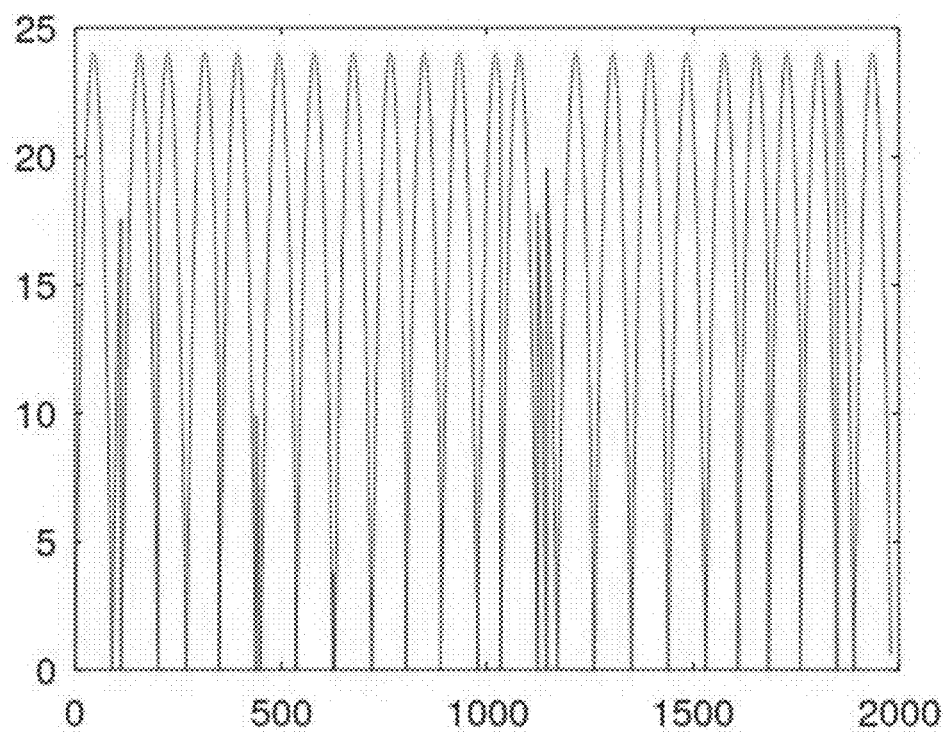
FIG. 63A illustrates a one-dimensional PRPL.
Figure 63B:
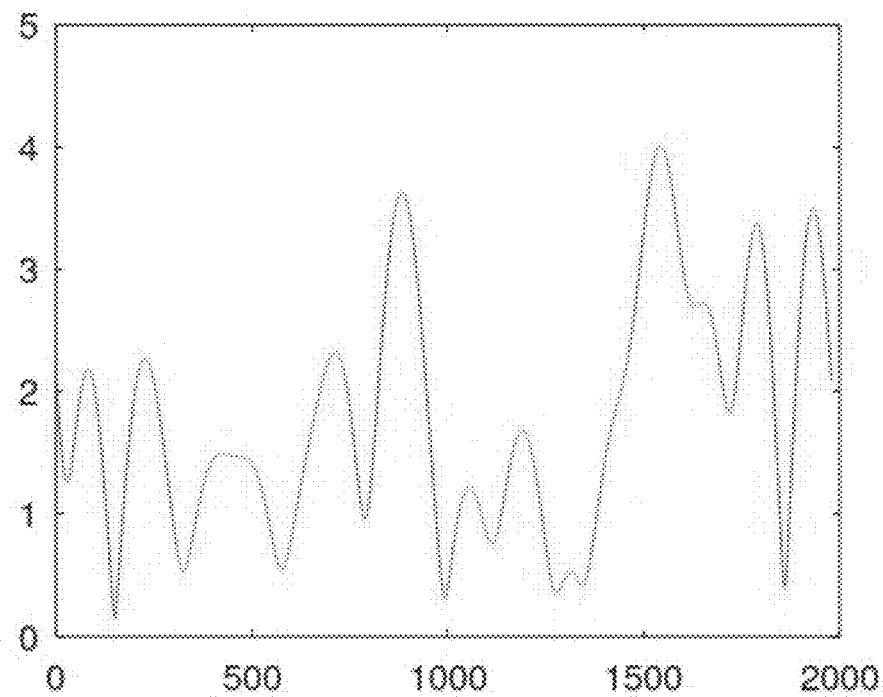
FIG. 63B illustrates a one dimensional LSD.
Figure 63C:
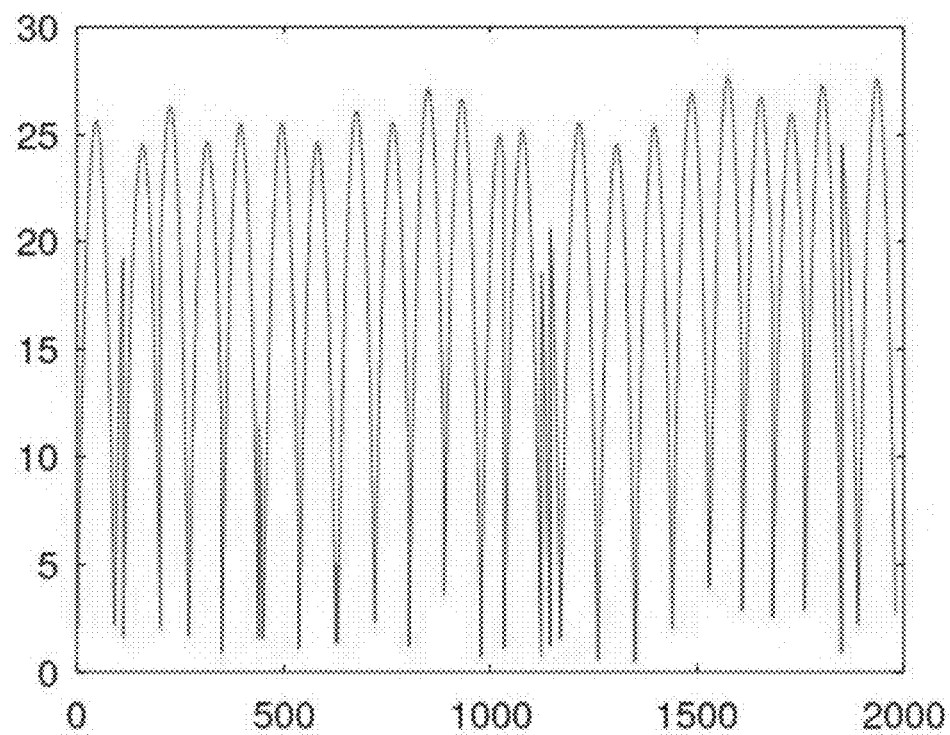
FIG. 63C illustrates the superposition of FIGS. 63A and 63B (e.g., PRPL+LSD).
Figure 63D:
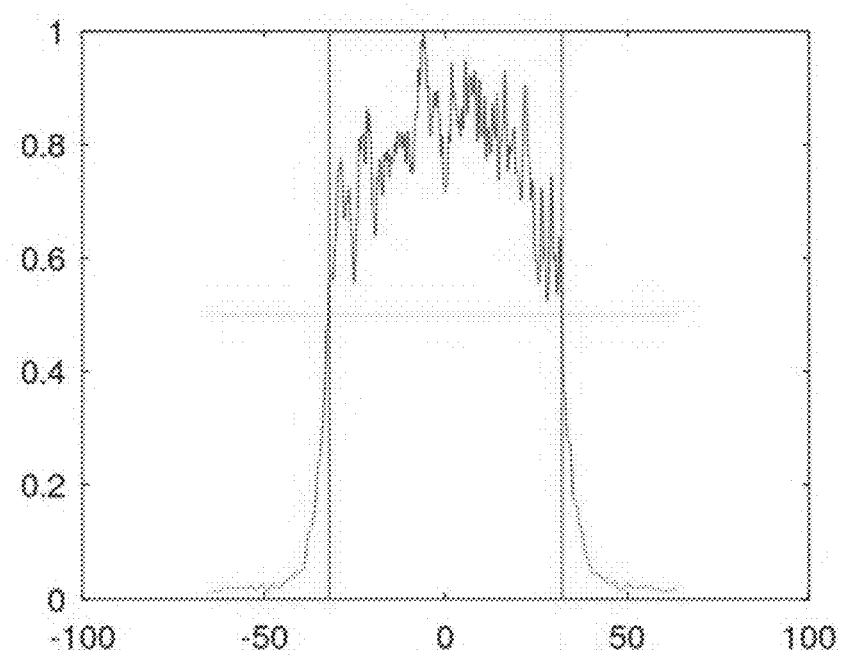
FIG. 63D is the far-field of PRPL+LSD.

FIG. 63A illustrates a one-dimensional PRPL. FIG. 63B illustrates a one dimensional LSD. FIG. 63C illustrates the superposition of FIGS. 63A and 63B (e.g., PRPL+LSD). FIG. 63D is the far-field of PRPL+LSD. Using a Partial RPL with the LSD, FIG. s63A through 63D, yields a similar result to MLA+LSD. The variation being that the minor improvement that of the lower frequencies are broken up.

Figure 64A:
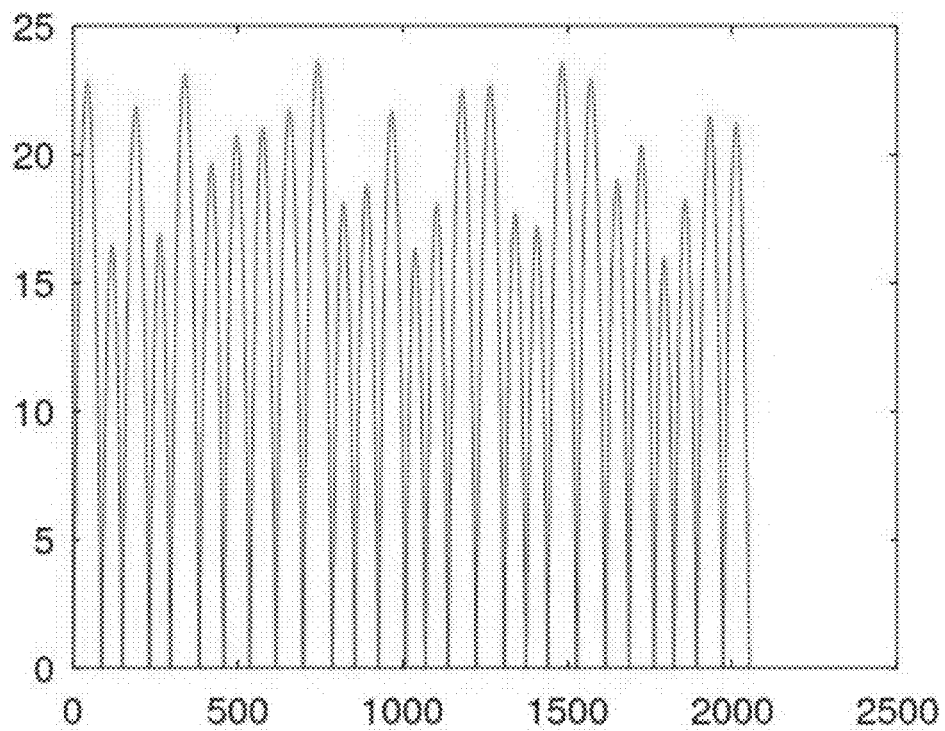
FIG. 64A illustrates Randomly Scaled Lenslets.
Figure 64B:
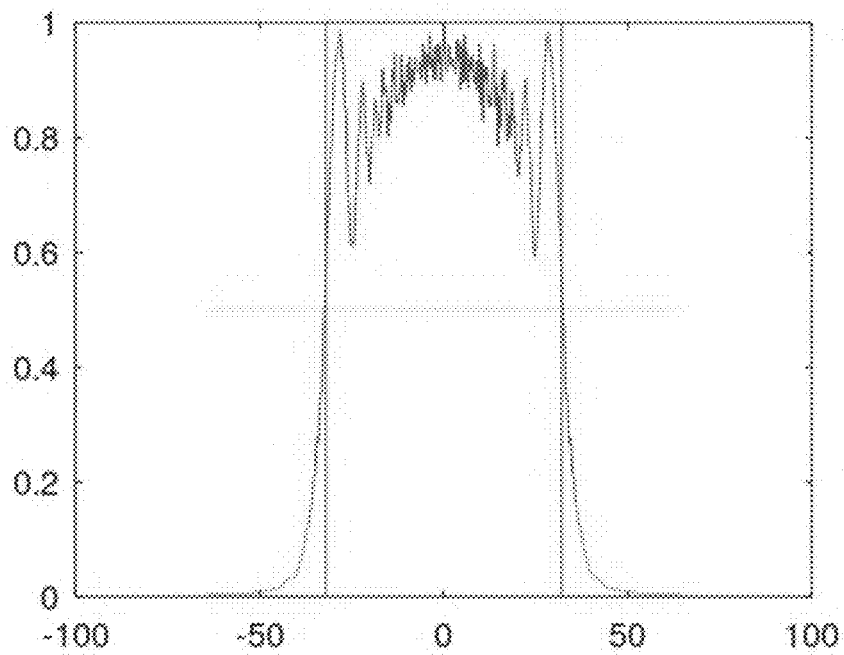
FIG. 64B shows the far-field of RSL.

FIG. 64A illustrates Randomly Scaled Lenslets. The individual lenslets have a random scaling within a selected range. FIG. 64B shows the far-field of an illuminated optical diffuser having RSLS, as seen in FIG. 64A and FIG. 64B, yield a better overall pattern, except for some low frequency oscillations on the outer edges.

Figure 65A:
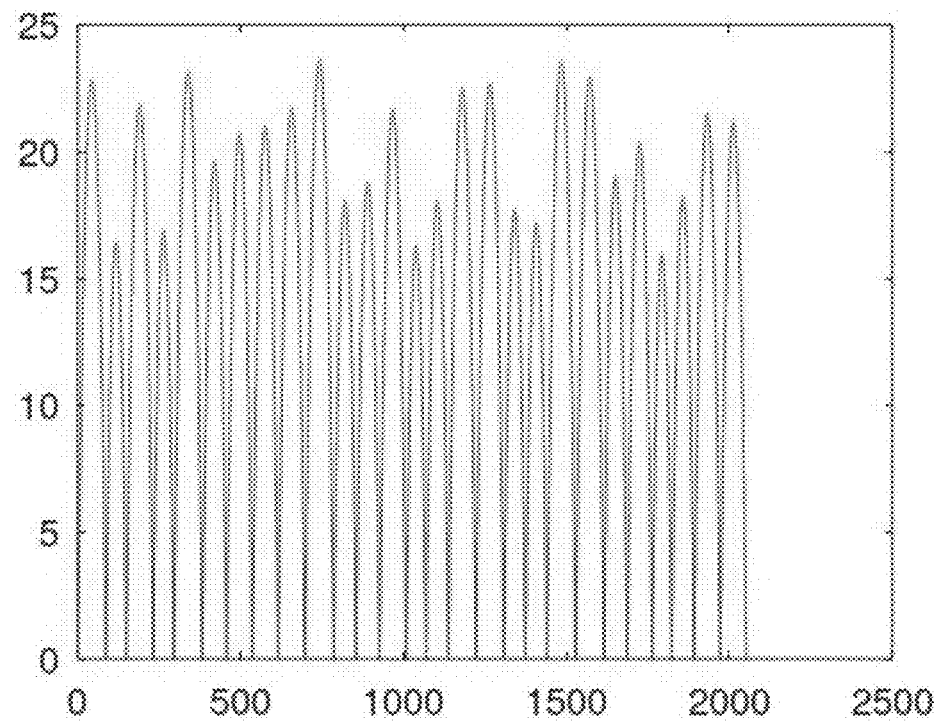
FIG. 65A illustrates RSL.
Figure 65B:
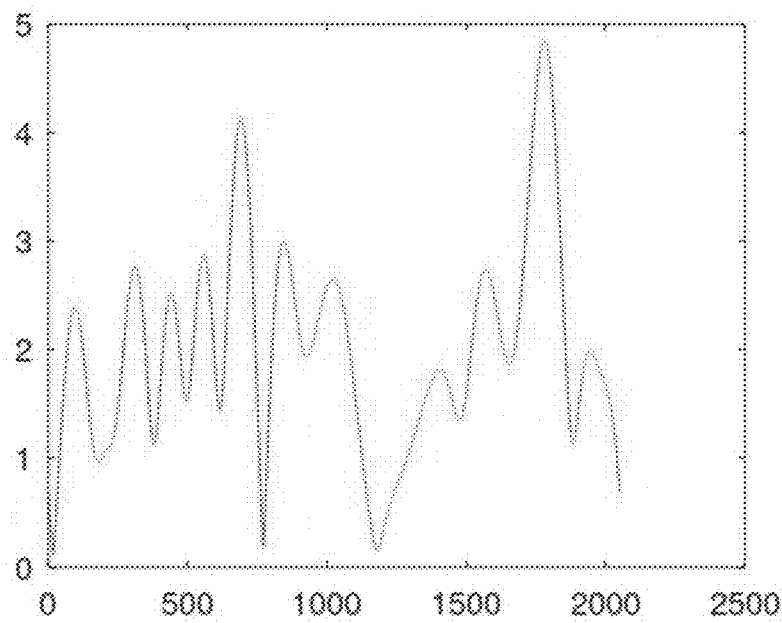
FIG. 65B illustrates LSD.
Figure 65C:
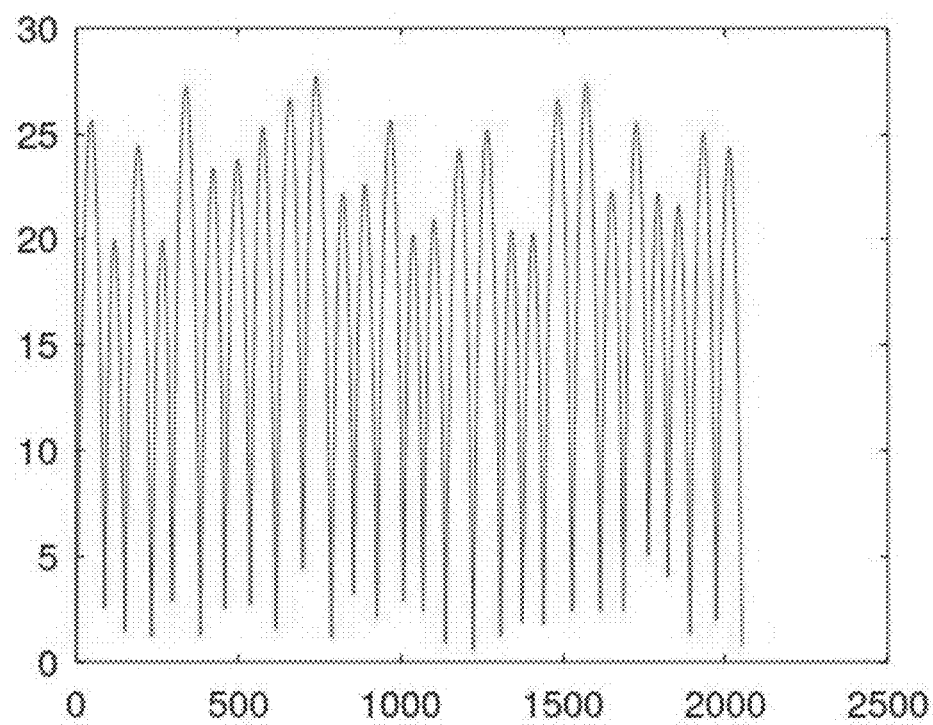
FIG. 65C illustrates RSL+LSD.
Figure 65D:
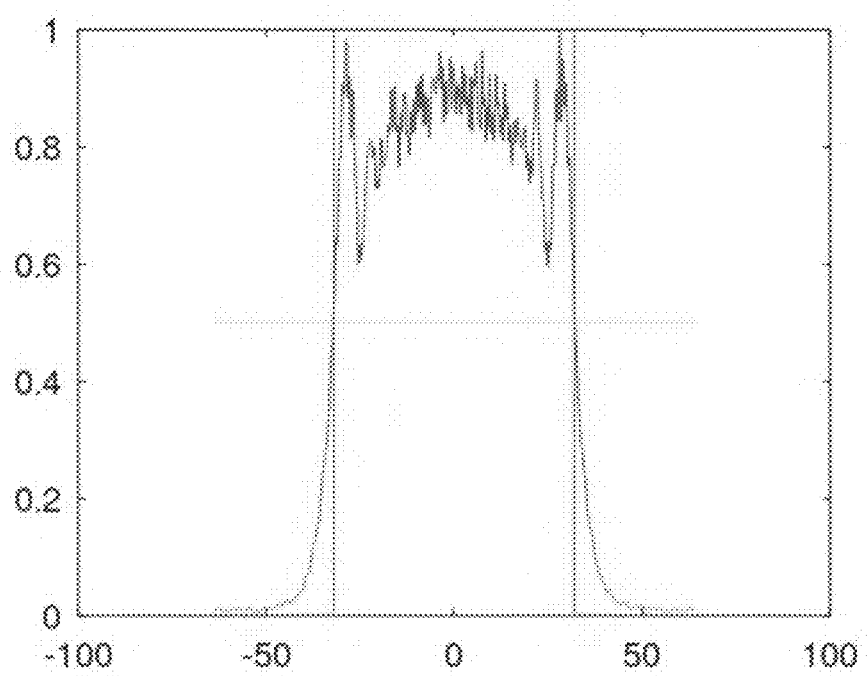
FIG. 65D illustrated far-field of RSL+LSD.

The combination of RSL and LSD can be tuned to achieve an improved design. FIG. 65A illustrates RSL. FIG. 65B illustrates LSD. FIG. 65C illustrates RSL+LSD. FIG. 65D illustrates far-field of RSL+LSD.

Figure 66A:
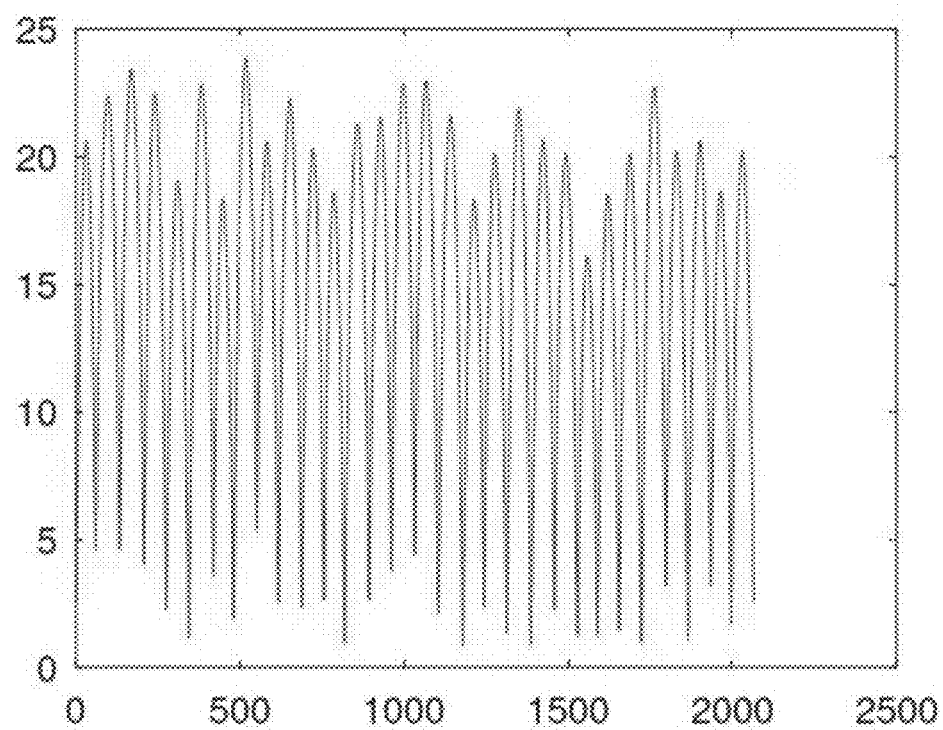
FIG. 66A shows the superposition of RSL+LSD tuned to reduce oscillation in the far-field.
Figure 66B:
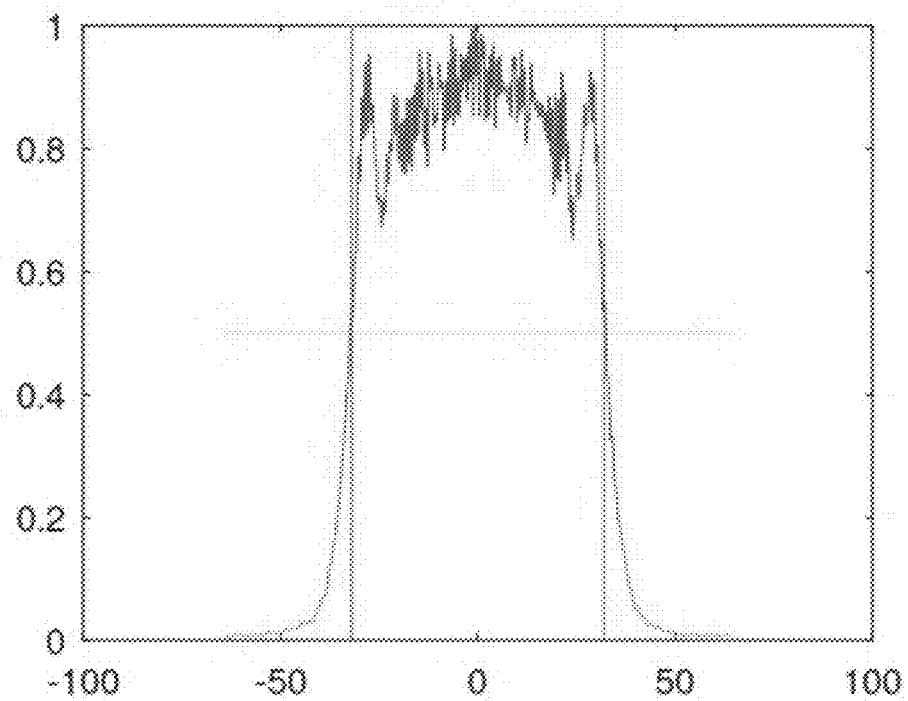
FIG. 66B is far-field pattern for the structure of FIG. 66A.

One advantage of using the combination of RSL and LSD is that the LSD parameters can be tuned to reduce the oscillations in the far-field. FIG. 66A shows the superposition of RSL+LSD tuned to reduce oscillation in the far-field, with the result illustrated in the far-field of FIG. 66B.

Optical Design Considerations

In the above description, it will be understood that one of ordinary skill in the art could design and optimize individual optical diffusers using optical design programs, such as that of Zemax®. That is, for a particular end-used application with specific illumination sources, the optical design may be optimized for particular light sources (e.g., coherent light or incoherent light), specific wavelengths (or ranges of wavelength) of the illumination sources, such as visible light or infrared light. Empirical studies and empirical optimization may also be performed.

INCORPORATION BY REFERENCE

The contents of the following U.S. patents and patent applications are hereby incorporated by reference:
U.S. patent application Ser. No. 17/455,820
U.S. patent application Ser. No. 16/778,820
U.S. Pat. No. 9,568,885B2

VARIATIONS AND ALTERNATE EMBODIMENTS

In the above description, for purposes of explanation, numerous specific details were set forth. It will be apparent, however, that the disclosed technologies can be practiced without any given subset of these specific details. In other instances, structures and devices are shown in block diagram form.

Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

What is claimed is:

1. An optical element comprising one or more micro-optic unit cells; wherein each micro-optic unit cell is comprised of one or more lenslets; wherein each lenslet has a boundary shape; wherein the lenslets are configured in a regularly spaced micro-lens array (MLA); wherein the lenslets are overwritten with partially filled randomly placed lenses (RPLs), which cover from 1 percent to 99 percent of the MLA; and wherein a light shaping diffuser (LSD) is added on top of the micro-optic unit cell, wherein the LSD comprises an overlay micro-structure that at least partially camouflages the LSD from human viewers.

2. The optical element of claim 1, wherein the micro-lenses of the micro-lens array are scaled with a height sigma>=lambda/(n−1) to minimize a zero order diffraction component.

3. The optical element of claim 2, wherein a height sigma is in the range of 2.5 to 4 times lambda/(n−1).

4. The optical element of claim 1, wherein the LSD comprises pseudo random micro-structures for light shaping that have a Gaussian far-field distribution envelope selected.

5. The optical element of claim 4, wherein the LSD is a holographic diffuser.

6. The optical element of claim 1, where the MLA and LSD are configured to optimize sharp boundaries in a far-field.

7. The optical element of claim 1, wherein the LSD has a microstructure with low frequency structures and higher frequency structures superimposed on the low frequency structures to at least partially camouflage the LSD from human viewers.

8. The optical element of claim 1, wherein the optical element is designed to work with visible light.

9. The optical element of claim 1, wherein the optical element is designed to work with infrared light.

10. An optical element comprising one or more micro-optic unit cells; wherein each micro-optic unit cell is comprised of one or more lenslets; wherein each lenslet has a boundary shape; wherein the lenslets are configured in a regularly spaced micro-lens array (MLA); wherein the lenslets are overwritten with partially filled randomly placed lenses (RPLs), which cover from 1 percent to 99 percent of the MLA;
wherein a light shaping diffuser (LSD) pattern is added on top of the micro-optic unit cell, the LSD pattern having microstructure with a low frequency structure and a higher frequency structure superimposed on the low frequency structure to at least partially camouflage the LSD pattern from human viewers; and
wherein an intensity or irradiance profile of the optical element comprises a flat top.

11. The optical element of claim 10, wherein the micro-lenses of the micro-lens array are scaled with a height sigma>=lambda/(n−1) to minimize a zero order diffraction component.

12. The optical element of claim 11, wherein the height sigma is in a range of 2.5 to 4 times lambda/(n−1).

13. The optical element of claim 10, wherein the LSD pattern comprises pseudo random micro-structures for light shaping that have a Gaussian far-field distribution envelope selected.

14. The optical element of claim 13, wherein the LSD pattern is a holographic diffuser.

15. The optical element of claim 10, where the MLA and LSD are configured to optimize sharp boundaries in a far-field.

16. The optical element of claim 10, wherein the optical element is designed to work with visible light.

17. The optical element of claim 10, wherein the optical element is designed to work with infrared light.

18. An optical element comprising one or more micro-optic unit cells;
   wherein each micro-optic unit cell is comprised of one or more lenslets; wherein each lenslet has a boundary shape; wherein the lenslets are configured in a micro-lens array (MLA); wherein the lenslets have randomly scaled lenses (RSL)s which cover from 1 percent to 99 percent of the MLA; and wherein a light shaping diffuser (LSD) pattern is added on top of the micro-optic unit cell.

* * * * *